US008559671B2

(12) United States Patent
Milanfar et al.

(10) Patent No.: US 8,559,671 B2
(45) Date of Patent: Oct. 15, 2013

(54) TRAINING-FREE GENERIC OBJECT DETECTION IN 2-D AND 3-D USING LOCALLY ADAPTIVE REGRESSION KERNELS

(75) Inventors: Peyman Milanfar, Menlo Park, CA (US); Hae Jong Seo, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 102 days.

(21) Appl. No.: 12/998,965

(22) PCT Filed: Dec. 16, 2009

(86) PCT No.: PCT/US2009/006616
§ 371 (c)(1),
(2), (4) Date: Aug. 31, 2011

(87) PCT Pub. No.: WO2010/080121
PCT Pub. Date: Jul. 15, 2010

(65) Prior Publication Data
US 2011/0311129 A1    Dec. 22, 2011

Related U.S. Application Data

(60) Provisional application No. 61/203,183, filed on Dec. 18, 2008.

(51) Int. Cl.
*G06K 9/00*    (2006.01)
(52) U.S. Cl.
USPC ............................. 382/103; 382/154; 382/224
(58) Field of Classification Search
None
See application file for complete search history.

(56) References Cited

U.S. PATENT DOCUMENTS

| 2007/0047838 A1* | 3/2007 | Milanfar et al. .............. 382/289 |
| 2007/0237419 A1 | 10/2007 | Shechtman et al. |
| 2010/0124361 A1* | 5/2010 | Gaddy .......................... 382/107 |
| 2011/0157355 A1* | 6/2011 | Ivanov et al. ................. 348/143 |

OTHER PUBLICATIONS

Ivan Laptev and Tony Lindeberg, "Velocity Adaptation of Spatio-temporal Receptive Fields for Direct Recognition of Activities: An Experimental Study", 2004, Image and Vision Computing, pp. 105-116.*
Using Local Regression Kernels for Statistical Object Detection, Seo et al. Image Processing, ICIP 2008 IEEE pp. 2380-2383.
Spatio-Temporal Video Interpolation and Denoising Using Motion-Assisted Steering Kernel (MASK) Regression, Tadeka et al. Image Processing, ICIP 2008 IEEE pp. 637-640.

(Continued)

*Primary Examiner* — Samir Ahmed
*Assistant Examiner* — Siamak Harandi
(74) *Attorney, Agent, or Firm* — Lumen Patent Firm

(57) ABSTRACT

The present invention provides a method of learning-free detection and localization of actions that includes providing a query video action of interest and providing a target video, obtaining at least one query space-time localized steering kernel (3-D LSK) from the query video action of interest and obtaining at least one target 3-D LSK from the target video, determining at least one query feature from the query 3-D LSK and determining at least one target patch feature from the target 3-D LSK, and outputting a resemblance map, where the resemblance map provides a likelihood of a similarity between each the query feature and each target patch feature to output learning-free detection and localization of actions, where the steps of the method are performed by using an appropriately programmed computer.

11 Claims, 48 Drawing Sheets

(56) References Cited

OTHER PUBLICATIONS

Matching Local Self-Similarities across Images and Videos, Shechtman et al. Computer Vision and Pattern Recognition 2007 IEEE pp. 1-8.
The Multiscale Hermite Transform for Local Orientation Analysis, Silvan-Cardenas et al. IEEE Transactions on Image Processing, 15(5) 2006, pp. 1236-1253.
Machine Recognition of Human Activities: A Survey, Turaga et al. IEEE Transactions on Circuits and Systems for Video Technology, vol. 18, No. 11, Nov. 2008, pp. 1473-1488.
Human Motion Signatures: Analysis, Synthesis, Recognition, Vasilescu et al., Proc. of the International Conference on Pattern Recognition (ICPR'02), Aug. 2002, vol. 3: 456-460.

* cited by examiner

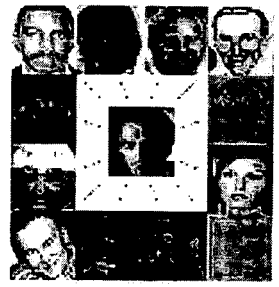 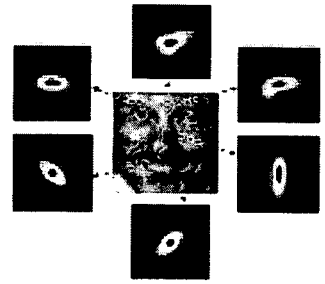
(a)          (b)
*FIG. 3*

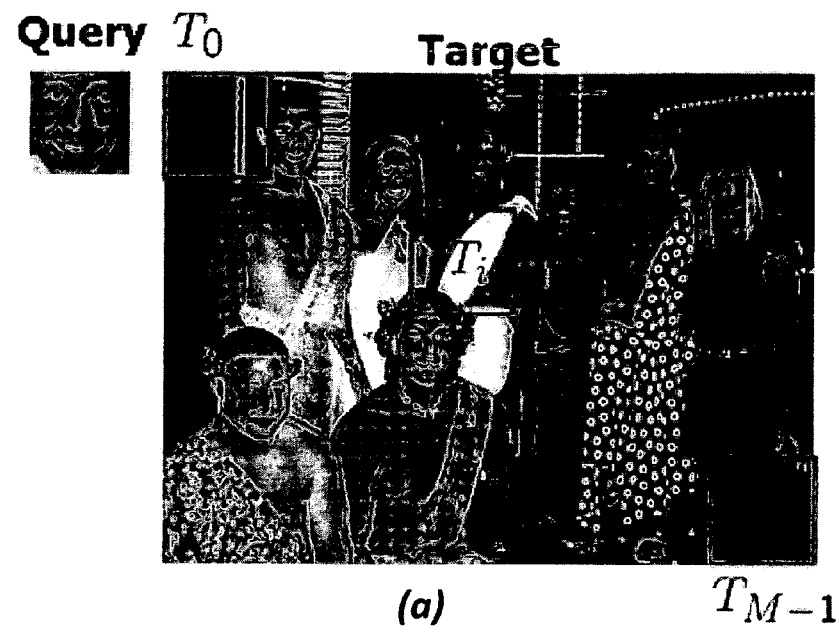
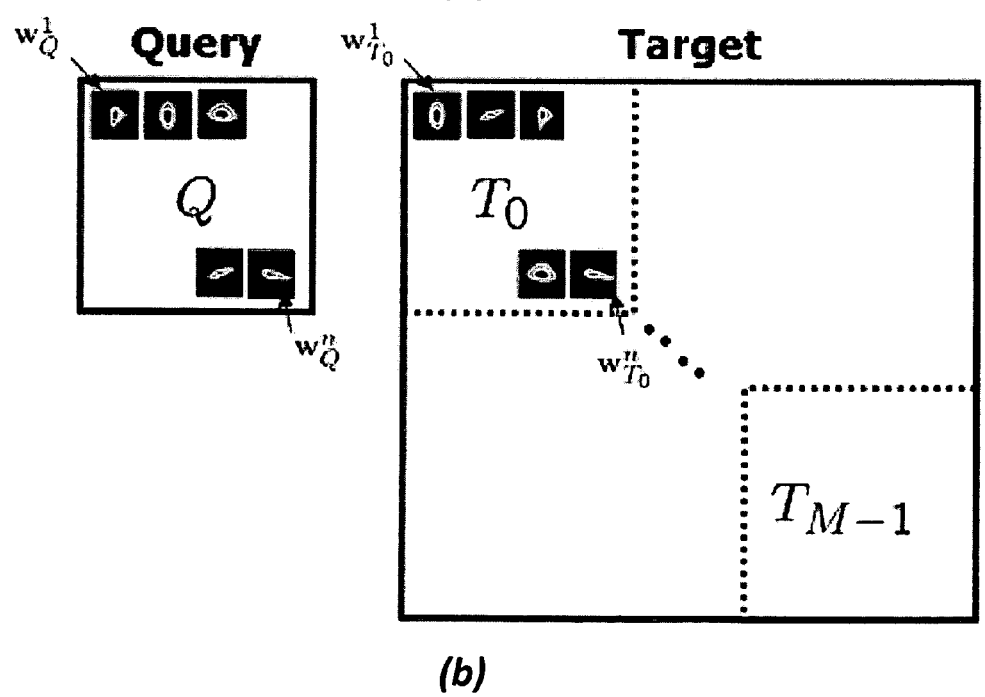
FIG. 5

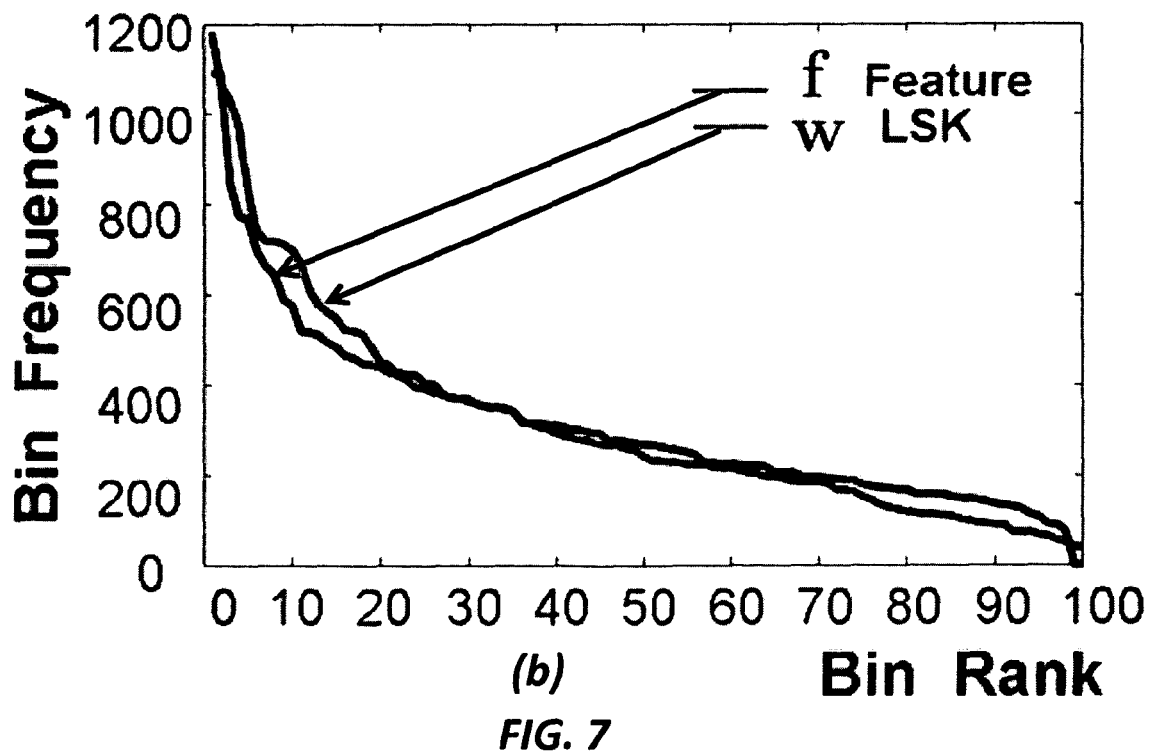
FIG. 7

FIG. 8

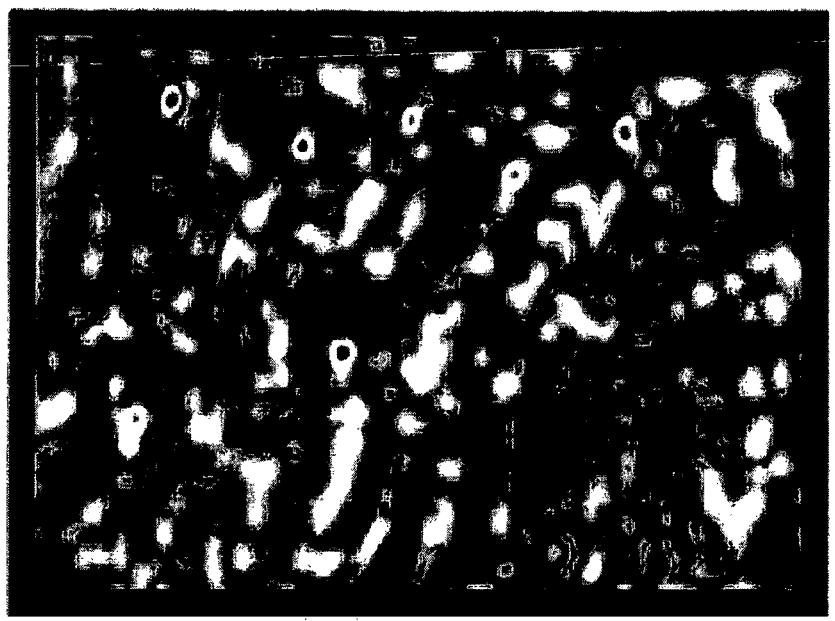
(a)
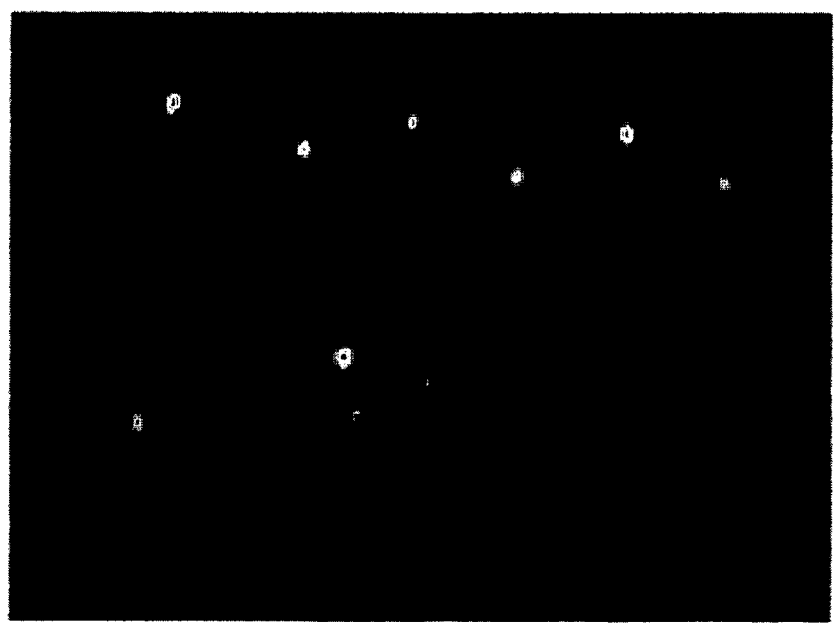
(b)
FIG. 10

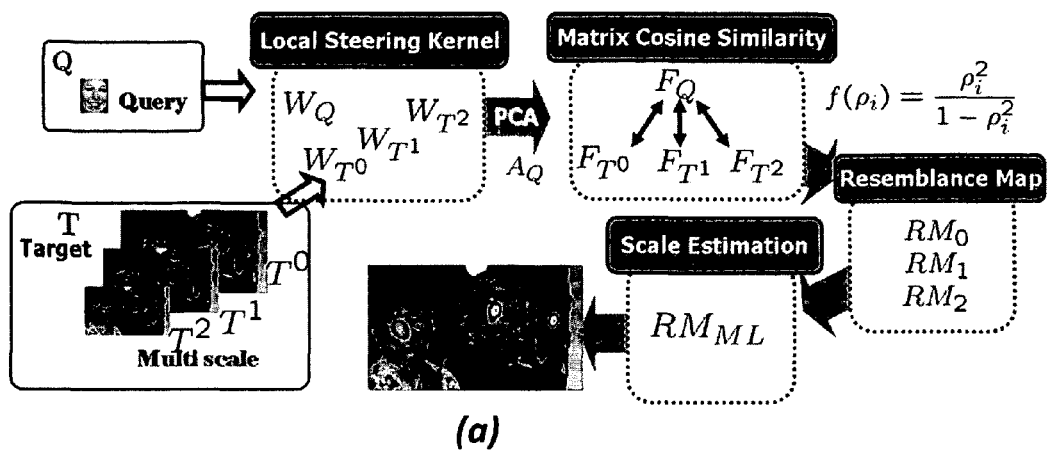
(a)
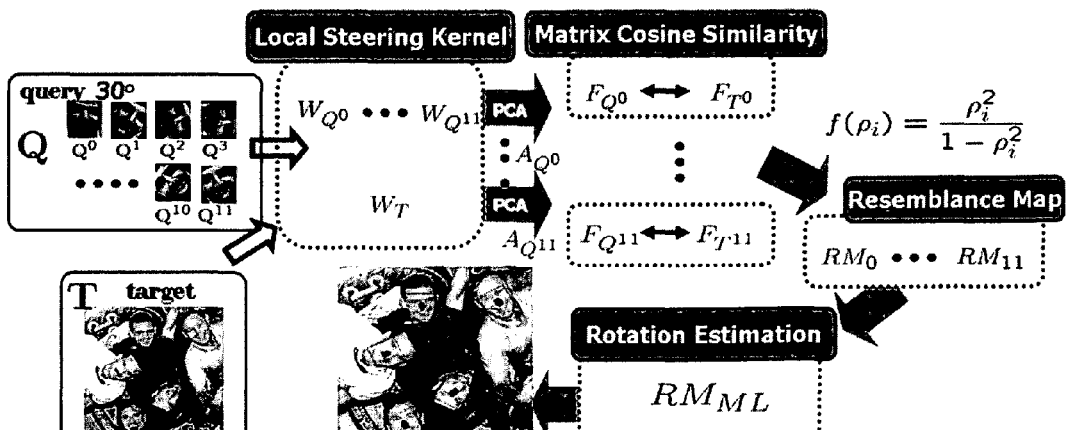
(b)
FIG. 15

Query 
(a)
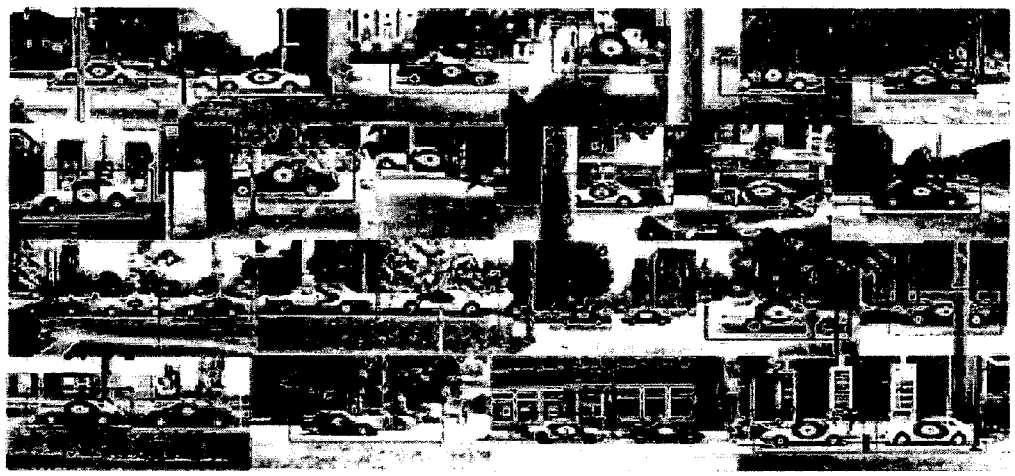
(b)
(c)
*FIG. 16*

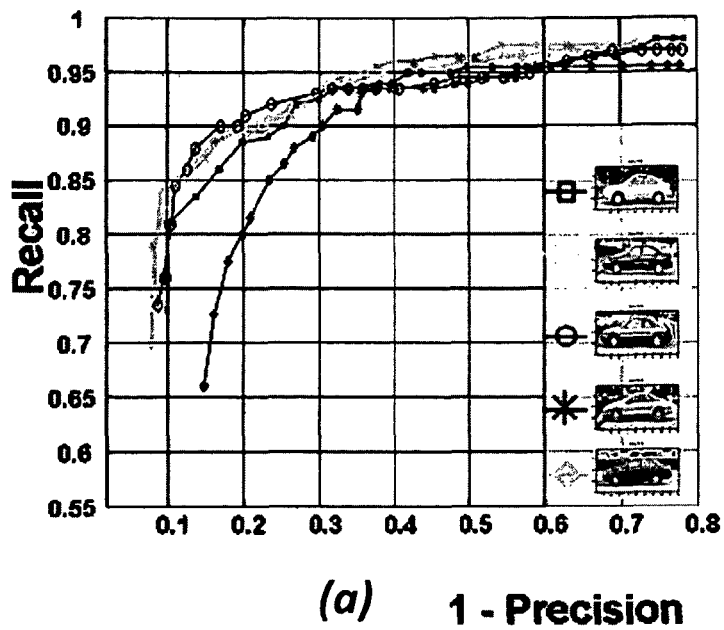
(a) 1 - Precision
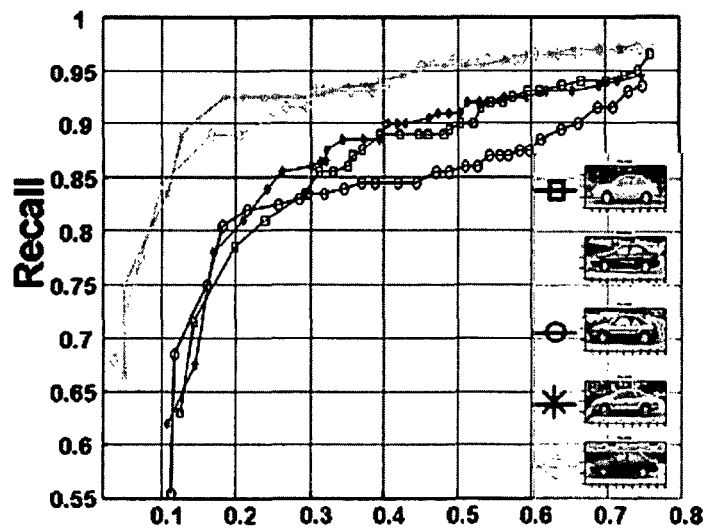
(b) 1 - Precision
*FIG. 17*

(b)

(a)
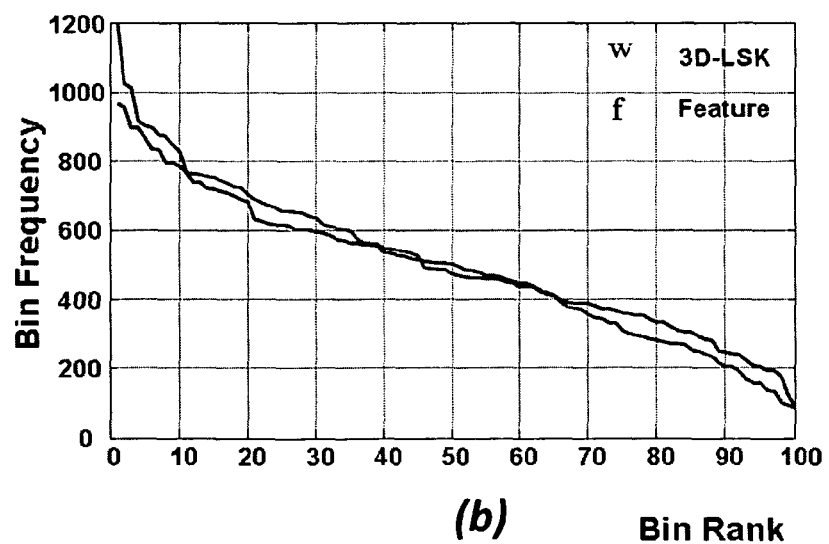
(b)
FIG. 34

(a)

*(b)*

(a)

*(b)*

*(a)*

*(b)*

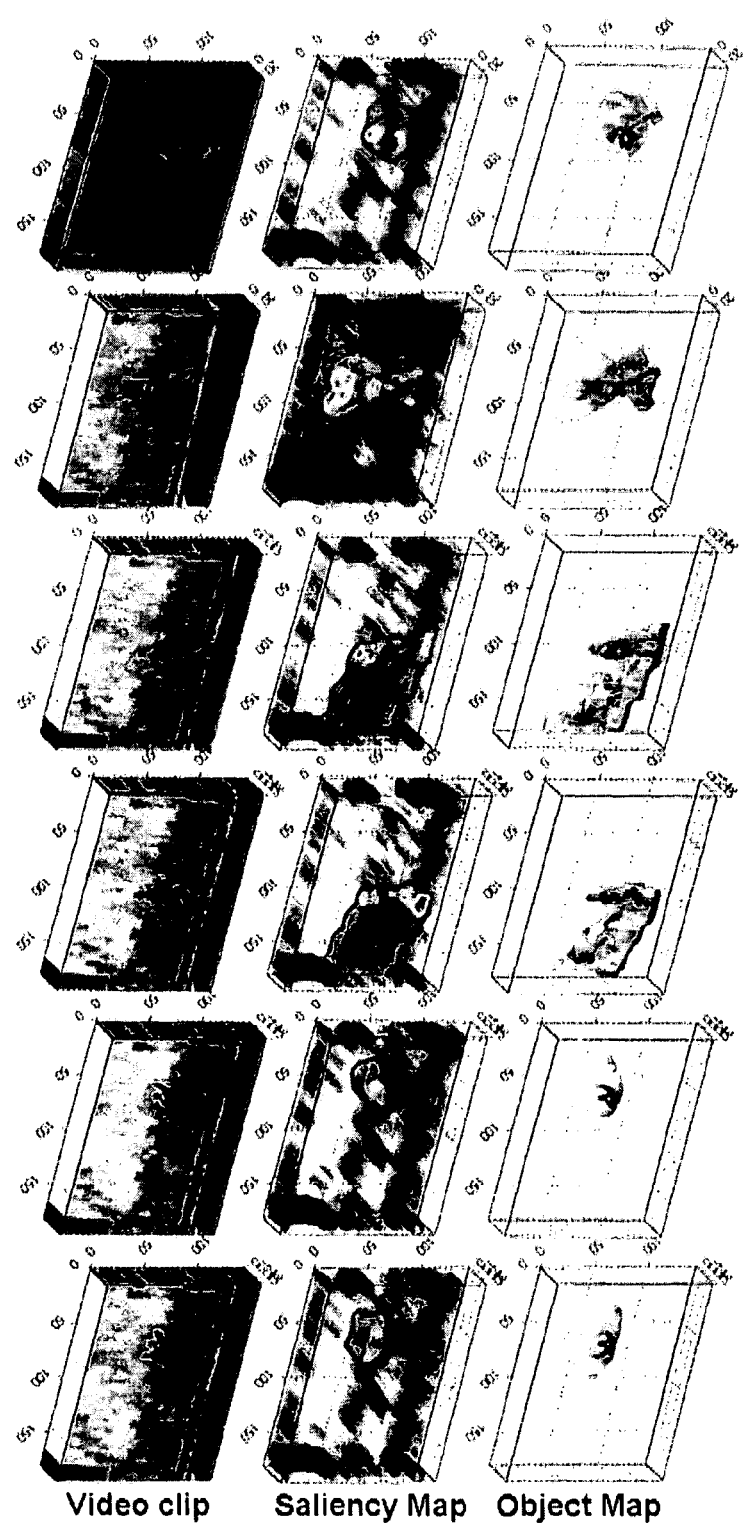
(a) FIG. 44

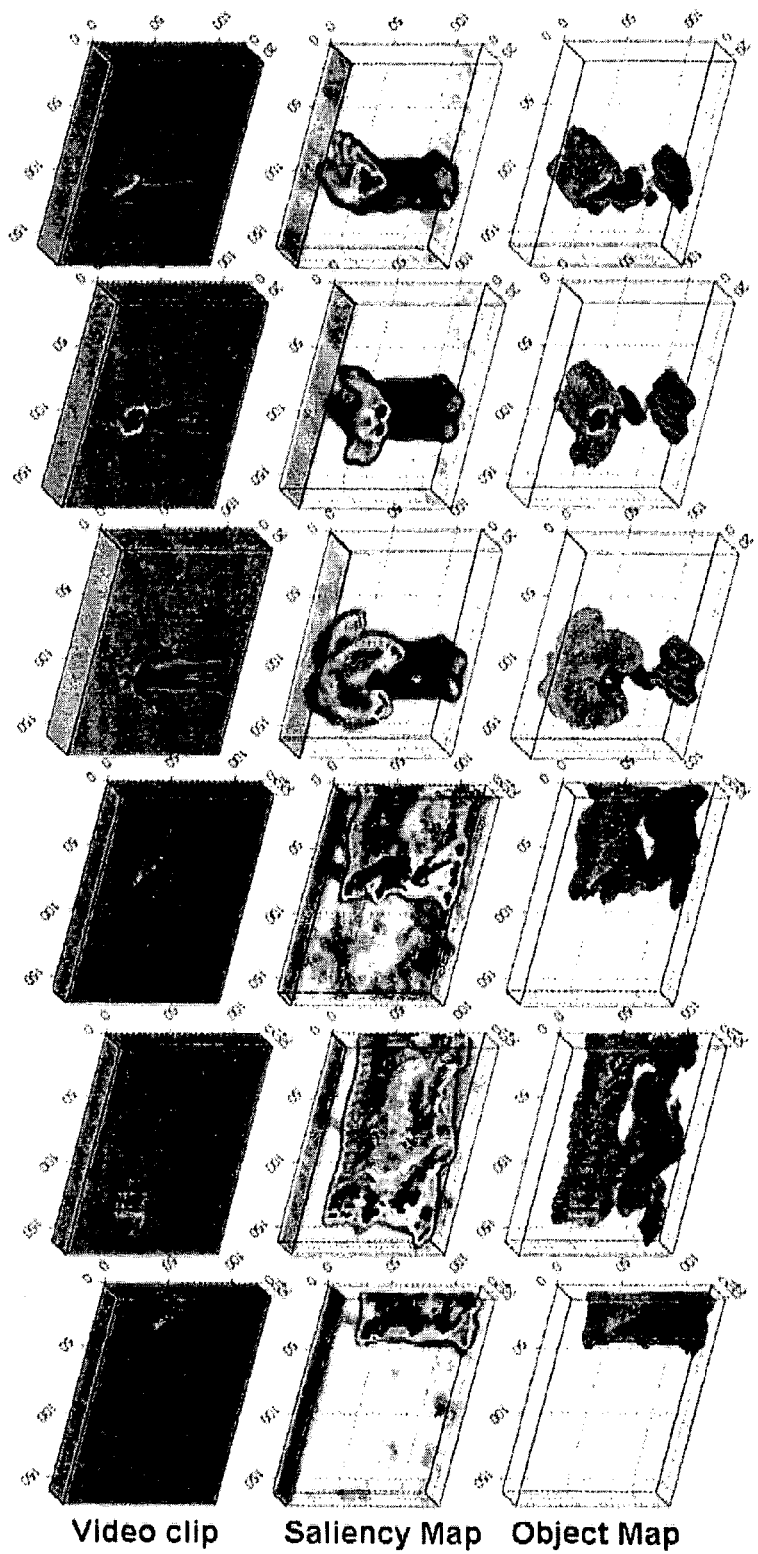
*(b)* FIG. 44 *(cont.)*

|        | Bend | Jack | Jump | Pjump | Run | Side | Skip | Walk | Wave1 | Wave2 |
|--------|------|------|------|-------|-----|------|------|------|-------|-------|
| Bend   | 1.0  | .00  | .00  | .00   | .00 | .00  | .00  | .00  | .00   | .00   |
| Jack   | .00  | 1.0  | .00  | .00   | .00 | .00  | .00  | .00  | .00   | .00   |
| Jump   | .00  | .00  | 1.0  | .00   | .00 | .00  | .00  | .00  | .00   | .00   |
| Pjump  | .00  | .00  | .00  | 1.0   | .00 | .00  | .00  | .00  | .00   | .00   |
| Run    | .00  | .00  | .00  | .00   | 1.0 | .00  | .00  | .00  | .00   | .00   |
| Side   | .00  | .00  | .00  | .00   | .00 | 1.0  | .00  | .00  | .00   | .00   |
| Skip   | .00  | .00  | .11  | .00   | .11 | .11  | .67  | .00  | .00   | .00   |
| Walk   | .00  | .00  | .00  | .00   | .00 | .00  | .00  | 1.0  | .00   | .00   |
| Wave1  | .11  | .00  | .00  | .00   | .00 | .00  | .00  | .00  | .89   | .00   |
| Wave2  | .00  | .00  | .00  | .00   | .00 | .00  | .00  | .00  | .00   | 1.0   |

*FIG. 45*

Scenario 1

|      | box | hclp | hwav | jog | run | walk |
|------|-----|------|------|-----|-----|------|
| box  | .96 | .00  | .04  | .00 | .00 | .00  |
| hclp | .00 | 1.0  | .00  | .00 | .00 | .00  |
| hwav | .00 | .00  | 1.0  | .00 | .00 | .00  |
| jog  | .00 | .00  | .00  | .92 | .04 | .04  |
| run  | .00 | .00  | .00  | .04 | .96 | .00  |
| walk | .00 | .00  | .00  | .00 | .00 | 1.0  |

Scenario 2

|      | box | hclp | hwav | jog | run | walk |
|------|-----|------|------|-----|-----|------|
| box  | .92 | .04  | .04  | .00 | .00 | .00  |
| hclp | .00 | 1.0  | .00  | .00 | .00 | .00  |
| hwav | .00 | .00  | 1.0  | .00 | .00 | .00  |
| jog  | .00 | .00  | .00  | .88 | .00 | .12  |
| run  | .00 | .00  | .00  | .08 | .84 | .08  |
| walk | .00 | .00  | .00  | .08 | .04 | .88  |

Scenario 3

|      | box | hclp | hwav | jog | run | walk |
|------|-----|------|------|-----|-----|------|
| box  | .88 | .04  | .08  | .00 | .00 | .00  |
| hclp | .00 | .96  | .04  | .00 | .00 | .00  |
| hwav | .00 | .00  | 1.0  | .00 | .00 | .00  |
| jog  | .00 | .00  | .00  | 1.0 | .00 | .00  |
| run  | .00 | .00  | .00  | .04 | .92 | .04  |
| walk | .00 | .00  | .00  | .04 | .00 | .96  |

Scenario 4

|      | box | hclp | hwav | jog | run | walk |
|------|-----|------|------|-----|-----|------|
| box  | 1.0 | .00  | .00  | .00 | .00 | .00  |
| hclp | .00 | 1.0  | .00  | .00 | .00 | .00  |
| hwav | .00 | .00  | 1.0  | .00 | .00 | .00  |
| jog  | .00 | .00  | .00  | 1.0 | .00 | .00  |
| run  | .00 | .00  | .00  | .04 | .96 | .00  |
| walk | .00 | .00  | .00  | .08 | .04 | .88  |

(a)

|      | box | hclp | hwav | jog | run | walk |
|------|-----|------|------|-----|-----|------|
| box  | .94 | .02  | .04  | .00 | .00 | .00  |
| hclp | .00 | .99  | .01  | .00 | .00 | .00  |
| hwav | .00 | .00  | 1.0  | .00 | .00 | .00  |
| jog  | .00 | .00  | .00  | .95 | .01 | .04  |
| run  | .00 | .00  | .00  | .05 | .92 | .03  |
| walk | .00 | .00  | .00  | .05 | .01 | .94  |

TRAINING-FREE GENERIC OBJECT DETECTION IN 2-D AND 3-D USING LOCALLY ADAPTIVE REGRESSION KERNELS

CROSS-REFERENCE TO RELATED APPLICATIONS

This application is a 371 of PCT Patent Application PCT/US2009/006616 filed Dec. 16, 2009, which claims the benefit of U.S. Provisional Application 61/203,183 filed Dec. 18, 2008.

STATEMENT OF GOVERNMENT SPONSORED SUPPORT

This invention was made with Government support under contract FA9550-07-1-0365 and F49620-03-1-0387 awarded by Air Force Office of Scientific Research. The Government has certain rights in this invention.

FIELD OF THE INVENTION

The invention relates generally to imaging technologies. More particularly, the invention relates to generic detection/localization/recognition algorithm capable of searching for a visual object of interest without training.

BACKGROUND

Analysis of visual objects in images is a very important component in computer vision systems, which perform object recognition, image retrieval, image registration, and more. Areas where such systems are deployed are diverse and include such applications as surveillance (security), video forensics, and medical image analysis for computer-aided diagnosis, to mention just a few. In particular, the object recognition problem has attracted much attention recently due to the increasing demand for developing real-world systems.

Recognition is mainly divided into two parts: category recognition (classification) and detection/localization. The goal of object category recognition is to classify a given object into one of several pre-specified categories, while object detection is to separate objects of interest from the background in a target image. In the current literature, a popular object recognition paradigm is probabilistic constellation or parts-and-shape models that represent not only the statistics of individual parts, but also their spatial layout. These are based on learning-based classifiers that require an intensive learning/training phase of the classifier parameters and thus are called parametric methods. Object detection is also a critical part in many applications such as image retrieval, scene understanding, and surveillance system; however it is still an open problem because the intra-class variation makes a generic detection very complicated, requiring various types of pre-processing steps. The sliding window scheme is usually used by taking the peak confidence values as an indication of the presence of an objet in a given region. Most recent successful localization methods rely on this technique, but these too still required a training phase. Recently, the recognition task with only one query (training-free) has received increasing attention for important applications such as automatic passport control at airports, where a single photo in the passport is the only example available. Another application is in image retrieval from the web. In the retrieval task, a single probe or query image is provided by users and every gallery image in the database is compared with the single probe, posing an image-to-image matching problem. Recently, the face image retrieval task led to intensive activity in this area, culminating in FRGC (Face Recognition Grand Challenge). More generally, by taking into account a set of images, which represents intra-class variations, more robust object recognition can be achieved. Such sets may consist of observations acquired from a video sequence or by multiple still shots. In other words, classifying an unknown set of images into one of the training classes can be achieved through set-to-image or set-to-set matching without an intensive training phase. As a successful example of set-to-image matching, very recently it has been shown that a trivial nearest-neighbor (NN) based image classifier in the space of the local image descriptors such as SIFT and local self-similarity is extremely simple, efficient and even outperforms the leading learning-based image classifiers.

A huge number of videos are available online today and the number is rapidly growing. Human actions constitute one of the most important parts in movies, TV shows, and consumer-generated videos. Analysis of human actions in videos is considered a very important problem in computer vision because of such applications as human-computer interaction, content-based video retrieval, visual surveillance, analysis of sports events and more. The term "action" refers to a simple motion pattern as performed by a single subject, and in general lasts only for a short period of time, namely just a few seconds. Action is often distinguished from activity in the sense that action is an individual atomic unit of activity. In particular, human action refers to physical body motion. Recognizing human actions from video is a very challenging problem due to the fact that physical body motion can look very different depending on the context: for instance, similar actions with different clothes, or in different illumination and background can result in a large appearance variation; or, the same action performed by two different people may look quite dissimilar in many ways.

The goal of action classification is to classify a given action query into one of several pre-specified categories (for instance, 6 categories from KTH action dataset: boxing, hand clapping, hand waving, jogging, running, and walking). Meanwhile, action detection is meant to separate an action of interest from the background in a target video (for instance, spatiotemporal localization of a walking person). The disadvantages of learning-based methods are that they require a large number of training examples, and explicit motion estimation.

In general, the target video may contain actions similar to the query, but these will typically appear in completely different context as shown in FIG. 1 and FIGS. 2(a)-2(b), where FIG. 1 shows hand-waving action and possibly similar actions, and FIGS. 2(a)-2(b) show the action detection problem in FIG. 2(a) given a query video Q, where it is desired to detect/localize actions of interest in a target video T, with T divided into a set of overlapping cubes and FIG. 2(b) shows space-time local steering kernels (3-D LSKs) capturing the geometric structure of underlying data. Examples of such differences can range from rather simple optical or geometric differences (such as different clothes, lighting, action speed and scale changes); to more complex inherent structural differences such as for instance a hand-drawn action video clip (e.g., animation) rather than a real human action.

Over the last two decades, many studies have attempted to tackle this problem and made impressive progress. Approaches can be categorized on the basis of action representation; namely, appearance-based representation, shape-based representation, optical-flow-based representation, interest-point-based representation, and volume-based representation.

As examples of the interest-point-based approach, which has gained a lot of interest, videos as spatiotemporal bag-of-words have been considered by extracting space-time interest points and clustering the features, and then using a probabilistic Latent Semantic Analysis (pLSA) model to localize and categorize human actions. Another approach also used spatiotemporal features, where they extended the naive Bayes nearest neighbor classifier, which was developed for object recognition, to action recognition. By modifying the efficient searching method based on branch-and-bound for the 3-D case, they provided a very fast action detection method. However, the performance of these methods can degrade due to 1) the lack of enough training samples; 2) misdetections and occlusions of the interest points since they ignore global space-time information.

Another approach recently employed a three-dimensional correlation scheme for action detection. They focused on sub-volume matching in order to find similar motion between the two space-time volumes, which can be computationally heavy. A further approach uses boosting on 3-D Haar-type features inspired by similar features in 2-D object detection. While these features are very efficient to compute, many examples are required to train an action detector in order to achieve good performance. They further proposed a part-based shape and flow matching framework and showed good action detection performance in crowded videos.

One approach generalized canonical correlation analysis to tensors and showed very good accuracy on the KTH action dataset, but their method requires a manual alignment process for camera motion compensation. A further approach proposed a system to search for human actions using a coarse-to-fine approach with a five-layer hierarchical space-time model. These volumetric methods do not require background subtraction, motion estimation, or complex models of body configuration and kinematics. They tolerate variations in appearance, scale, rotation, and movement to some extent. Methods which aim at recognizing actions based solely on one query, are very useful for applications such as video retrieval from the web (e.g., viewdle, videosurf). In these methods, a single query video is provided by users and every gallery video in the database is compared with the given query, posing a video-to-video matching problem.

Accordingly, there is a need to develop an approach to the problem of human action recognition as a video-to-video matching problem, where recognition is generally divided into two parts: category classification and detection/localization. There is a further need for addressing detection and category classification problems simultaneously by searching for an action of interest within other "target" videos with only a single "query" video.

SUMMARY OF THE INVENTION

The present invention provides a method of learning-free detection and localization of actions that includes providing a query video action of interest and providing a target video by using an appropriately programmed computer, obtaining at least one query space-time localized steering kernel (3-D LSK) from the query video action of interest and obtaining at least one target 3-D LSK from the target video by using the appropriately programmed computer, determining at least one query feature from the query 3-D LSK and determining at least one target patch feature from the target 3-D LSK by using the appropriately programmed computer, and outputting a resemblance map, where the resemblance map provides a likelihood of a similarity between each the query feature and each target patch feature by using the appropriately programmed computer to output learning-free detection and localization of actions.

In one aspect of the invention, each 3-D LSK is computed from covariance matrices, where the covariance matrices are estimated by using singular value decomposition (SVD), where the SVD is applied to a collection of space-time gradient vectors in a local neighborhood, and the covariance matrices determine a shape and size of a local kernel, where local geometric structures are encoded.

According to another aspect of the invention, each resulting 3-D LSK is invariant to illumination changes and robust to a presence of noise.

In another aspect, each 3-D LSK is densely computed and normalized. Here, each query feature volume and each target feature volume include a principle component analysis (PCA) applied to each densely computed and normalized query 3-D LSK, where the PCA step determines feature spaces for dimensionality reduction of the normalized query 3-D LSK, where the PCA is applied to each densely computed and normalized query 3-D LSK and target 3-D LSK. Further, lower dimensional features of each query 3-D LSK and each target 3-D LSK are determined by projecting each normalized query 3-D LSK and each target 3-D LSK onto the feature space.

In yet another aspect of the invention, the resemblance map includes nonparametric significance testing and non-maxima suppression.

According to one aspect, the resemblance map includes a volume of voxels, where each voxel indicates the likelihood of similarity between each query feature and each target patch feature.

In a further aspect of the invention, the resemblance map is computed by using a matrix cosine similarity (MCS).

According to another aspect the motion estimation is not required to detect and localize actions of interest.

In a further aspect of the invention, a space-time saliency detection method is utilized to automatically extract a finite cube that only contains a valid action for the task of action category classification from the query video, where the space-time saliency detection is based on the 3-D LSKs and a self-resemblance measure.

BRIEF DESCRIPTION OF THE FIGURES

The objectives and advantages of the present invention will be understood by reading the following detailed description in conjunction with the drawing, in which:

FIGS. 3(a)-3(b) show a face and some possibly similar images, and examples of local steering kernel (LSK) in various regions, respectively according to the current invention.

FIGS. 5(a)-5(b) show (a) a given query image Q to detect/localize objects of interest in a target image T divided into a set of overlapping patches (b) local steering kernels represent the geometric structure of underlying data according to the current invention.

FIGS. 7(a)-7(b) show empirical bin density that is densely computed from 60 images (from Shechtman's general object dataset) using the K-means clustering method according to the current invention.

Figure 8:
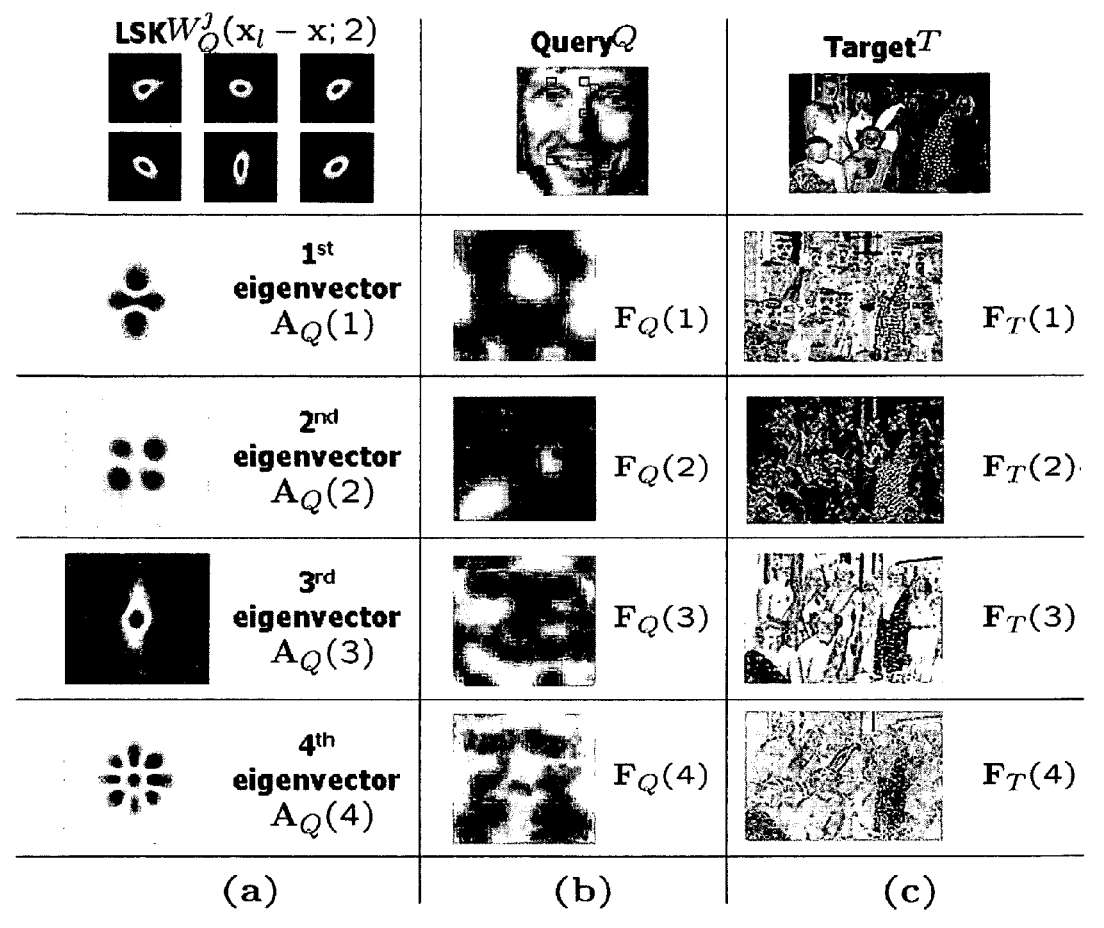

FIGS. 8-9 show what the principal components in $X_Q$ and the features $F_Q$, $F_T$ look like for some examples such as face and car according to the current invention.

FIGS. 10(a)-10(b) show examples of resemblance map (RM) based on $|\rho_i|$ and $f(\rho_i)$ according to the current invention.

according to the current invention.

FIGS. 12(a)-12(d) show the graphical illustration of significance tests and non-maxima suppression idea according to the current invention.

Figure 13:
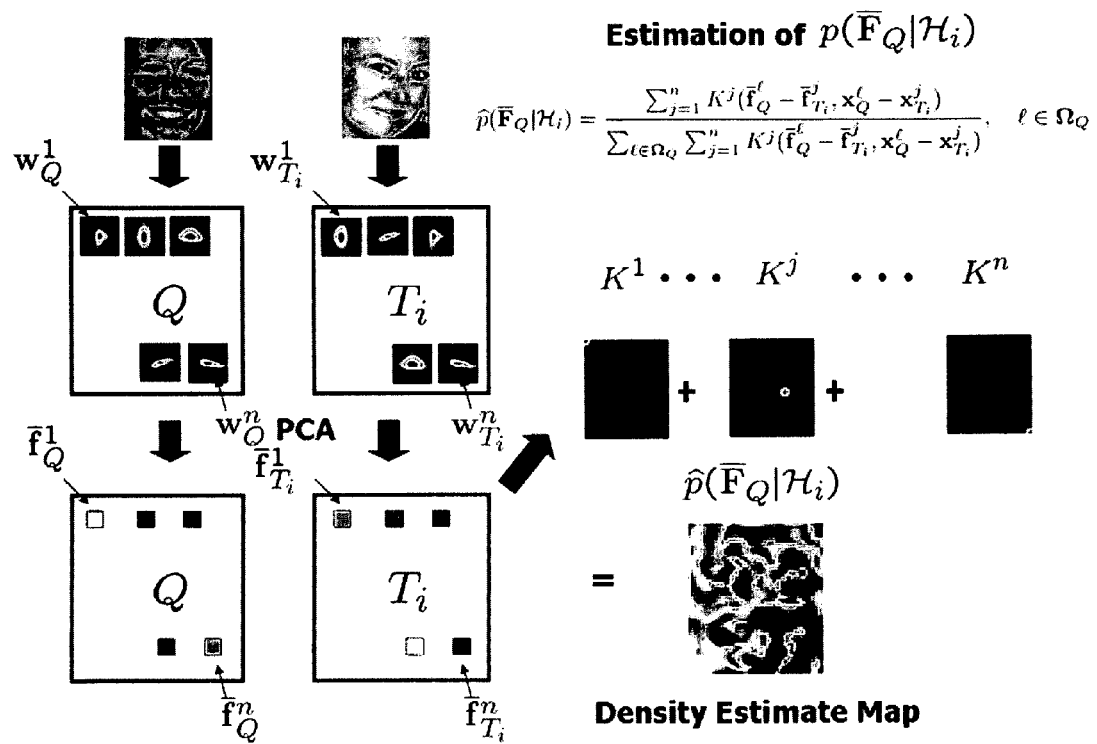

FIG. 13 shows how the conditional density function $\hat{p}(F_Q|\mathcal{H}_i)$ is estimated, given Q and $T_i$ according to the current invention.

Figure 14:
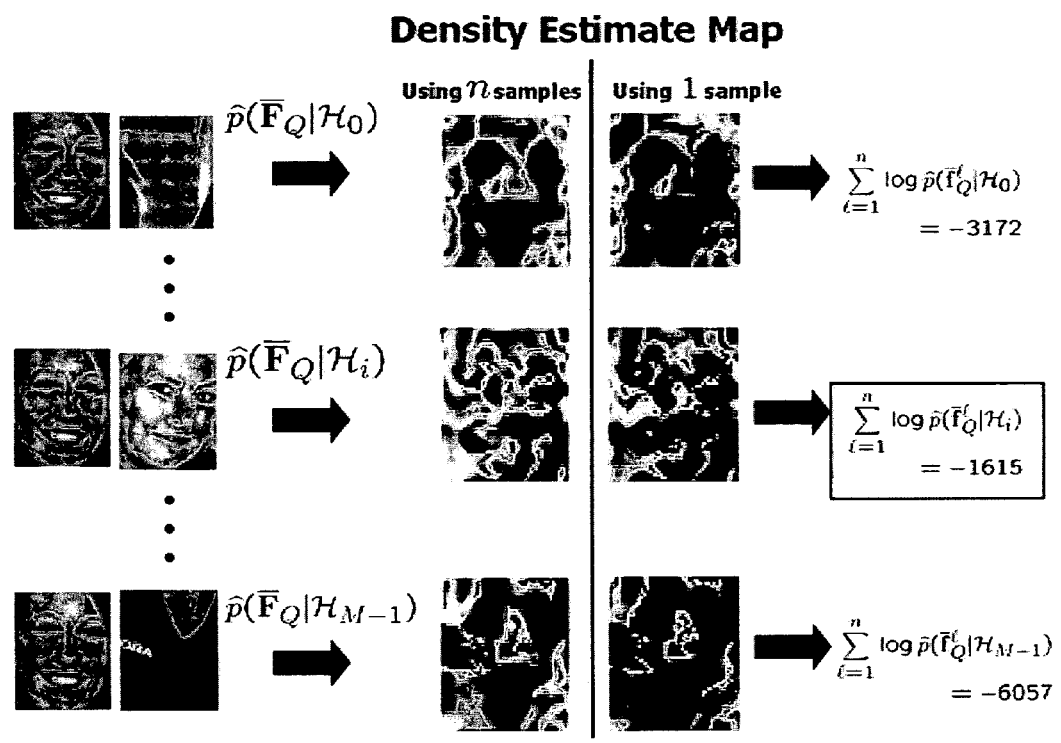

FIG. 14 The approximate version of density estimator using one sample is compared to $\hat{p}(T_Q^l|\mathcal{H}_i)$ estimated using all n samples according to the current invention.

FIGS. 15(a)-15(b) show block diagrams of multi-scale object detection system and of multi-rotation object detection system, respectively, according to the current invention.

FIGS. 16(a)-16(c) show the output of the current invention on single-scale test images.

FIGS. 17(a)-17(b) show recall-precision curves representing a performance comparison between the current invention and the current invention without PCA using 5 different query images according to the current invention.

Figure 18:
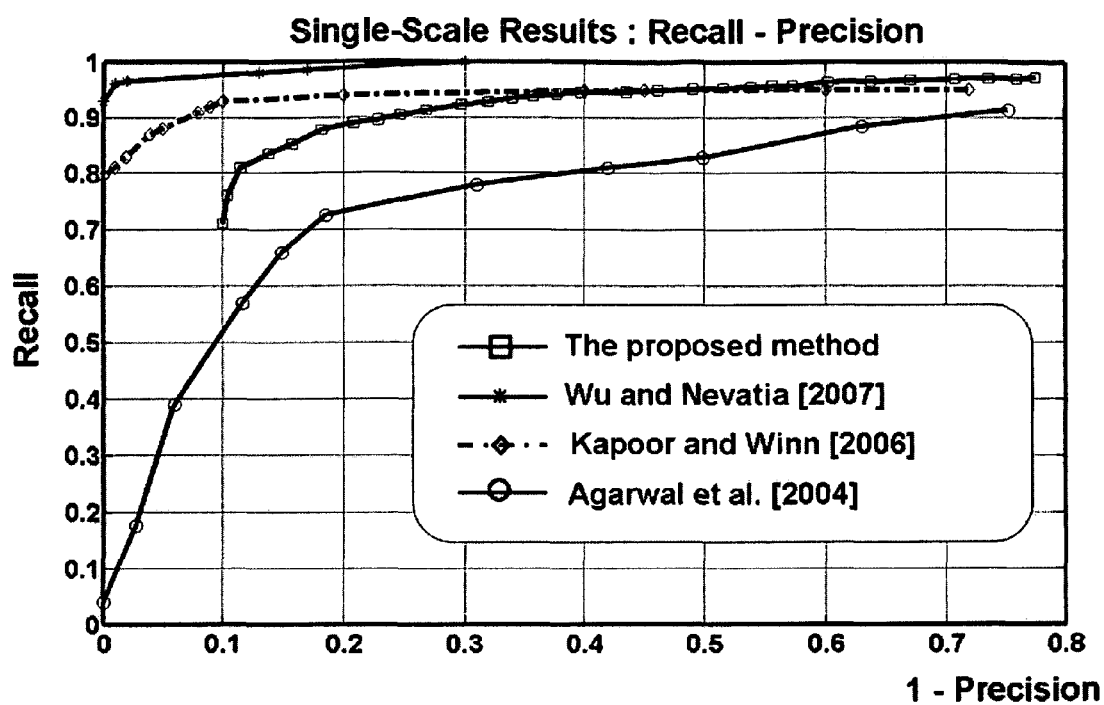

FIG. 18 shows a comparison of Recall versus 1-Precision curves between the current invention and other methods on the UIUC single-scale test set according to the current invention.

FIGS. 19(a)-19(b) show comparison of Recall versus 1-Precision curves between the current invention and state-of-the-art methods on the UIUC single-scale test set according to the current invention.

Figure 20:
Figure 21:
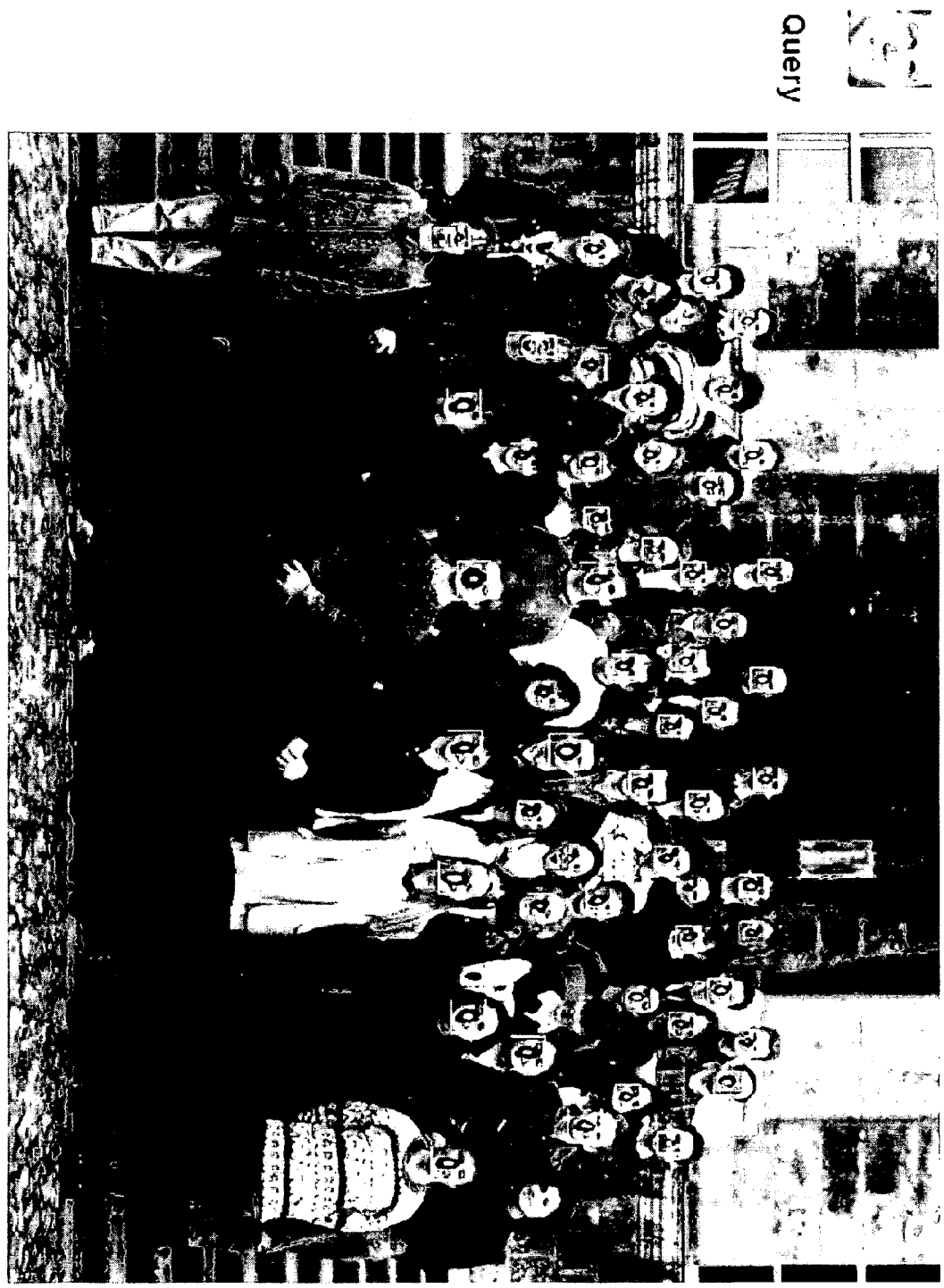
Figure 22:

FIGS. 20-22 show that the current invention is capable of detecting and localizing faces at a distinct scale and rotation angle even in the presence of large variations in scale and rotation.

Figure 23:
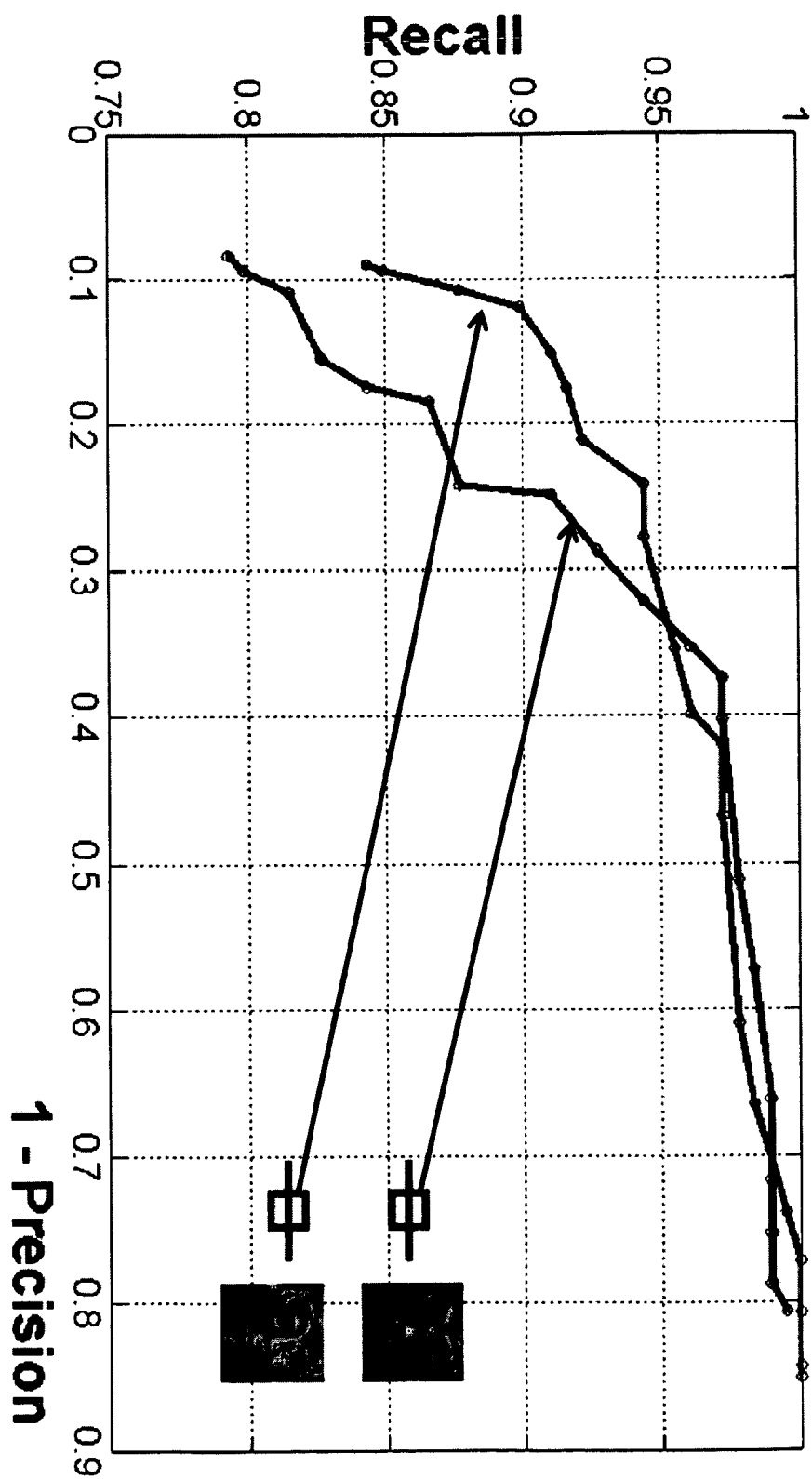

FIG. 23 shows the performance of the current invention is little affected by the choice of query image and is quite stable.

Figure 24:
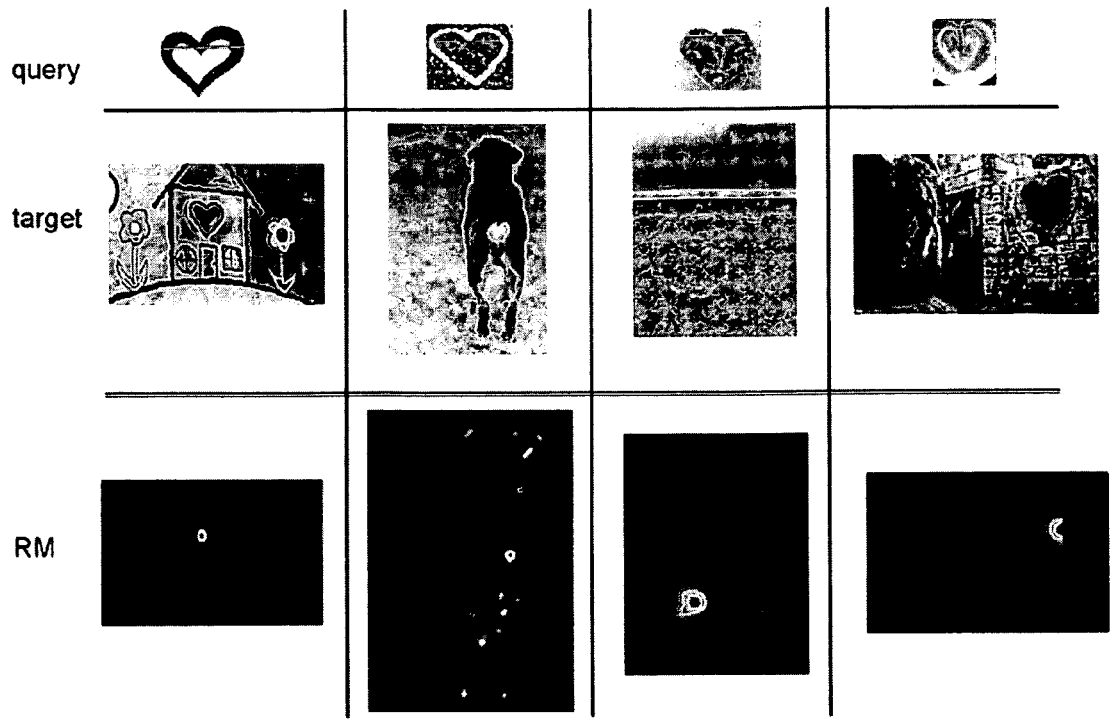
Figure 25:
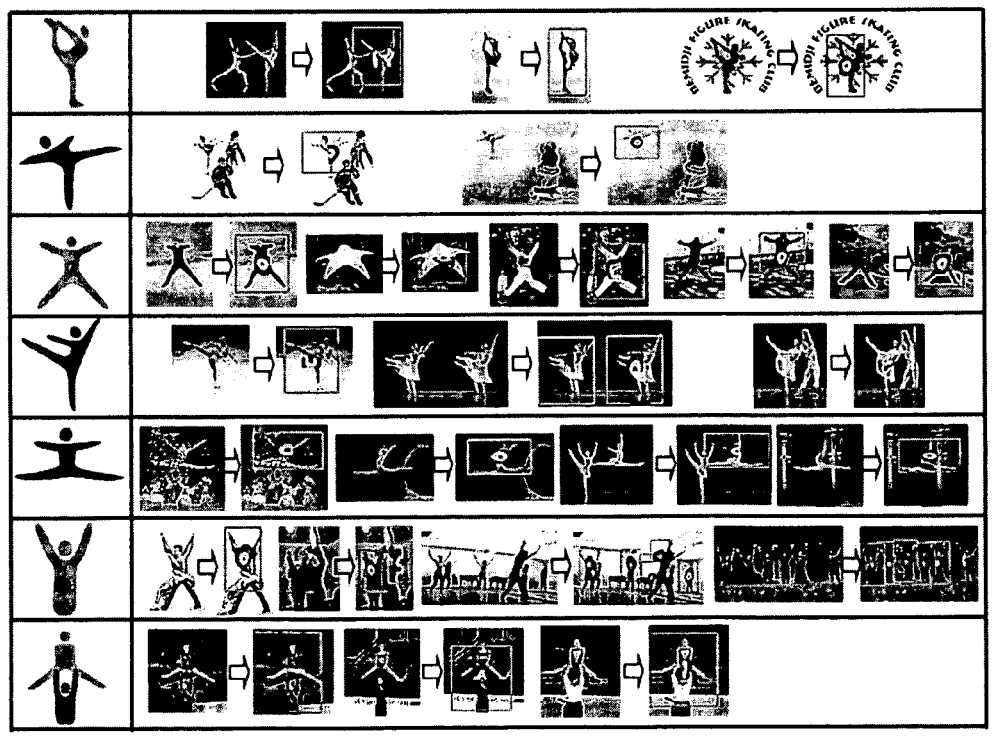
Figure 26:

FIGS. 24-26 show some examples of RM and that they are detected and localized reliably according to the current invention.

Figure 27:
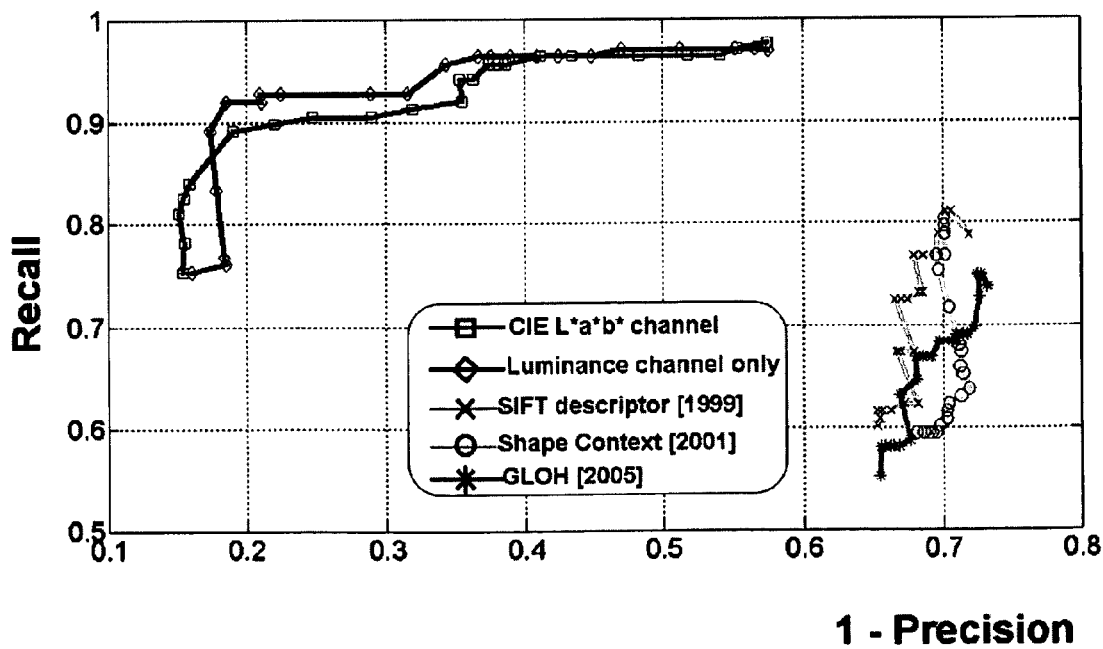
Figure 28:
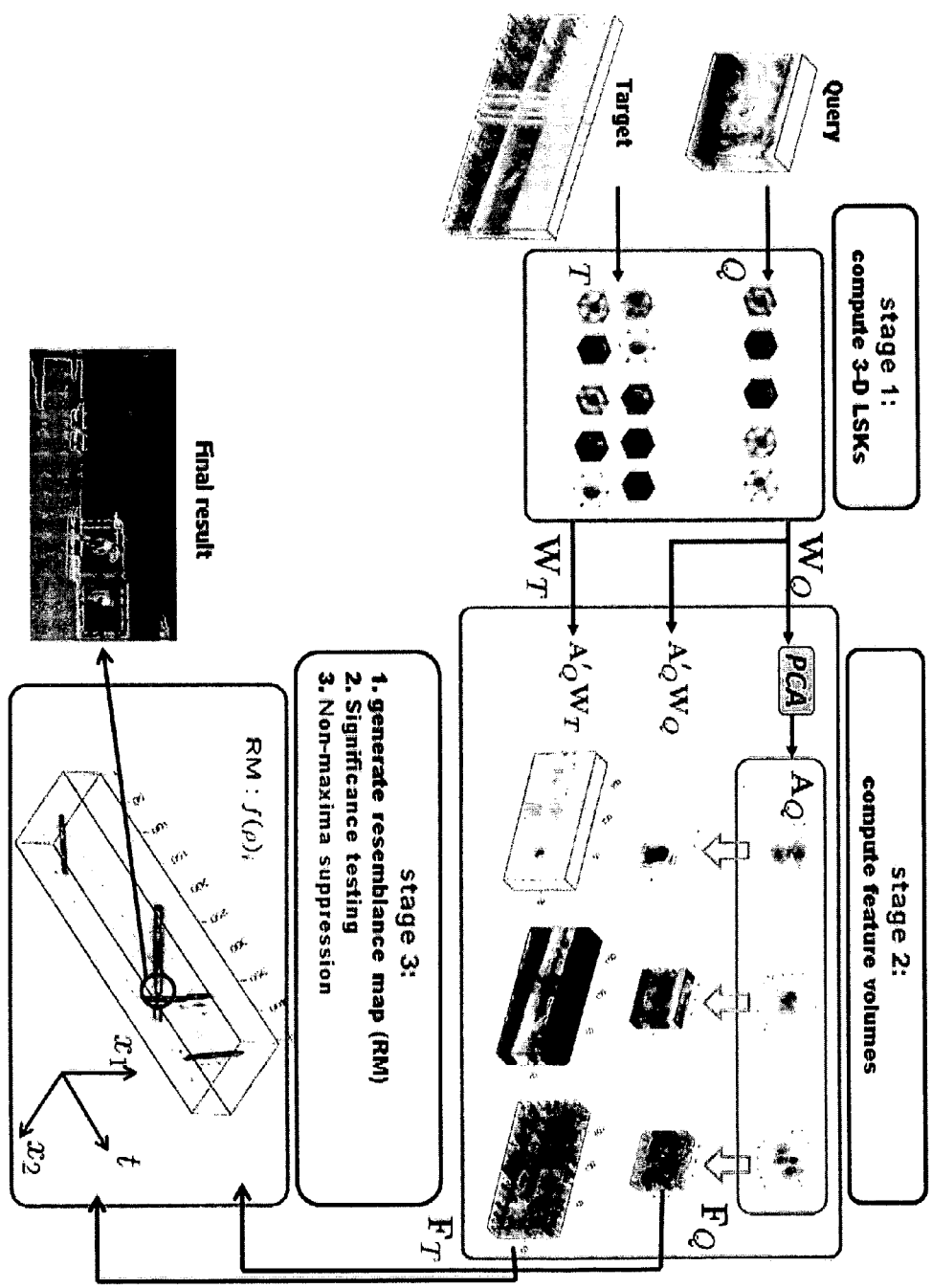

FIG. 27 shows a Precision-Recall, which verifies that the LSKs according to the current invention has more discriminative power than other local descriptors FIG. 28 shows an overview of the framework for action detection according to the current invention.

Figure 29:
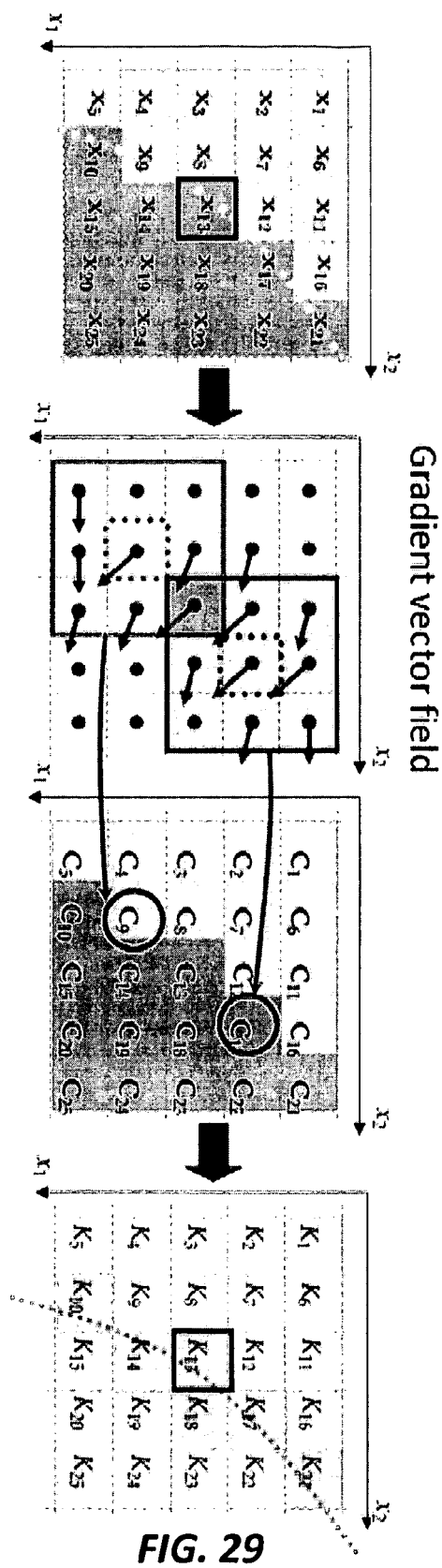

FIG. 29 shows a graphical description of how LSK values centered at pixel of interest ×13 are computed in an edge region according to the current invention.

Figure 30:
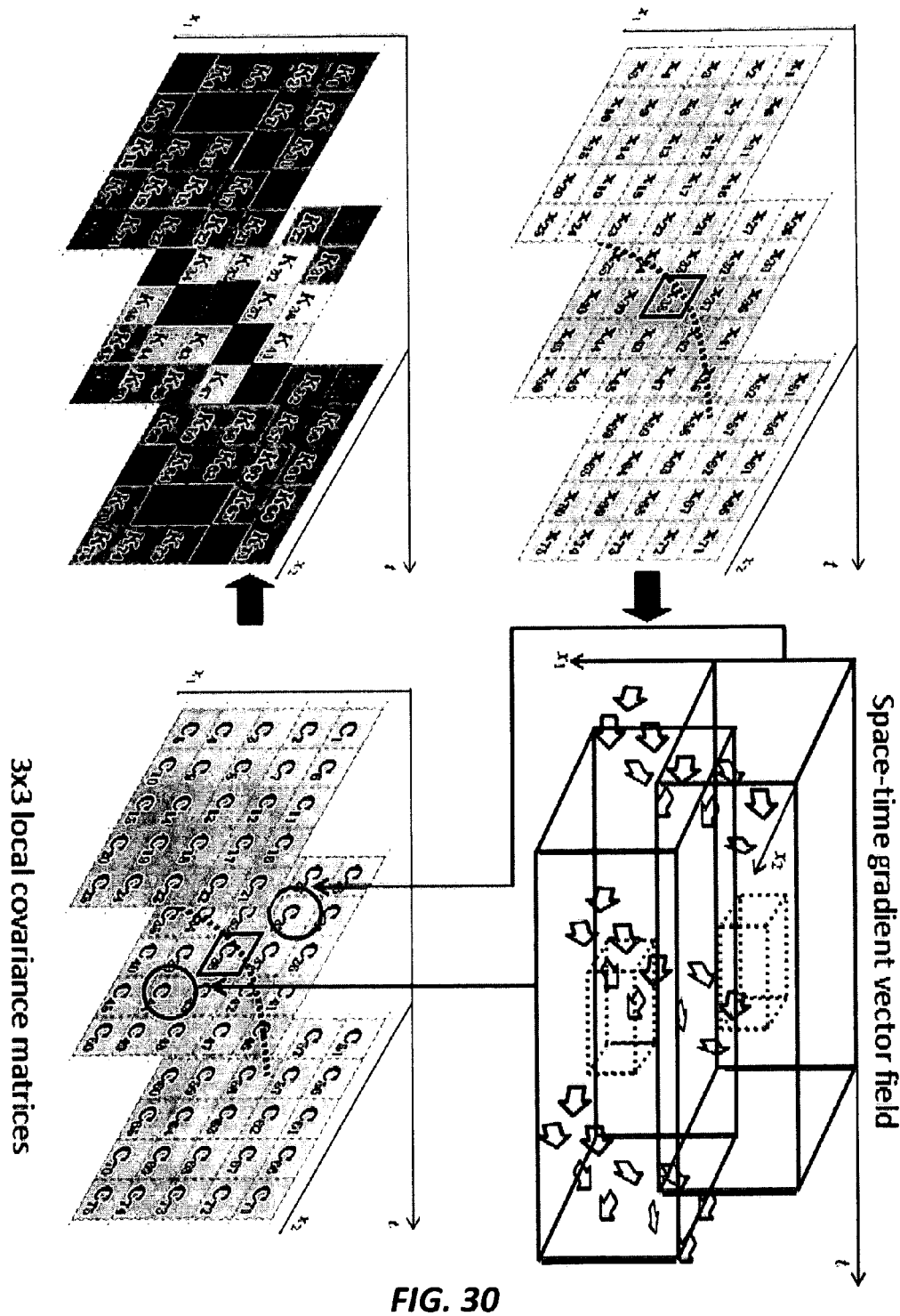

FIG. 30 shows how 3-D LSKs are computed in a space-time region according to the current invention.

Figure 31:
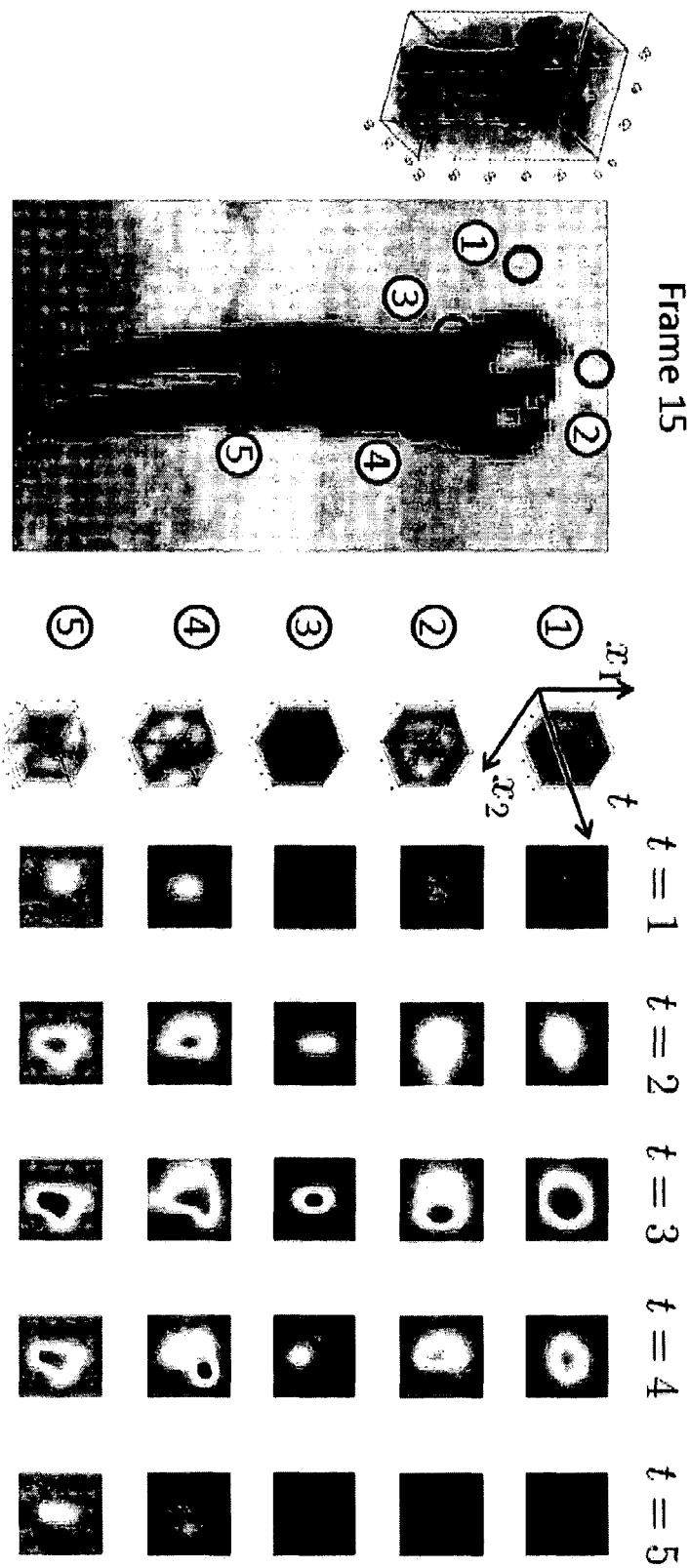

FIG. 31 shows examples of 3-D local steering kernels capturing 3-D local underlying geometric structure in various space-time regions according to the current invention.

Figure 32:
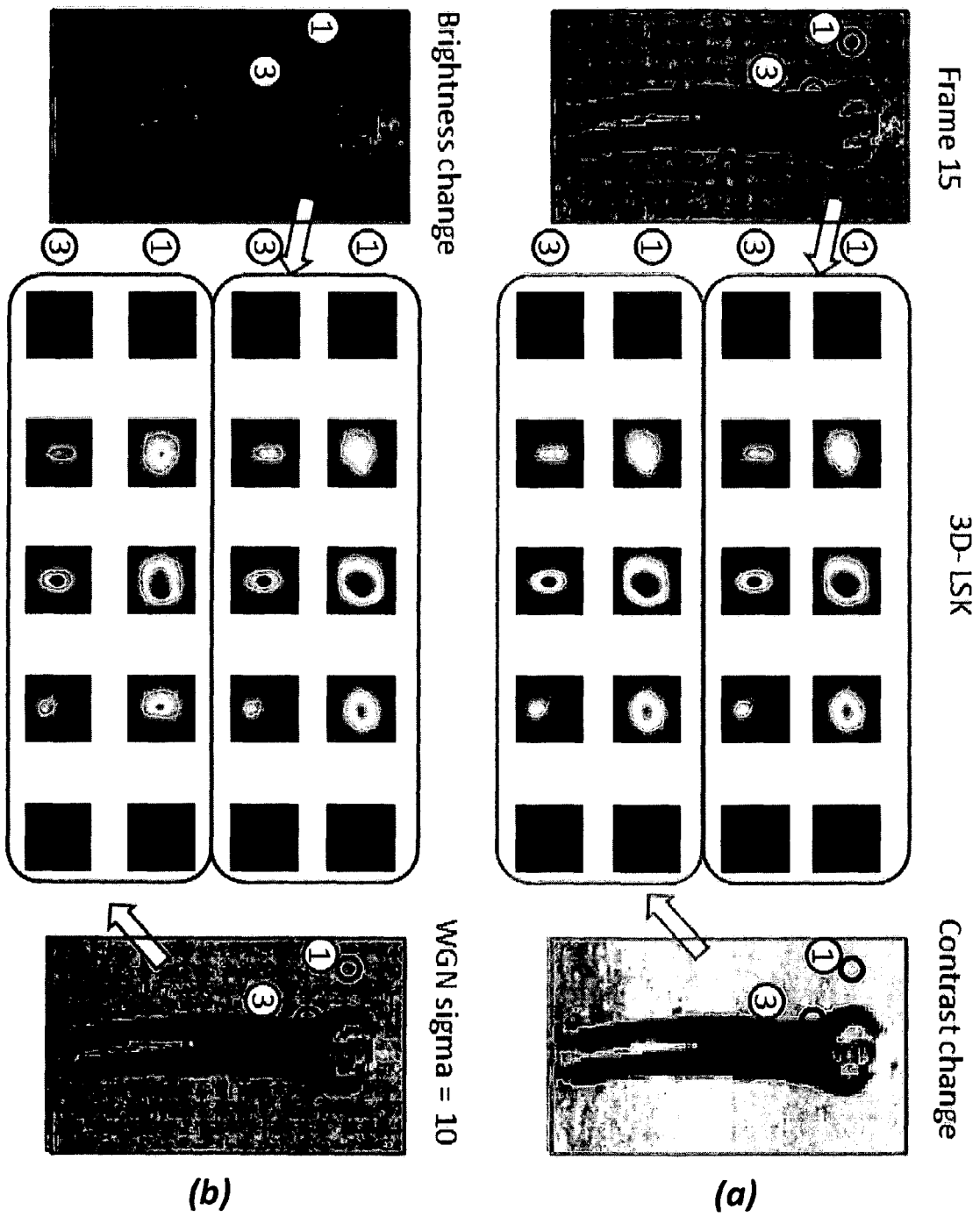

FIGS. 32(a)-32(b) shows normalization of the kernel function yields invariance to brightness change and robustness to contrast change according to the current invention.

FIGS. 33(a)-33(b) show that a collection of 3-D LSKs reveals global space-time geometric information according to the current invention.

FIGS. 34(a)-34(b) show some example video sequences (Weizman dataset) where 3-D LSKs were computed and plots of the bin density according to the current invention.

FIGS. 35(a)-36(b) show examples of top 4 principal components in $A_Q$ for various actions such as surfing, diving hand waving, and bending actions according to the current invention.

Figure 37:
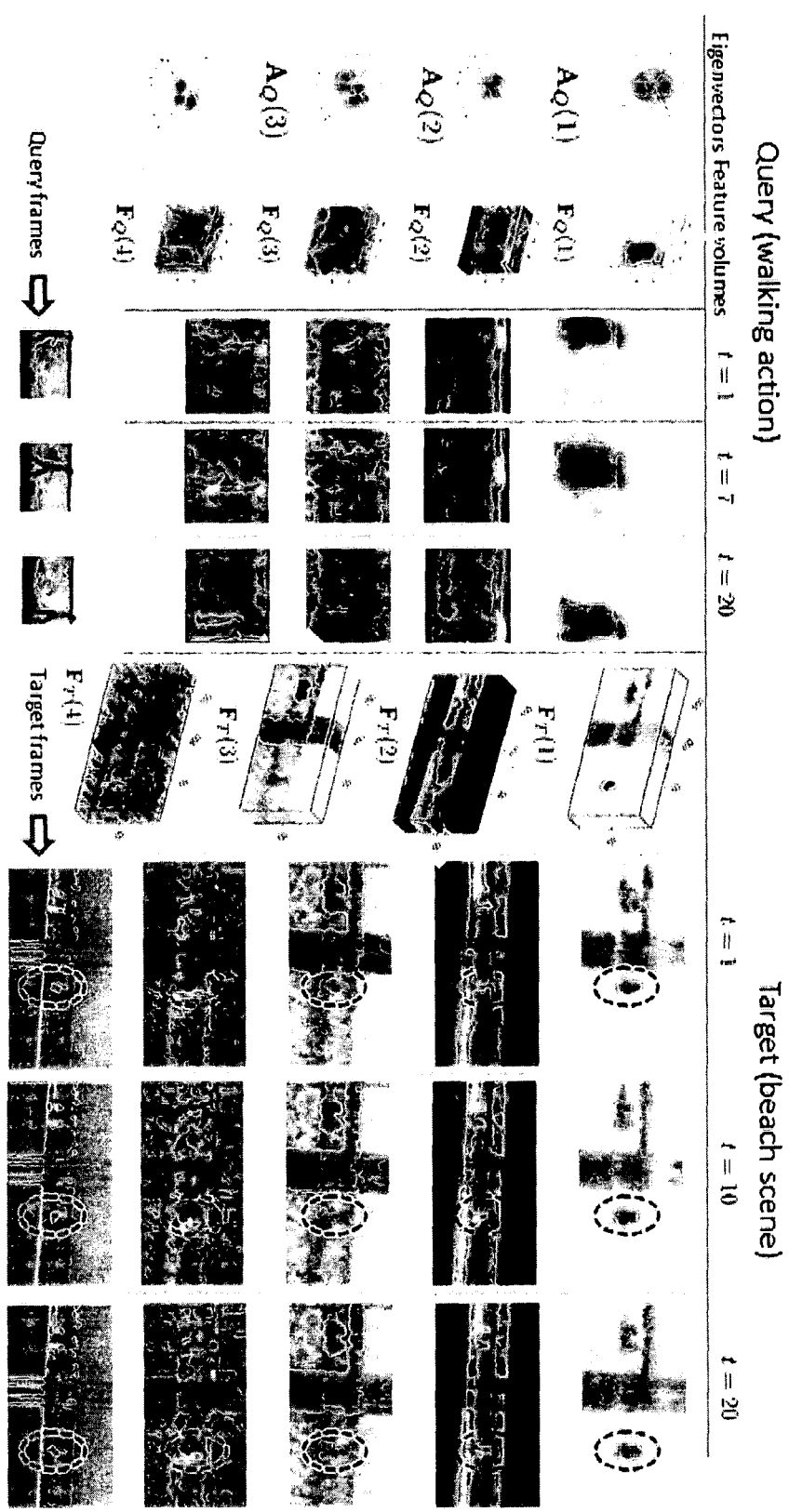
Figure 37:
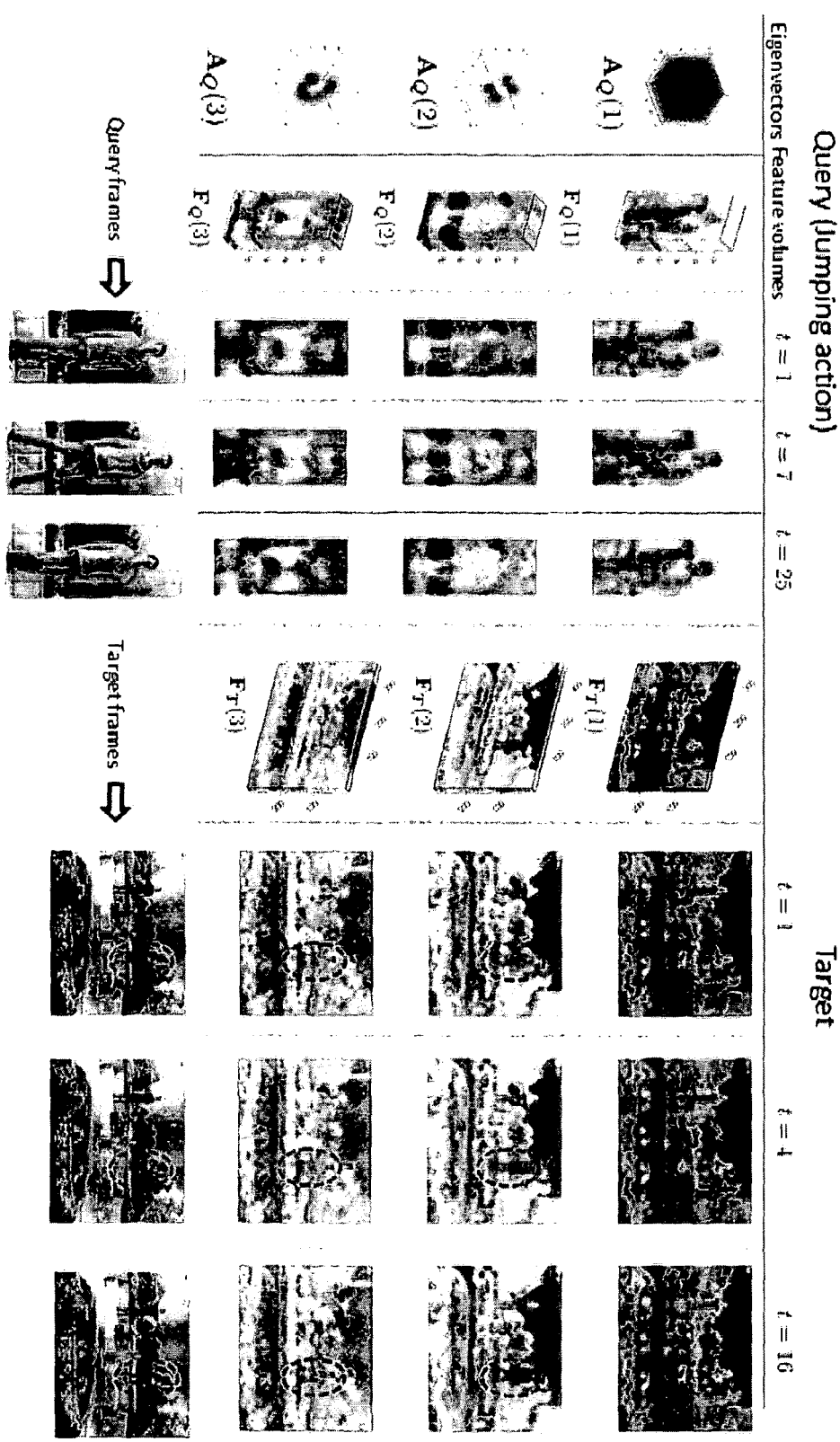

FIGS. 37(a)-37(b) show $A_Q$ learned from a collection of 3-D LSKs $W_Q$, and Feature of $F_Q$ and $F_T$ are computed from query Q and target video T respectively according to the current invention.

Figure 38:
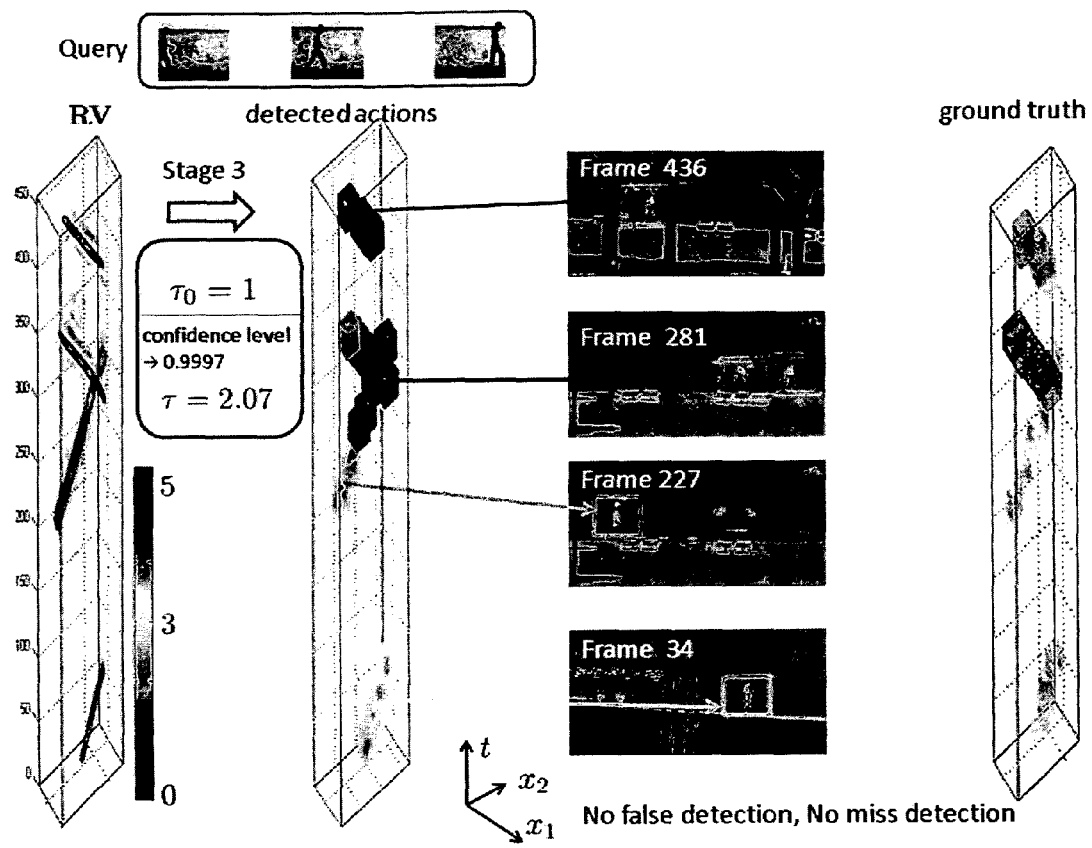

FIG. 38 shows results of searching for walking persons on the beach according to the current invention.

Figure 39:
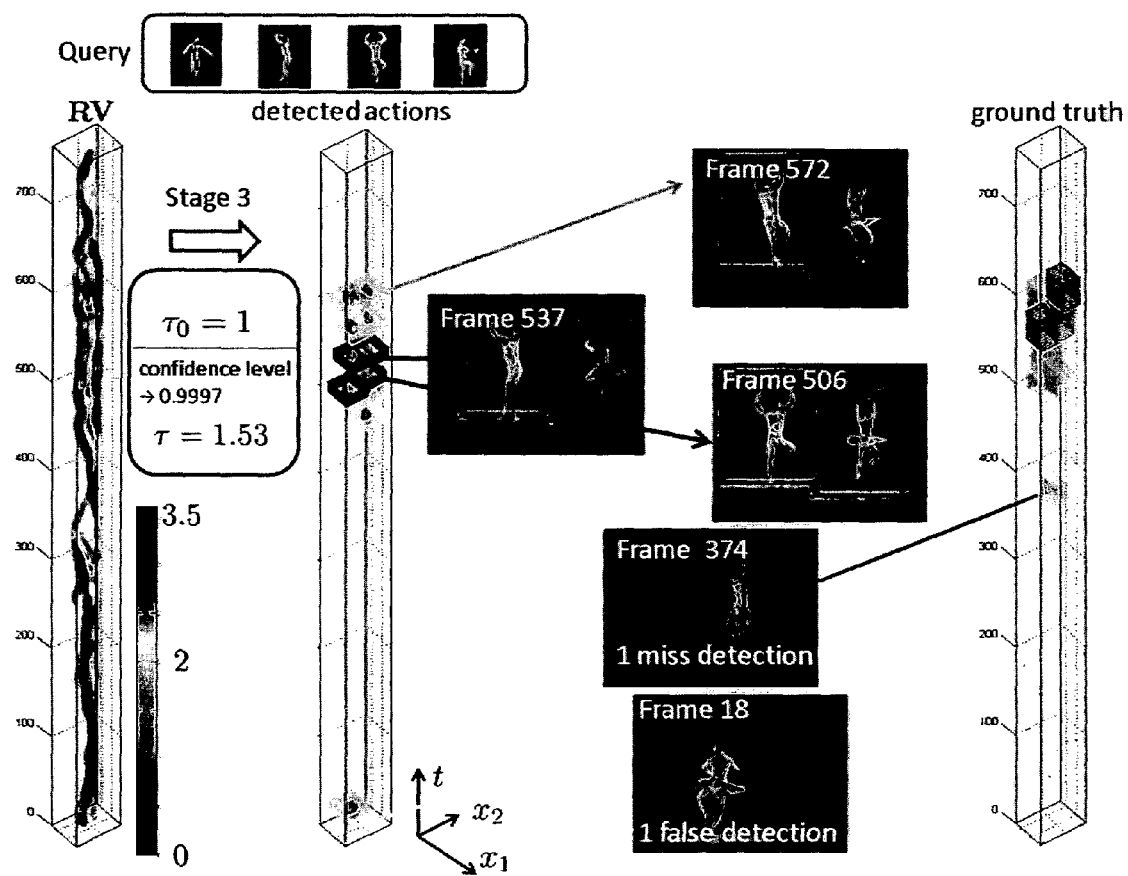

FIG. 39 shows results of searching ballet turn on the ballet video according to the current invention.

Figure 40:
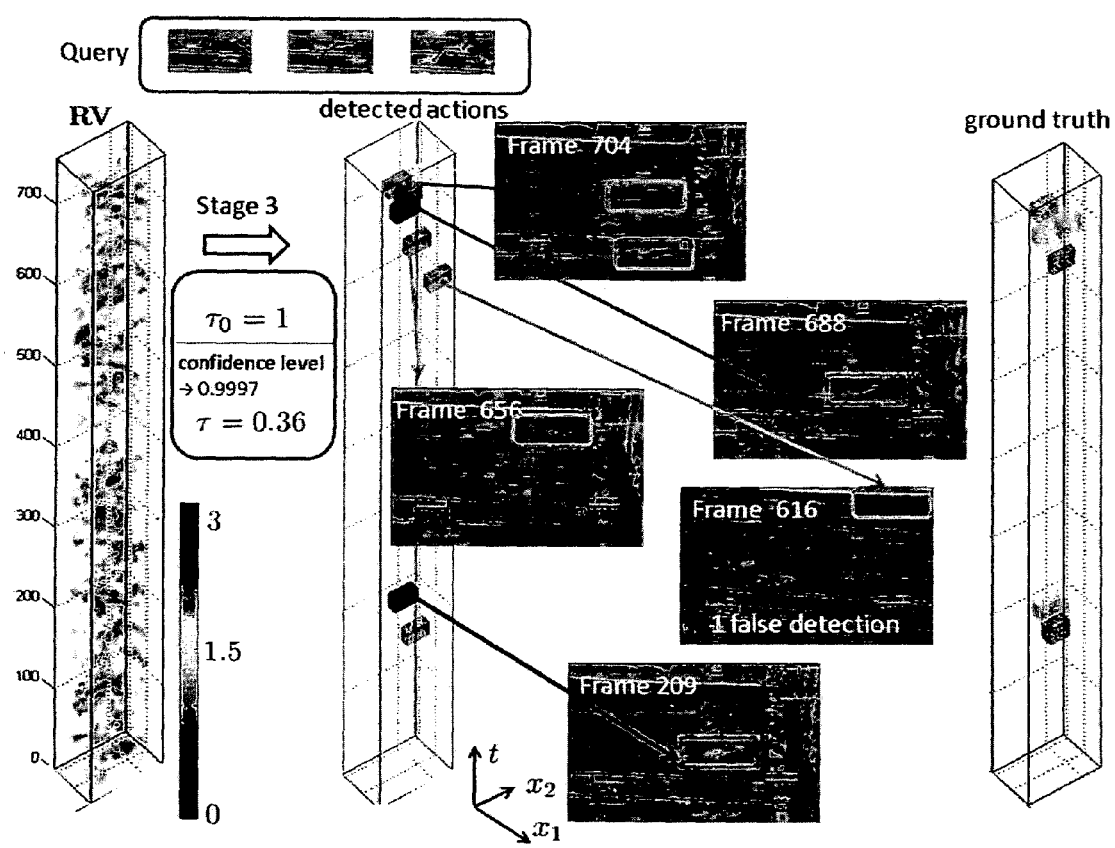

FIG. 40 shows results of detecting diving action in a target Olympic relay-match video according to the current invention.

Figure 41:
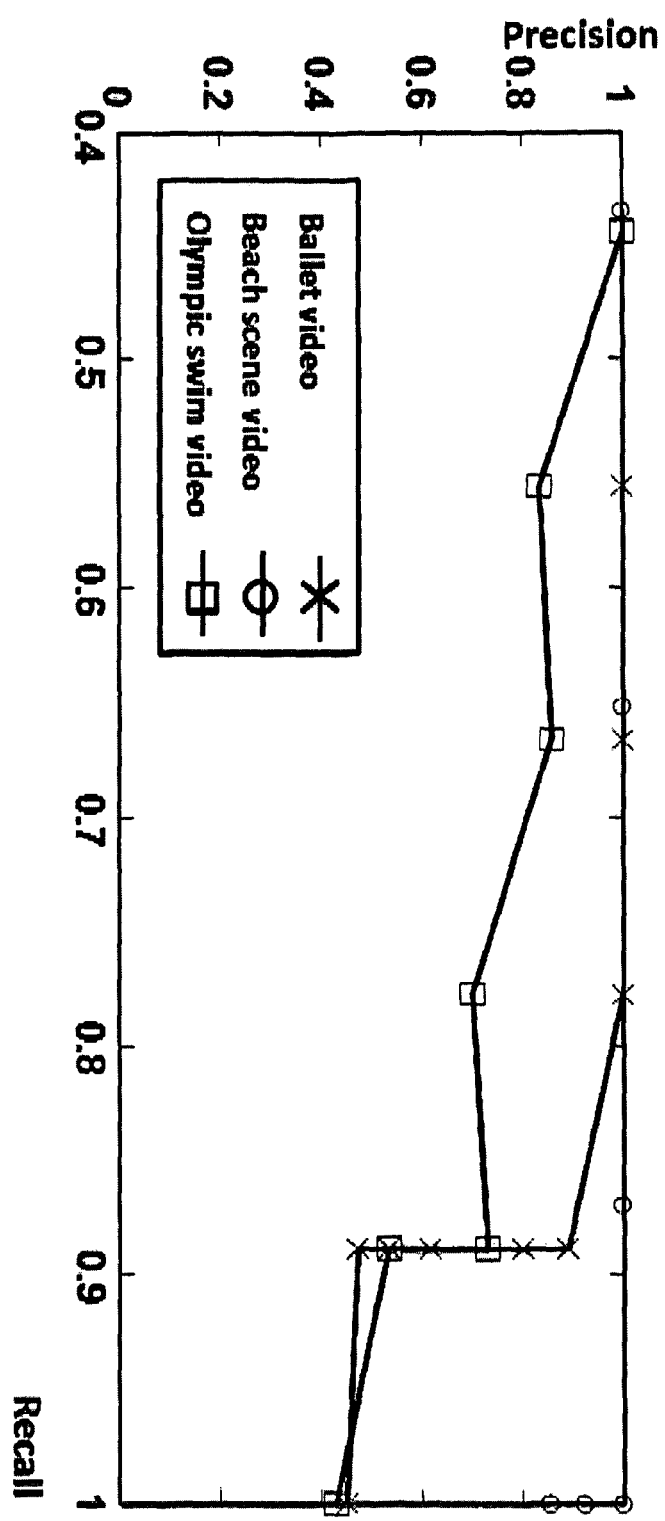

FIG. 41 shows the quantitative performance of the current invention (Precision-Recall curves).

Figure 42:
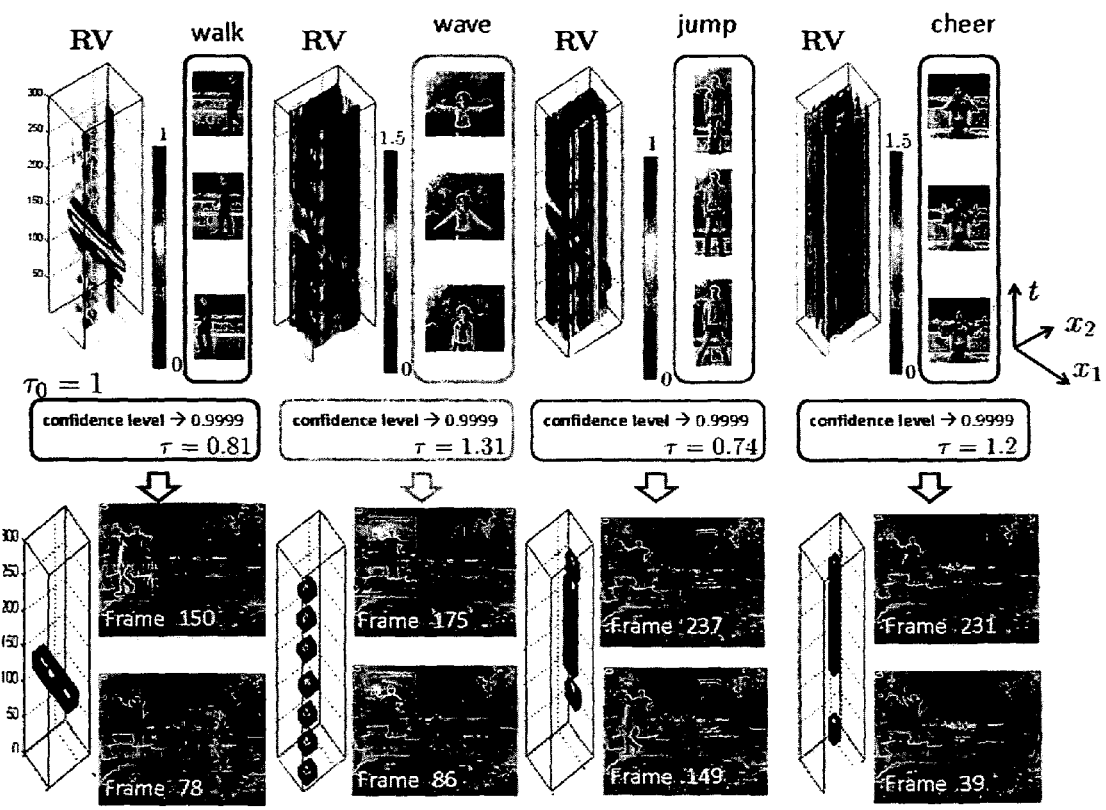

FIG. 42 shows the results of detecting 4 different actions (walk, wave, cheer, and jump), which occur simultaneously in a target video according to the current invention.

Figure 43:
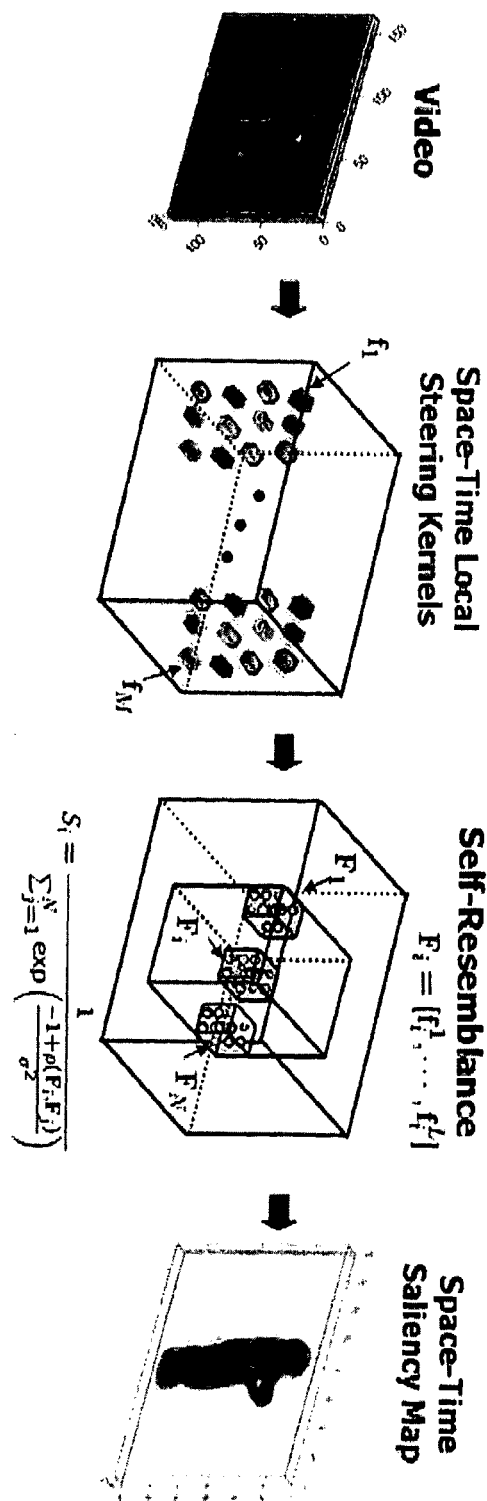

FIG. 43 shows a graphical overview of space-time saliency detection system according to the current invention.

FIGS. 44(a)-44(b) show space-time saliency maps S generated by computing self-resemblance measure according to the current invention.

FIG. 45 shows the confusion matrix for the method on the Weizmann action dataset according to the current invention.

FIGS. 46(a)-46(b) the confusion matrices from the current method on the KTH action for each scenario and the average confusion matrix across all scenarios.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

In one aspect the present invention is a generic detection/localization algorithm capable of searching for a visual object of interest without training. The method of the current invention operates using a single example of an object of interest to find similar matches, where it does not require prior knowledge (learning) about objects being sought and does not require segmentation or pre-processing of a target image. The method is based on the computation of local regression kernels (LSKs) as descriptors from a query, which measure the likeness of a pixel to its surroundings. Salient features are extracted from the descriptors and compared against analogous features from the target image. This comparison is done using a matrix generalization of the cosine similarity measure. The algorithm yields a scalar resemblance map, indicating the likelihood of similarity between the query and all patches in the target image. By employing nonparametric significance tests and non-maxima suppression, the presence and location of objects similar to the given query are detected. The approach is extended to account for large variations in scale and rotation. High performance is demonstrated on several challenging real-world datasets, indicating successful detection of objects in diverse contexts and under different imaging conditions. This framework is also extended to 3-D for such applications as action detection and action recognition using 3-D LSKs.

One aspect of the current invention resolves the detection/localization problem of searching for an object of interest (for instance a picture of a face) within other "target" images with only a single "query" image. In order to avoid the disadvantages of learning-based methods, which require a large amount of training examples, can result in over-fitting of parameters, and are generally slow in the training phase, the current invention uses a novel and sophisticated feature and a reliable similarity measure for comparing a collection of features. In general, the target images may contain such similar objects (say other faces) but these will typically appear in completely different context and under different imaging conditions. Examples of such differences can range from rather simple optical or geometric differences (such as occlusion, differing view-points, lighting, and scale changes); to more complex inherent structural differences such as for instance a hand-drawn sketch of a face rather than a real face as shown in FIG. 3(a).

Figure 4:
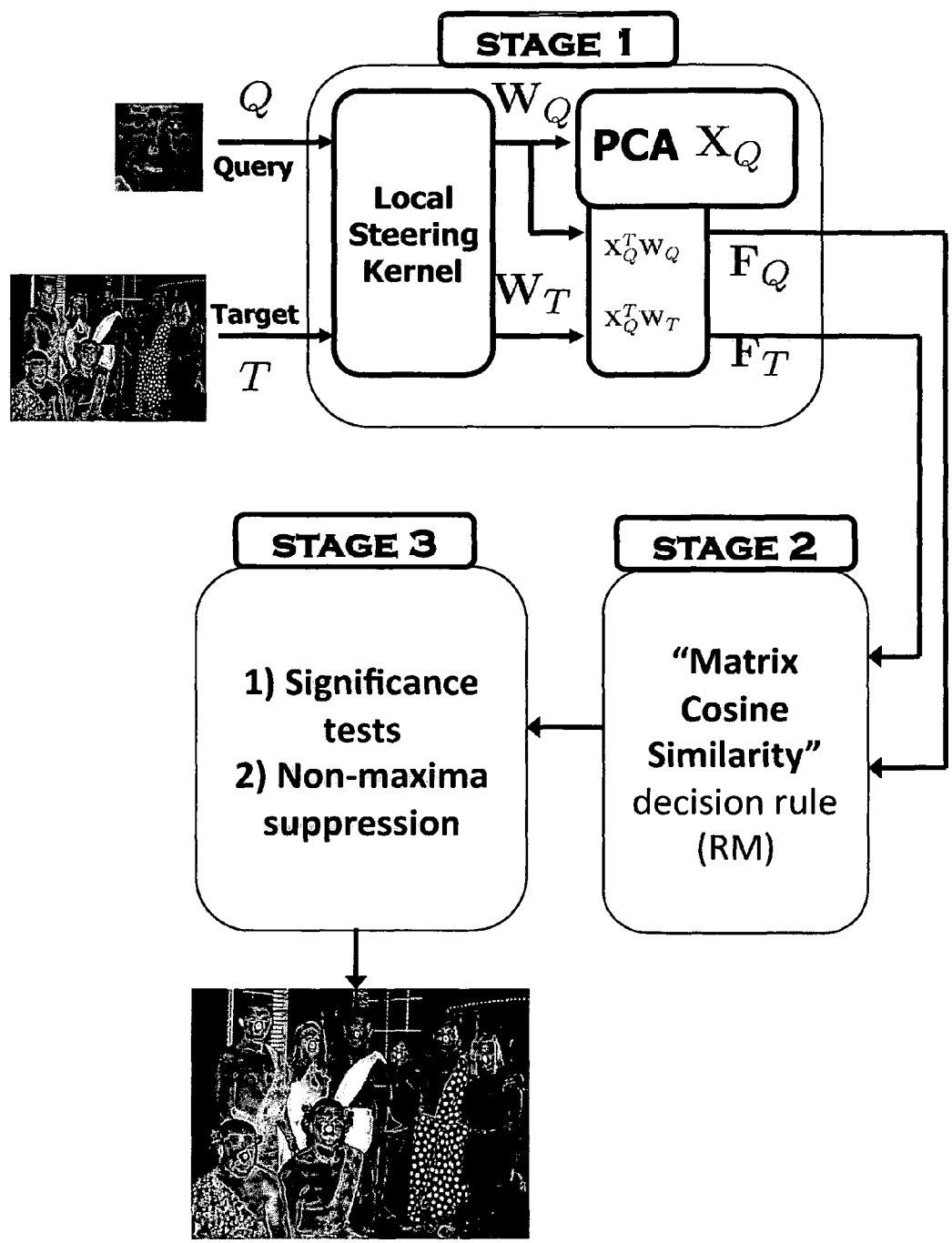
FIG. 4 shows a flow diagram of the local steering kernel system overview according to the current invention.

FIG. 4 shows a flow diagram of the local steering kernel system overview according to the current invention, where the current invention addresses the object detection task in a two-fold approach. First, the invention uses local regression kernels as features, which capture the underlying local structure of the data exceedingly well, even in the presence of significant distortions. Second, a novel approach to the detection problem is provided using a non-parametric nearest-neighbor classifier, along with a generalization of the cosine similarity to the matrix case. The localized nonlinear filters adapt themselves to the underlying structure of the image in order to very effectively perform denoising, interpolation, and even deblurring. The fundamental component of the steering kernel regression method is the calculation of the local steering kernel (LSK) which essentially measures the local similarity of a pixel to its neighbors both geometrically and radiometrically. The key idea is to robustly obtain local data structures by analyzing the radiometric (pixel value) differences based on estimated gradients, and use this structure information to determine the shape and size of a canonical kernel. Denoting the target image (T), and the query image (Q), a dense set of local steering kernels from each are computed. These densely computed descriptors are highly informative, but taken together tend to be over-complete (redundant). Therefore, features are derived by applying dimensionality reduction, namely PCA, to these resulting arrays, in order to retain only the salient characteristics of the local steering kernels. Generally, T is bigger than the query image Q. Hence, the target image T is divided into a set of overlapping patches, which are the same size as Q and assign a class to each patch ($T_i$). The feature vectors which, belong to a patch, are thought of as training examples in the corresponding class (See FIGS. 5(a)-5(b)). The feature collections from Q and $T_i$ form feature matrices $F_Q$ and $F_{T_i}$. The feature matrices $F_{T_i}$ and $F_Q$ are compared from $i^{th}$ patch of T and Q to look for matches. The invention draws on cosine similarity over the conventional Euclidean distance to employ and justify the use of "Matrix Cosine Similarity" as a similarity measure which generalizes the cosine similarity between two vectors to the matrix case. The optimality properties of the proposed approach are illustrated using a naive Bayes framework, which leads to the use of the Matrix Cosine Similarity (MCS) measure. Furthermore, this measure is efficiently implemented using a nearest-neighbor formulation. In order to deal with the case where the target image may not include any objects of interest or when there are more than one object in the target, the invention uses Nonparametric significance testing and non-maxima suppression.

Referring again to FIG. 4, the first stage consists of computing the normalized LSKs $W_Q$, $W_T$ and obtaining the salient feature matrices $F_Q$, $F_T$. In the second stage, the feature matrices $F_{T_i}$ and $F_Q$ are compared using the Matrix Cosine Similarity measure. The final output is given after a sequence of significance tests, followed by non-maxima suppression.

Figure 6:
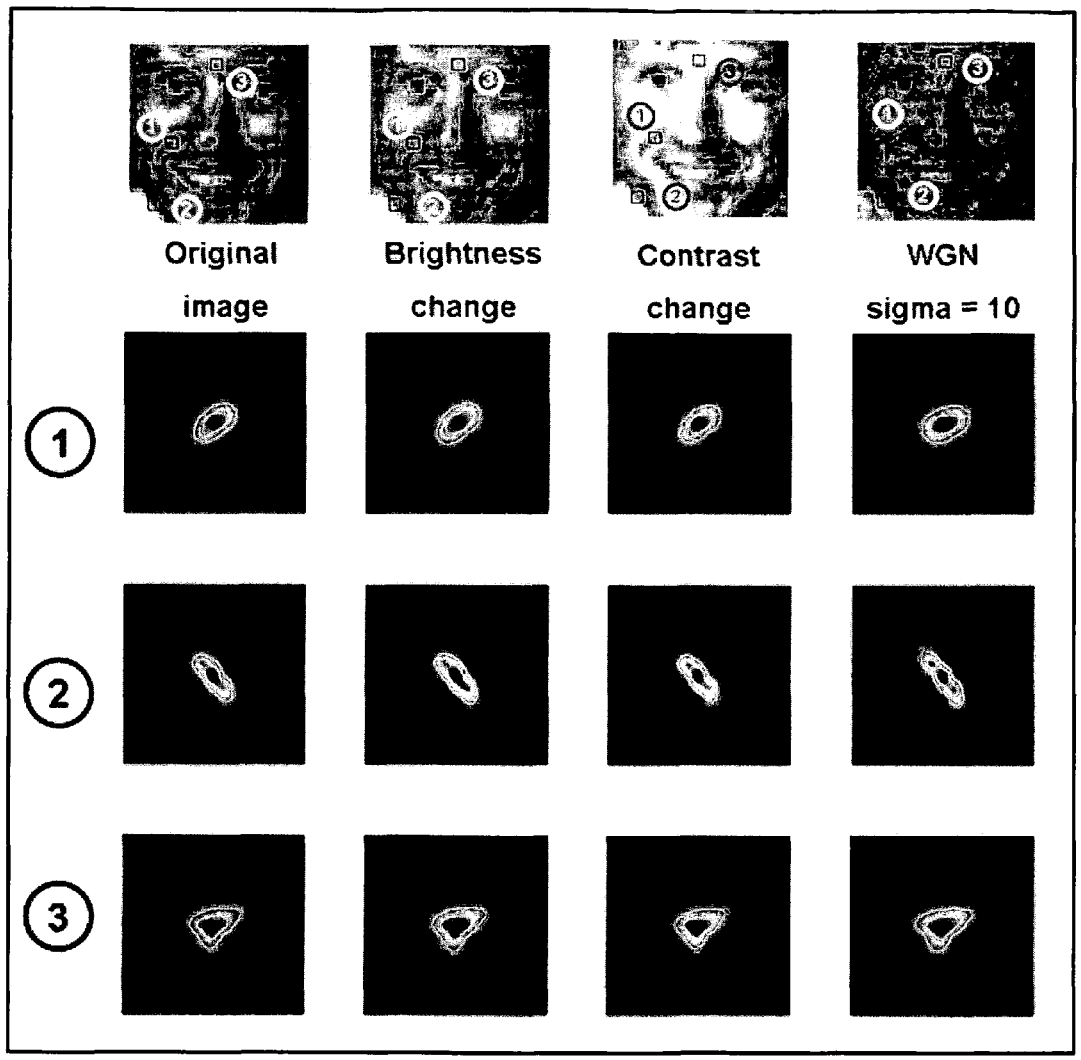
FIG. 6 shows invariance and robustness of local steering kernel weights $W(x_i-x; 2)$ in various challenging conditions according to the current invention.
Figure 9:
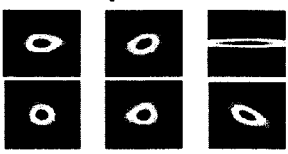

The current invention includes the following important aspects:

Since the calculation of local regression kernels is stable in the presence of uncertainty in the data, the approach of the current invention is robust even in the presence of noise. In addition, normalized local regression kernels provide a certain invariance to illumination changes as shown in FIG. 6, where shown is invariance and robustness of local steering kernel weights W(xi–x; 2) in various challenging conditions. Note that WGN means White Gaussian Noise. The current invention further applies Principal Components Analysis (PCA) to a collection of LSKs in order to learn the most salient features of the data. Further the invention simply uses "Matrix Cosine Similarity" which is a generalized version of the cosine similarity, which has been shown to outperform the conventional Euclidean distance for subspace learning and classification tasks. The invention uses "Canonical Cosine Similarity" in order to extend the framework to the case of vector data such as a color image, the Canonical Cosine Similarity is related to the concept of Canonical Correlation analysis. Additionally, the invention uses nearest-neighbor classification to solve the object detection problem and show that under the naive-Bayes assumption, theoretically optimal Bayes decision rule is approximated by the Matrix Cosine Similarity measure. The Bayes decision rule can be induced by the whitened cosine similarity under four strong assumptions. It is important to note that the current framework operates using a single example of an image of interest to find similar matches, and does not require any prior knowledge (learning) about objects being sought; and does not require any segmentation or pre-processing step of the target image. As will be shown, the framework is extendable to 3-D for such applications as action recognition, suspicious behavior detection etc. using an analogous 3-D local steering kernel.

According to the current invention, the key idea behind local steering kernel is to robustly obtain the local structure of images by analyzing the radiometric (pixel value) differences based on estimated gradients, and use this structure information to determine the shape and size of a canonical kernel. The local kernel K(•) is modeled as a radially symmetric function.

$$K(x_i - x; H_i) = \frac{K(H_i^{-1}(x_i - x))}{\det(H_i)}, i = 1, \ldots, P^2,$$

where $x_i=[x_{1_i}, x_{2_i}]^T$ is the spatial coordinates, $P^2$ is the number of pixels in a local window and the so-called steering matrix is defined as $$H_i = hC_i^{-1/2} \in \mathbb{R}^{(2 \times 2)},$$

where h is a global smoothing parameter, and the matrix $C_i$ is a covariance matrix estimated from a collection of spatial ($x_1$, $x_2$) gradient vectors within the local analysis window around a sampling position x. The steering matrix $H_i$ modifies the shape and size of the local kernel in a way which roughly encodes the local geometric structures present in the image as shown in FIG. 3(b), for example. With such steering matrices, a Gaussian function is chosen for $K(\cdot)$, which leads to the following form for the LSKs:

$$K(x_i - x; H_i) = \frac{\sqrt{\det(C_i)}}{2\pi h^2} \exp\left\{-\frac{(x_i - x)^T C_i (x_i - x)}{2h^2}\right\}$$

Some discussion of this choice is provided below. In what follows, at a position x, the invention will essentially be using (a normalized version of) the function $K(x_i-x; H_i)$ as a function of $x_i$ and $H_i$ to represent an image's inherent local geometry. To be more specific, the local steering kernel function $K^j(x_i-x; H_i)$ is densely calculated and normalized as follows $$W_Q^j(x_i - x) = \frac{K_Q^j(x_i - x; H_i)}{\sum_{i=1}^{P^2} K_Q^j(x_i - x; H_i)}, j \in [1, \ldots, n], i \in [1, \ldots, P^2],$$

$$W_T^j(x_i - x) = \frac{K_T^j(x_i - x; H_i)}{\sum_{i=1}^{P^2} K_T^j(x_i - x; H_i)}, j \in [1, \ldots, n_T], i \in [1, \ldots, P^2],$$

where n and $n_T$ are the number of LSKs in the query image Q and the target image T respectively.

It has been demonstrated that LSK based on the locally quadratic data model (regression order N=2) consistently outperforms steering kernels based on the locally constant and the locally linear model (regression order N=0 and N=1) in their kernel regression framework for the tasks of image denoising and interpolation. The so-called "equivalent kernel" formulation has been provided, which is a computationally more efficient and intuitive solution to kernel regression. To simplify the notation, the normalized local steering kernels are described with the regression order N as $W(x_i-x; N)$. It is observed that $2^{nd}$ order LSK $W(x_i-x; 2)$ provides better descriptive powers than $0^{th}$ order LSK $W(x_i-x; 0)$ and $1^{st}$ order LSK $W(x_i-x; 1)$ even in complex texture regions or in the presence of moderate levels of noise. Normalization of this kernel function yields invariance to brightness change and robustness to contrast change as shown in FIG. 6, where shown are invariance and robustness of local steering kernel weights W(xi-x; 2) in various challenging conditions. Note again that WGN means White Gaussian Noise. When large amounts of noise are present, the locally quadratic data model tends to be more sensitive to noise than the locally linear and the locally constant model. Hence, there is a trade-off between descriptive power of LSK and sensitivity to noise.

It has been shown that densely computed local image features give better results in classification tasks than key-point based local image features such as SIFT, which are designed for mainly invariance and compact coding. Accordingly, the distribution of the local image feature both in natural images as well as images of a specific object class follows a power-law (i.e., a long-tail) distribution. In other words, the features are scattered out in a high dimensional feature space, and thus there basically exists no dense cluster in the feature space. In order to illustrate and verify that the normalized LSKs also satisfy this property and follow a power-law distribution, an empirical bin density (100 bins) of the normalized LSKs is (using a total of 31319 LSKs) densely computed from 60 images (from Shechtman's general object dataset) using the K-means clustering method as shown in FIGS. 7(a)-7(b), where shown in FIG. 7(a) are some example images (Shechtman's object dataset) where LSKs were computed, and FIG. 7(b) shows plots of the bin density of LSKs and their corresponding low-dimensional features. It has been observed that while an ensemble of local features with little discriminative power can together offer a significant discriminative power, both quantization and informative feature selection on a long-tail distribution can lead to a precipitous drop in performance. Therefore, instead of any quantization and informative feature selection, reducing the dimension of LSKs using PCA to enhance the discriminative power and reduce computational complexity is the focus of the invention. This idea results in a new feature representation with a moderate dimension, which inherits the desirable discriminative attributes of LSK. The distribution of the resulting features sitting on the low dimensional manifold also tends to follow a power-law distribution as shown in FIG. 7(b) and this attribute of the features will be utilized in applying a nearest-neighbor approximation in the theoretical formulation discussed later. In order to organize $W_Q^j(x_i-x; N)$ and $W_T^j(x_i-x; N)$, which are densely computed from Q and T, let $W_Q$, $W_T$ be matrices whose columns are vectors $w_Q^j$, $w_T^j$ which are column-stacked (rasterized) versions of $W_Q^j(x_i-x; N)$, $W_T^j(x_i-x; N)$ respectively:

$$W_Q = [w_Q^1, \ldots, w_Q^n] \in \mathbb{R}^{P^2 \times n}, W_T = [w_T^1, \ldots, w_T^{n_T}] \in \mathbb{R}^{P^2 \times n_T}.$$

As described in FIG. 4, the next step is to apply $PCA_2$ to $W_Q$ for dimensionality reduction and to retain only its salient characteristics, where it is worth noting that the use of the PCA here is not critical in the sense that any unsupervised subspace learning method such as Kernel PCA, LLE, LPP, CDA, CPCA, and CEA can be used. Applying PCA to $W_Q$ we can retain the first (largest) d principal components, which form the columns of a matrix $X_Q = [x_{Q_1}, \ldots, x_{Q_d}] \in \mathbb{R}^{P^2 \times d}$. Typically, d is selected to be a small integer such as 3 or 4 so that 80 to 90% of the "information" in the LSKs would be retained (i.e., $$\frac{\sum_{i=1}^{d} \lambda_i}{\sum_{i=1}^{P^2} \lambda_i} \geq 0.8$$

(to 0.9) where $\lambda_i$ are the eigenvalues). Next, the lower dimensional features are computed by projecting $W_Q$ and $W_T$ onto $X_Q$:

$$F_Q = [f_Q^1, \ldots, f_Q^n] = X_Q^T W_Q \in \mathbb{R}^{d \times n}, F_T = [f_T^1, \ldots, f_T^{n_T}] = X_Q^T W_T \in \mathbb{R}^{d \times n_T}.$$

FIGS. 8(a)-8(c) and FIGS. 9(a)-9(c) illustrate the principal components in $X_Q$ and show what the features $F_Q$, $F_T$ look like for some examples such as face and car, where (a)'s show $X_Q$ learned from a collection of LSKs $W_Q$, (b)'s show feature row vectors of $F_Q$ from query Q, and (c)'s show feature row vectors $F_T$ from target image T. Eigenvectors and feature vectors were transformed to image and up-scaled for illustration purposes.

The next step in the current invention is a decision rule based on the measurement of a "distance" between the computed features $F_Q$, $F_{T_i}$. It has been shown that correlation based metrics perform better than the conventional Euclidean and Mahalanobis distances for the classification and the subspace learning tasks, and "Matrix Cosine Similarity" are introduced for the matrix case. In general, "correlation" indicates the strength and direction of a linear relationship between two random variables. The current invention is directed to two main types of correlation: The Pearson's correlation coefficient, which is the familiar standard correlation coefficient, and the cosine similarity (so-called non-Pearson-compliant). Note that the cosine similarity coincides with the Pearson's correlation when each vector is centered to have zero-mean. It has been shown that the Pearson correlation is less discriminating than the cosine similarity due to the fact that centered values are less informative than the original values, and the computation of centered values is sensitive to zero or small values in the vectors. Since the discriminative power is critical in the detection of the current invention's framework, the cosine similarity is focused on. The cosine similarity is defined as the inner product between two normalized vectors as follows:

$$\rho(\underline{f}_Q, \underline{f}_{T_i}) = \left\langle \frac{\underline{f}_Q}{\|\underline{f}_Q\|}, \frac{\underline{f}_{T_i}}{\|\underline{f}_{T_i}\|} \right\rangle = \frac{\underline{f}_Q^T \underline{f}_{T_i}}{\|\underline{f}_Q\|\|\underline{f}_{T_i}\|} = \cos\theta_i \in [-1, 1],$$

where $\underline{f}_Q, \underline{f}_{T_i} \in \mathbb{R}^d$ are column vectors. The cosine similarity measure therefore focuses only on the angle (phase) information while discarding the scale information.

Considering the features $F_Q, F_{T_i}$, which consist of a set of vectors, "Matrix Cosine Similarity" can be defined as a natural generalization using the "Frobenius inner product" between two normalized matrices as follows:

$$\rho(F_Q, F_{T_i}) = \langle \overline{F}_Q, \overline{F}_{T_i} \rangle_F = \text{trace}\left( \frac{F_Q^T F_{T_i}}{\|F_Q\|_F \|F_{T_i}\|_F} \right) \in [-1, 1],$$

where, $$\overline{F}_Q = \frac{F_Q}{\|F_Q\|_F} = \left[ \frac{\underline{f}_Q^1}{\|F_Q\|_F}, \ldots, \frac{\underline{f}_Q^n}{\|F_Q\|_F} \right] \text{ and}$$

$$\overline{F}_{T_i} = \frac{F_{T_i}}{\|F_{T_i}\|_F} = \left[ \frac{\underline{f}_{T_i}^1}{\|F_{T_i}\|_F}, \ldots, \frac{\underline{f}_{T_i}^n}{\|F_{T_i}\|_F} \right]$$

It is worth noting that this generalization is also known as "vector correlation" in the statistics literature, and it is also been used in a generalized cosine similarity to the tensor case for subspace learning, which showed performance improvement in the task of image classification. Returning to the definition, looking at if we look carefully at $$\rho(F_Q, F_{T_i}) = \langle \overline{F}_Q, \overline{F}_{T_i} \rangle_F = \text{trace}\left( \frac{F_Q^T F_{T_i}}{\|F_Q\|_F \|F_{T_i}\|_F} \right) \in [-1, 1],$$

it is interesting to note that one can rewrite it as a weighted average of the cosine similarities $\rho(\underline{f}_Q, \underline{f}_{T_i})$ between each pair of corresponding feature vectors (i.e., columns) in $F_Q, F_{T_i}$ as follows:

$$\rho(F_Q, F_{T_i}) = \sum_{l=1}^n \frac{\underline{f}_Q^{lT} \underline{f}_{T_i}^l}{\|F_Q\|_F \|F_{T_i}\|_F} = \sum_{l=1}^n \rho(\underline{f}_Q^l, \underline{f}_{T_i}^l) \frac{\|\underline{f}_Q^l\| \|\underline{f}_{T_i}^l\|}{\|F_Q\|_F \|F_{T_i}\|_F}.$$

The weights are represented as the product of $$\frac{\|\underline{f}_Q^l\|}{\|F_Q\|_F}$$

and $$\frac{\|\underline{f}_{T_i}^l\|}{\|F_{T_i}\|_F},$$

which indicate the relative importance of each feature in the feature sets $F_Q, F_{T_i}$. Here, an advantage of the "Matrix Cosine Similarity" takes care of the strength and angle similarity of vectors at the same time. Hence, this measure not only generalizes the cosine similarity, but also overcomes the disadvantages of the conventional Euclidean distance, which is sensitive to outliers. $\rho(F_Q, F_{T_i})$ is computed over M (a possibly large number of) target patches and this can be efficiently implemented by column-stacking the matrices $F_Q, F_{T_i}$ and simply computing the cosine similarity between two long column vectors as follows:

$$\rho_i \equiv \rho(F_Q, F_{T_i}) = \sum_{l=1}^n \frac{\underline{f}_Q^{lT} \underline{f}_{T_i}^l}{\|F_Q\|_F \|F_{T_i}\|_F}$$

$$= \sum_{l=1}^n \sum_{j=1}^d \frac{f_Q^{(l,j)} f_{T_i}^{(l,j)}}{\sqrt{\sum_{l=1}^n \sum_{j=1}^d |f_Q^{(l,j)}|^2} \sqrt{\sum_{l=1}^n \sum_{j=1}^d |f_{T_i}^{(l,j)}|^2}}$$

$$= \rho(\text{colstack}(F_Q), \text{colstack}(F_{T_i})) \in [-1, 1],$$

where $f_Q^{(l,j)}, f_{T_i}^{(l,j)}$ are elements in $l^{th}$ vector $\underline{f}_Q^l$ and $\underline{f}_{T_i}^l$ respectively, and colstack(•) means an operator which column-stacks (rasterizes) a matrix.

It will be shown later that this idea enables further generalization of the cosine similarity to a "Canonical Cosine Similarity" which is a corresponding version of the canonical correlation analysis (CCA) for the vector data case where we have a set of features separately computed from multiple sources (for instance, color image (YCbCr or CIE L*a*b*) or a sequence of images). It will also be shown that a particular version of optimal Naive-Bayes decision rule can actually lead to the use of "Matrix Cosine Similarity" (MCS) measure. The next step is to generate a so-called "resemblance map" (RM), which will be an image with values indicating the likelihood of similarity between the Q and T. When it comes to interpreting the value of "correlation", $\rho_i^2 \in [0, 1]$ describes the proportion of variance in common between the two feature sets as opposed to $\rho_i$, which indicates a linear relationship between two feature matrices $F_Q, F_{T_i}$. Here, $\rho_i$ is used directly as a measure of resemblance between the two feature sets. However, the shared variance interpretation of $\rho_i^2$ has several advantages. In particular, as for the final test statistic comprising the values in the resemblance map, we use the proportion of shared variance ($\rho_i^2$) to that of the "residual" variance ($1-\rho_i^2$). More specifically, RM is computed using the mapping function f as follows:

$$RM: f(\rho_i) = \frac{\rho_i^2}{1-\rho_i^2}.$$

In FIGS. 10(a)-10(b), examples of resemblance map (RM) based on $|\rho_i|$ and $f(\rho_i)$ are presented. FIG. 10(a) shows a resemblance map (RM) which consists of $|\rho_i|$, and FIG. 10(b) Resemblance map (RM) which consists of $f(\rho_i)$. Note that Q and T are the same examples shown in FIG. 5. The small annulus regions represent higher resemblance. As is apparent from these typical results, qualitatively, the resemblance map generated from $f(\rho_i)$ provides better contrast and dynamic range in the result ($f(\rho_i) \in [0, \infty]$). More importantly, from a quantitative point of view, it is noted that $f(\rho_i)$ is essentially the Lawley-Hotelling Trace statistic, which is used as an efficient test statistic for detecting correlation between two data sets. Furthermore, it is worth noting that historically, this statistic has been suggested in the pattern recognition literature as an effective means of measuring the separability of two data clusters.

If the task is to find the most similar patch ($T_i$) to the query (Q) in the target image, one can choose the patch, which results in the largest value in the RM (i.e., max $f(\rho_i)$) among all the patches, no matter how large or small the value is in the range of $[0, \infty]$. This, however, is not wise because there may not be any object of interest present in the target image. Therefore two types of significance tests are of interest. The first is an overall test to decide whether there is any sufficiently similar object present in the target image at all. If the answer is yes, it is desirable to know how many objects of interest are present in the target image and where they are. Therefore, two thresholds are needed: an overall threshold $\tau_o$ and a threshold $\tau$ to detect the possibly multiple objects present in the target image.

Figure 11:
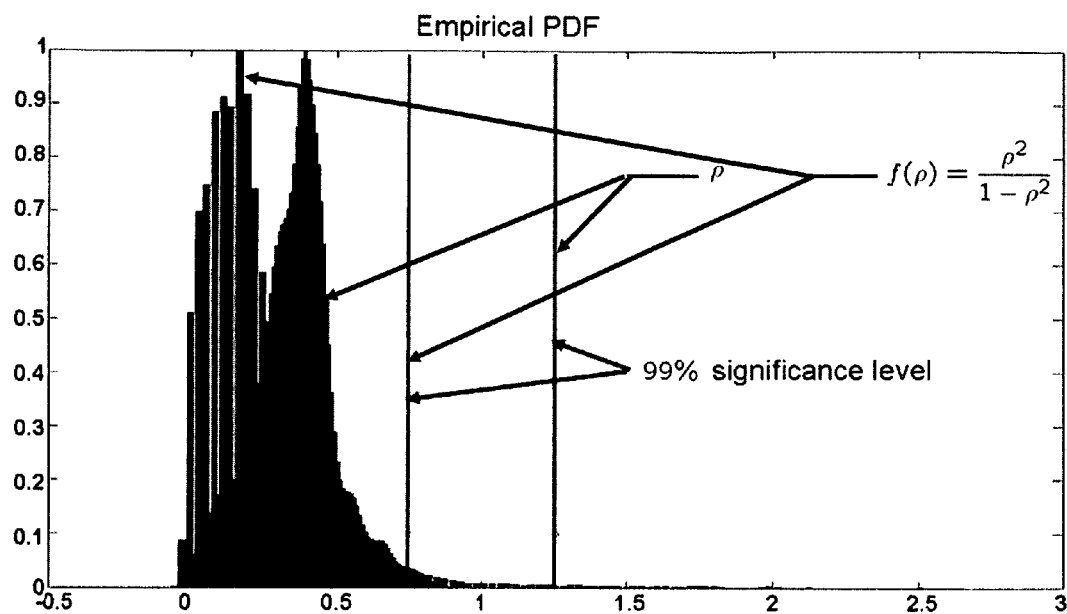
FIG. 11 shows a comparison of empirical PDF between $\rho$ and $$\frac{\rho^2}{1-\rho^2}.$$

In a typical scenario, the overall threshold $\tau_o$ is set to be, for instance 0.96, which is about 50% of variance in common (i.e., $\rho_2 = 0.49$). In other words, if the maximal $f(\rho_i)$ is just above 0.96, it is decided that there exists at least one object of interest. The next step is to choose $\tau$ based on the properties of $f(\rho_i)$. When it comes to choosing the $\tau$, there is need to be more careful. If a basic knowledge of the underlying distribution of $f(\rho_i)$ is available, then predictions can be made about how this particular statistic will behave, and thus it is relatively easy to choose a threshold which will indicate whether the pair of features from the two images are sufficiently similar. But, in practice, good way to model the distribution of $f(\rho_i)$ is not available. Therefore, instead of assuming a type of underlying distribution, the idea of nonparametric testing is used. An empirical PDF is computed from M samples $f(\rho_i)$ and $\tau$ is set so as to achieve, for instance, a 99% confidence level in deciding whether the given values are in the extreme (right) tails of the distribution. This approach is based on the assumption that in the target image, most of patches do not contain the object of interest, and therefore, the few matches will result in values which are in the tails of the distributions of $f(\rho_i)$, where yet another justification for using $f(\rho_i)$ instead of $\rho_i$ is the observation that the empirical PDF of $\rho_i$ is itself heavy-tailed, making the detection of rare events more difficult. The use of $f(\rho_i)$ instead tends to alleviate this problem as shown in FIG. 11, which shows a comparison of empirical PDF between $\rho$ and $$\frac{\rho^2}{1-\rho^2}.$$

Figure 12:
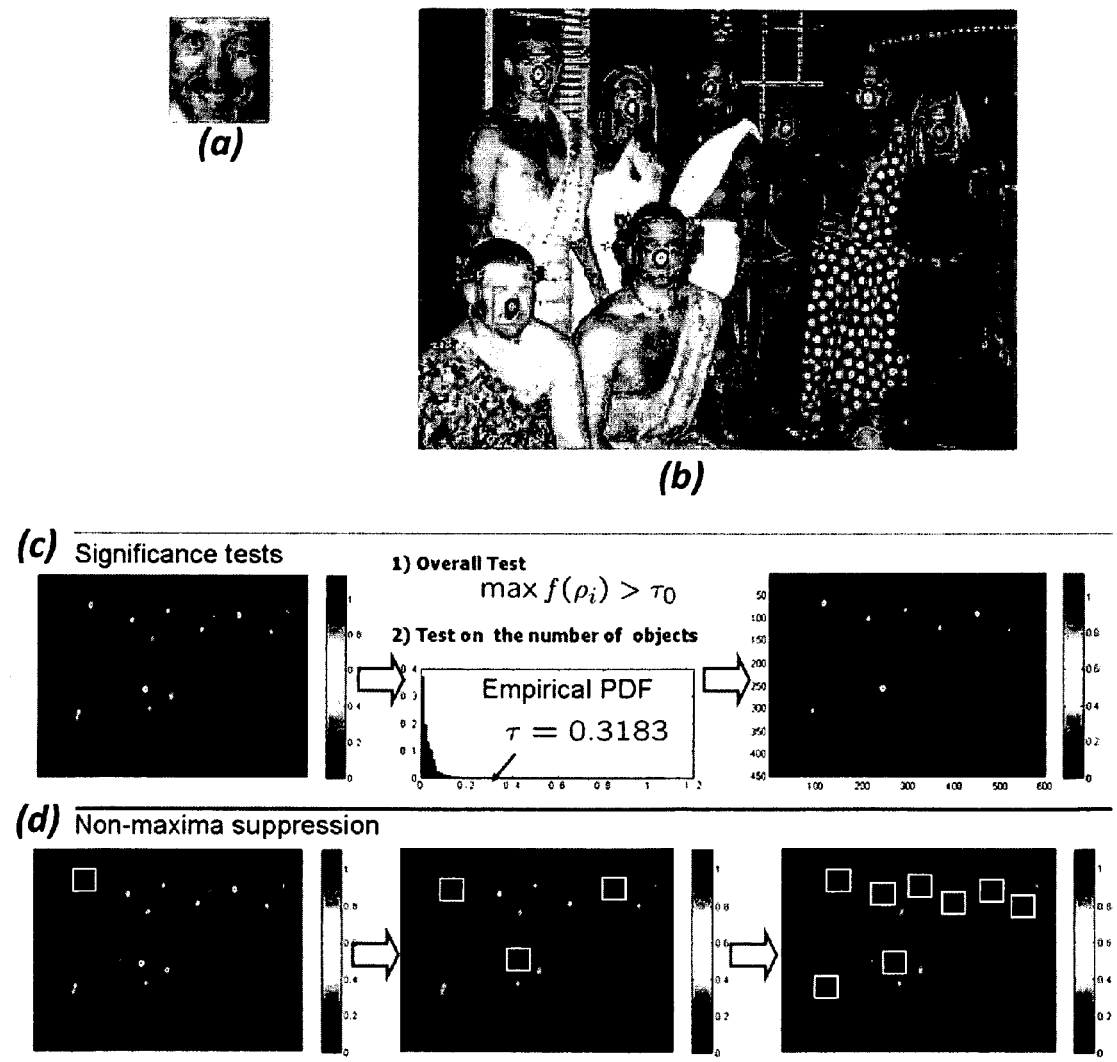

After the two significance tests with $\tau_o$, $\tau$ are performed, the idea of non-maxima suppression is employed for the final detection. The region with the highest $f(\rho_i)$ value is taken and the possibility that any other object is detected within some radius of the center of that region is estimated again, where the size of this "exclusion" region will depend on the application at hand and the characteristics of the query image. This enables one to avoid multiple false detections of nearby objects already detected. Then we iterate this process until the local maximum value falls below the threshold $\tau$. FIGS. 12(a)-12(c) show the graphical illustration of significance tests and non-maxima suppression idea, where FIG. 12(a) shows Query, FIG. 12(b) shows target with detection, FIG. 12(c) shows two significance tests and FIG. 12(d) shows non-maxima suppression.

As previously described, the current invention provides a method to detect an object (or objects) of interest in the target image given a single query. Here, the naive-Bayes approach in a multiple hypothesis testing framework leads to the Matrix Cosine Similarity-based decision rule. As described earlier, the target image T is divided into a set of overlapping patches and a class is assigned to each patch. The task at hand is to figure out which class (i) the features from Q are most likely to have come from. Since the class-conditional pdf (p($F_Q$|class)) is not known of the normalized features extracted from Q, the goal is to estimate it using a kernel density estimation method. Once these estimates are attained, the maximum likelihood (ML) decision rule boils down to Matrix Cosine Similarity, which can be efficiently implemented using a nearest neighbor formulation.

By associating each patch ($T_i$) of the target image with a hypothesis, the case now exists where one can discriminate between M hypotheses ($\mathcal{H}_0, \ldots, \mathcal{H}_{M-1}$) as follows:

$\mathcal{H}_0$: Q is similar to $T_0 \Leftrightarrow F_Q$ comes from class 0 ($F_{T_0}$),
$\mathcal{H}_1$: Q is similar to $T_1 \Leftrightarrow F_Q$ comes from class 1 ($F_{T_1}$).

. .
. .
. .

$\mathcal{H}_{M-1}$: Q is similar to $T_{M-1} \Leftrightarrow F_Q$ comes from class M-1($F_{T_{M-1}}$).

The classic Bayes risk formulation provides the proper framework for this multi-hypothesis testing problem. The Bayes cost is as follows:

$$\mathcal{R} = \sum_{i=0}^{M-1} \sum_{j=0}^{M-1} C_{ij} P(\mathcal{H}_i | \mathcal{H}_j) P(\mathcal{H}_j),$$

where $C_{ij}$ is the penalty associated with choosing hypothesis i when j is true. Given the query features $F_Q$, a decision rule that minimizes R must be derived. R can be simplified with the particular choice $$C_{ij} = \begin{cases} 0 & i = j \\ 1 & i \neq j \end{cases}$$

as:

$$\mathcal{R}(\overline{F}_Q) = \sum_{j=0, i \neq j}^{M-1} C_{ij} P(\mathcal{H}_j | \overline{F}_Q) = \sum_{j=0}^{M-1} P(\mathcal{H}_j | \overline{F}_Q) - P(\mathcal{H}_i | \overline{F}_Q)$$

over $i = 0, 1, \ldots, M-1$.

Since $P(\mathcal{H}_i)$ is independent of $j$, $\mathcal{R}(\overline{F}_Q)$ is minimized by maximizing $P(\mathcal{H}_i | \overline{F}_Q)$. Therefore, the maximum a posterior (MAP) decision rule for multiple hypothesis testing is as follows:

$$\hat{\mathcal{H}}_i = \arg\max_i P(\mathcal{H}_i | \overline{F}_Q) = \arg\max_i \frac{p(\overline{F}_Q | \mathcal{H}_i) P(\mathcal{H}_i)}{p(\overline{F}_Q)}.$$

Assuming that the prior probabilities $P(H_i)$ are equal, then the MAP decision rule boils down to the M-ary maximum likelihood (ML) decision rule.

$$\hat{\mathcal{H}}_i = \arg\max_i P(\mathcal{H}_i | \overline{F}_Q) = \arg\max_i p(\overline{F}_Q | \mathcal{H}_i) = \arg\max_i p(\overline{F}_Q | \overline{F}_{T_i}).$$

Since the conditional probability density function $p(\overline{F}_Q | \mathcal{H}_i)$ is not known of features $\overline{F}_Q$ given the features $\overline{F}_{T_i}$ of the target patch $T_i$, one needs to estimate it using a kernel density estimation method, which results in the naive or empirical Bayes approach.

Regarding the locally data-adaptive kernel density estimation, the Parzen density estimator is a simple and generally accurate non-parametric density estimation method. However, if the true conditional density to model is close to a "non-linear" lower dimensional manifold embedded in the higher dimensional feature space, Parzen density estimator with an isotropic kernel is not the most appropriate method. As discussed above, the features $\overline{F}_Q$, $\overline{F}_{T_i}$ tend to generically come from long-tailed distributions, and as such, there are generally no tight clusters in the feature space. When estimating a probability density at a particular point, for instance $\overline{f}_Q^l$, the isotropic kernel centered on that point will spread its density mass equally along all the feature space directions, thus giving too much emphasis to irrelevant regions of space and too little along the manifold. Therefore, a locally data-adaptive version of the kernel density estimator is used. The estimated conditional density $\hat{p}(\overline{F}_Q | \mathcal{H}_i)$ is defined as a sum of kernels (weight functions) centered at the features $\overline{f}_{T_i}$ in $T_i$ which belongs to the hypothesis $H_i$. More specifically, $$\hat{p}(\overline{F}_Q | \mathcal{H}_i) = \frac{\sum_{j=1}^n K^j\left(\overline{f}_Q^l - \overline{f}_{T_i}^j, l_Q^l - l_{T_i}^j\right)}{\sum_{l \in \Omega_Q} \sum_{j=1}^n K^j\left(\overline{f}_Q^l - \overline{f}_{T_i}^j, l_Q^l - l_{T_i}^j\right)}, \quad l \in \Omega_Q,$$

where $K^j$ is a locally data adaptive kernel function, $\Omega_Q$ is the query image domain consisting of $|\Omega_Q|$ pixels and $l_Q^l, l_{T_i}^j$ are column vectors denoting spatial coordinates of corresponding features $\overline{f}_Q^l$ and $\overline{f}_{T_i}^j$. A simple and intuitive choice of the $K^j$ is to consider two terms for penalizing the spatial distance between the point of interest and its neighbors, and the radiometric "distance" between the corresponding features $\overline{f}_Q^l$ and $\overline{f}_{T_i}^j$. More specifically, the kernel function is defined as follows:

$$K^j\left(\overline{f}_Q^l - \overline{f}_{T_i}^j, l_Q^l - l_{T_i}^j\right) = K_r^j\left(\overline{f}_Q^l - \overline{f}_{T_i}^j\right) K_s^j\left(l_Q^l - l_{T_i}^j\right),$$

$$= \exp\left(-\frac{1}{2\sigma_r^2} dist\left(\overline{f}_Q^l, \overline{f}_{T_i}^j\right)\right)$$

$$\exp\left(-\frac{1}{2\sigma_s^2} \|l_Q^l - l_{T_i}^j\|^2\right), \quad l \in \Omega_Q$$

where $dist(\overline{f}_Q^l, \overline{f}_{T_i}^j)$ is defined as:

$$\left(\overline{f}_Q^l, \overline{f}_{T_i}^j\right) =$$

$$\left\|\frac{f_Q^l}{\|F_Q\|_F} - \frac{f_{T_i}^j}{\|F_{T_i}\|_F}\right\|^2 = \frac{\|f_Q^l\|^2}{\|F_Q\|_F^2} + \frac{\|f_{T_i}^j\|^2}{\|F_{T_i}\|_F^2} - 2\rho\left(f_Q^l, f_{T_i}^j\right) \frac{\|f_Q^l\| \|f_{T_i}^j\|}{\|F_Q\|_F \|F_{T_i}\|_F},$$

$$\left(\rho\left(f_Q^l, f_{T_i}^j\right) = \frac{f_Q^{l^T} f_{T_i}^j}{\|f_Q^l\| \|f_{T_i}^j\|} \in [-1, 1]\right),$$

and $\sigma_r$, $\sigma_s$ are parameters controlling the fall-off of weights in radiometric and spatial domains.

Inserting $$K^j\left(\overline{f}_Q^l - \overline{f}_{T_i}^j, l_Q^l - l_{T_i}^j\right) = K_r^j\left(\overline{f}_Q^l - \overline{f}_{T_i}^j\right) K_s^j\left(l_Q^l - l_{T_i}^j\right),$$

$$= \exp\left(-\frac{1}{2\sigma_r^2} dist\left(\overline{f}_Q^l, \overline{f}_{T_i}^j\right)\right) \exp\left(-\frac{1}{2\sigma_s^2} \|l_Q^l - l_{T_i}^j\|^2\right),$$

$$l \in \Omega_Q$$

into $$\hat{p}(\overline{F}_Q | \mathcal{H}_i) = \frac{\sum_{j=1}^n K^j\left(\overline{f}_Q^l - \overline{f}_{T_i}^j, l_Q^l - l_{T_i}^j\right)}{\sum_{l \in \Omega_Q} \sum_{j=1}^n K^j\left(\overline{f}_Q^l - \overline{f}_{T_i}^j, l_Q^l - l_{T_i}^j\right)}, \quad l \in \Omega_Q,$$

the estimated conditional density $\hat{p}(\overline{F}_Q | \mathcal{H}_i)$ becomes $$\hat{p}(\overline{F}_Q | \mathcal{H}_i) = \frac{1}{\beta} \sum_{j=1}^n \exp\left(-\frac{1}{2\sigma_r^2} dist\left(\overline{f}_Q^l, \overline{f}_{T_i}^j\right)\right) \exp\left(-\frac{1}{2\sigma_s^2} \|l_Q^l - l_{T_i}^j\|^2\right),$$

$$l \in \Omega_Q,$$

where $\beta$ is a normalization factor ($\beta = \sum_{l \in \Omega_Q} \sum_{j=1}^n K^j (\overline{f}_Q^l - \overline{f}_{T_i}^j, l_Q^l - l_{T_i}^j)$). FIG. 13 shows how the conditional density function $\hat{p}(\overline{F}_Q | \mathcal{H}_i)$ is estimated, given Q and $T_i$. Here, the estimated conditional density $\hat{p}(\overline{F}_Q | \mathcal{H}_i)$ is a sum of kernels (weight functions) centered at the features $\overline{f}_{T_i}$ in $T_i$ which belongs to the hypothesis $\mathcal{H}_i$. In the Density Estimate Map, light grey value means a high conditional probability density $\hat{p}(\overline{F}_Q | \mathcal{H}_i)$ while black value represents a low conditional probability density $\hat{p}(\overline{F}_Q|\mathcal{H}_i)$. In principle, all n features should be employed to obtain an accurate density estimation. However, this is too computationally time-consuming. Hence, as we describe next, we use an efficient approximation of this locally data-adaptive kernel density estimator.

Regarding the approximation of locally data-adaptive kernel density estimation, assuming that $\overline{f}_Q^1, \overline{f}_Q^2, \ldots, \overline{f}_Q^n$ are i.i.d. given hypothesis $\mathcal{H}_i$, the ML decision rule can be rewritten by taking the log probability of the ML decision rule $$\hat{\mathcal{H}}_i = \arg\max_i P(\mathcal{H}_i | \overline{F}_Q) = \arg\max_i p(\overline{F}_Q | \mathcal{H}_i) = \arg\max_i p(\overline{F}_Q | \overline{F}_{T_i})$$

as:

$$\hat{\mathcal{H}}_i = \arg\max_i \log \hat{p}(\overline{F}_Q | \mathcal{H}_i) =$$

$$\arg\max_i \log \hat{p}(\overline{f}_Q^1, \ldots, \overline{f}_Q^n | \mathcal{H}_i) = \arg\max_i \sum_{l=1}^n \log \hat{p}(\overline{f}_Q^l | \mathcal{H}_i)$$

Each local individual probability density $\hat{p}(\overline{f}_Q^l|\mathcal{H}_i)$ is estimated separately:

$$\hat{p}(\overline{f}_Q^l | \mathcal{H}_i) = \frac{1}{\beta'} \sum_{j=1}^n K^j(\overline{f}_Q^l - \overline{f}_{T_i}^j, l_Q^l - l_{T_i}^j), \quad l = 1, \ldots, n,$$

where $\beta'$ is a normalization factor ($\beta' = \Sigma_{l=1}^n \Sigma_{j=1}^n K^j(\overline{f}_Q^l - \overline{f}_{T_i}^j, l_Q^l - l_{T_i}^j)$).

Since the distribution of the features on the low-dimensional manifold tends to follow a power-law (i.e., long-tail or heavy-tail), it should be sufficient to use just a few features in $T_i$ to get a reasonable estimate of the conditional density $\hat{p}(\overline{f}_Q^l|\mathcal{H}_i)$. Therefore, a single (spatially nearest) neighbor is used for the approximation, which yields:

$$\hat{p}(\overline{f}_Q^l | \mathcal{H}_i) \approx \exp\left(-\frac{1}{2\sigma_F^2} dist(\overline{f}_Q^l, \overline{f}_{T_i}^l)\right),$$

$$= \exp\left(-\frac{1}{2\sigma_F^2}\left(\frac{\|\underline{f}_Q^l\|^2}{\|F_Q\|_F^2} + \frac{\|\underline{f}_{T_i}^l\|^2}{\|F_{T_i}\|_F^2} - 2\rho\left(\underline{f}_Q^l, \underline{f}_{T_i}^l\right)\frac{\|\underline{f}_Q^l\|\|\underline{f}_{T_i}^l\|}{\|F_Q\|_F\|F_{T_i}\|_F}\right)\right),$$

$$l = 1, \ldots, n.$$

The approximate version of density estimator using one sample is compared to $\hat{p}(\overline{f}_Q^l|\mathcal{H}_i)$ estimated using all n samples in FIG. 14. Here the estimated conditional probability densities $\hat{p}(\overline{f}_Q^l|\mathcal{H}_i)$ are shown using n samples and 1 sample are shown in the middle and the scores on right side means $\Sigma_{l=1}^n \log \hat{p}(\overline{f}_Q^l|\mathcal{H}_i)$ where the higher this score is, the more likely $F_Q$ comes from class i ($F_{T_i}$). Qualitatively, it is observed that the resulting estimates are quite similar. More precisely, it has been verified that the use of the approximation takes little away from the performance of the overall algorithm.

Since log log $\hat{p}(\overline{f}_Q^l|\mathcal{H}_i)$ is approximately proportional to $$-\left(\frac{\|\underline{f}_Q^l\|^2}{\|F_Q\|_F^2} + \frac{\|\underline{f}_{T_i}^l\|^2}{\|F_{T_i}\|_F^2} - 2\rho\left(\underline{f}_Q^l, \underline{f}_{T_i}^l\right)\frac{\|\underline{f}_Q^l\|\|\underline{f}_{T_i}^l\|}{\|F_Q\|_F\|F_{T_i}\|_F}\right)$$

the ML decision rule becomes $$\hat{\mathcal{H}}_i = \arg\max_i \sum_{l=1}^n \log \hat{p}(\overline{f}_Q^l | \mathcal{H}_i) \Rightarrow$$

$$\arg\max_i \sum_{l=1}^n -\left(\frac{\|\underline{f}_Q^l\|^2}{\|F_Q\|_F^2} + \frac{\|\underline{f}_{T_i}^l\|^2}{\|F_{T_i}\|_F^2} - 2\rho\left(\underline{f}_Q^l, \underline{f}_{T_i}^l\right)\frac{\|\underline{f}_Q^l\|\|\underline{f}_{T_i}^l\|}{\|F_Q\|_F\|F_{T_i}\|_F}\right), =$$

$$\arg\max_i \left(-2 + 2 \sum_{l=1}^n \frac{\underline{f}_Q^{l\,T} \underline{f}_{T_i}^l}{\|F_Q\|_F\|F_{T_i}\|_F}\right), =$$

$$\arg\max_i \sum_{l=1}^n \frac{\underline{f}_Q^{l\,T} \underline{f}_{T_i}^l}{\|F_Q\|_F\|F_{T_i}\|_F} = \arg\max_i \left\langle \frac{F_Q}{\|F_Q\|_F}, \frac{F_{T_i}}{\|F_{T_i}\|_F} \right\rangle_F.$$

It is clear that the ML decision rule in the above equation boils down to the computation of the Matrix Cosine Similarity, due to the relationship $$\left\langle \frac{F_Q}{\|F_Q\|_F}, \frac{F_{T_i}}{\|F_{T_i}\|_F} \right\rangle_F \approx \frac{2 + \sum_{l=1}^n \log \hat{p}(\overline{f}_Q^l | \mathcal{H}_i)}{2}.$$

Since Matrix Cosine Similarity decision rule is optimal under the naive Bayes assumption, this measure provides a reliable score of how likely the hypothesis $H_i$ is. To summarize, the overall pseudo-code for the algorithm is given in the following algorithm.

---

Stage1: Feature representation

1) Construct $W_Q$, $W_T$ which are a collection of normalized LSK associated with Q, T.
2) Apply PCA to $W_Q$ and obtain projection space $X_Q$ from its top d eigenvectors.
3) Project $W_Q$ and $W_T$ onto $X_Q$ to construct $F_Q$ and $F_T$.

Stage2: Compute Matrix Cosine Similarity for every target patch $T_i$, where $i \in [0, \ldots, M-1]$ do $$\rho_i = \left\langle \frac{F_Q}{\|F_Q\|_F}, \frac{F_{T_i}}{\|F_{T_i}\|_F} \right\rangle_F \text{ and compute resemblance map (RM): } f(\rho_i) = \frac{\rho_i^2}{1 - \rho_i^2}.$$

end for

Then, find max $f(\rho_i)$.

-continued

Stage3: Significance tests and Non-maxima suppression
1) If max $f(\rho_i) > \tau_o$, go on to the next test. Otherwise, there is no object of interest in T.
2) Threshold RM by $\tau$ which is set to achieve 99% confidence level ($\alpha = 0.99$) from the empirical PDF of $f(\rho_i)$.
3) Apply non-maxima suppression to RM until the local maximum value is below $\tau$.

Q: Query image,
T: Target image,
$\tau_o$: Overall threshold,
$\alpha$: Confidence level,
$p^2$: Size of local steering kernel (LSK) window To this point, only the detection of objects in a gray image at a single scale have been addressed. Although the detection framework can handle modest scale and rotation variations by adopting a sliding window scheme, robustness to larger scale and rotation changes (for instance above +/−20% in scale, 30 degrees in rotation) are desirable. Furthermore, the use of color images as input should be also considered from a practical point of view. In this section, the approach described in the previous sections for detecting objects at a single scale is extended to detect objects at different scales and at different orientations in an image. In addition, we deal with a color image by defining and using "Canonical Cosine Similarity".

In order to cope with large-scale variations, a multi-scale pyramid of the target image T is constructed. This is a non-standard pyramid as the target image size is reduced by steps of 10~15%, so that a relatively fine quantization of scales are taken into account. FIG. 15 (a) shows a block diagram of multi-scale object detection system, and FIG. 15(b) shows a block diagram of multi-rotation object detection system. The first step is to construct the multi-scale pyramid $T^0, T^1, \ldots, T^S$ where S is the coarsest scale of the pyramid. As shown in FIG. 12(a), $F_Q, F_{T^0}, F_{T^1}, F_{T^2}$ (S=2) are obtained by projecting $W_Q$ and $W_{T^0}, W_{T^1}, W_{T^2}$ onto the principal subspace defined by $X_Q$ as follows:

$$F_Q = X_Q^T W_Q, F_{T^0} = X_Q^T W_{T^0}, F_{T^1} = X_Q^T W_{T^1}, F_{T^2} = X_Q^T W_{T^2}.$$

Three resemblance maps $RM_0, RM_1, RM_2$, are obtained by computing $$f(\rho_i) = \frac{\rho_i^2}{1 - \rho_i^2}.$$

These resemblance maps represent the likelihood functions $p(f(\rho_i)|S_i)$ where $S_i$ is the scale at $i^{th}$ point. However the sizes of the respective resemblance maps $RM_0, RM_1, RM_2$ are naturally different. Therefore, all the resemblance maps are simply upscaled by pixel replication so that they match the dimensions of the finest scale map $RM_0$. Next, the maximum likelihood estimate of the scale at each position is arrived at by comparing the upscaled resemblance maps as follows:

$$\hat{S}_i = \underset{S_i}{\arg\max}\, p(\underline{RM}[f(\rho_i)] \mid S_i),$$

where by $\underline{RM}$ it is meant that the collection of RM indexed by i at each position.

In order to cope with large rotations, a similar approach is taken to generate rotated images (this time of the query image Q) in roughly 30 degree steps. As seen in FIG. 15 (b), $F_Q^0, F_Q^1, \ldots, F_Q^{11}$ and $F_T$ are obtained by projecting $W_Q^0, \ldots, W_Q^{11}$ and $W_T$ onto the principal subspace defined by $X_{Q^0}, \ldots, X_{Q^{11}}$. After computing $$f(\rho_i) = \frac{\rho_i^2}{1 - \rho_i^2}$$

from 12 pairs by employing the sliding window scheme, we obtain twelve resemblance maps $RM_0, \ldots, RM_{11}$. The maximum likelihood estimate of the best matching pattern is computed accounting for rotation as follows:

$$\hat{R}_i = \underset{R_i}{\arg\max}\, p(\underline{RM}[f(p_i)] \mid R_i).$$

Now, Canonical Cosine Similarity (CCS) is now defined to extend the proposed framework with a single gray-scale query image to vector-valued images. In particular, suppose at each pixel, the image has q values. As per the earlier discussion, q feature sets are generated $F_Q^l, F_{T_i}^l$ ($l=[1,\ldots,q]$) by projecting $W_Q^l, F_{T_i}^l$ onto the subspaces $X_Q^l$ respectively and form the overall feature set as follows:

$$F_Q = [\text{colstack}(F_Q^1), \ldots, \text{colstack}(F_Q^q)] \in \mathbb{R}^{(d \times n) \times q},$$

$$F_{T_i} = [\text{colstack}(F_{T_i}^1), \ldots, \text{colstack}(F_{T_i}^q)] \in \mathbb{R}^{(d \times n) \times q}.$$

The key idea is to find the vectors $u_Q$ and $u_{T_i}$ which maximally correlate two data sets $(F_Q, F_{T_i})$.

$$\underline{d}_Q = F_Q \underline{u}_Q = u_{Q_1}\text{colstack}(F_Q^1) + \ldots + u_{Q_q}\text{colstack}(F_Q^q) \in \mathbb{R}^{(d \times n)},$$

$$\underline{d}_{T_i} = F_{T_i}\underline{u}_{T_i} = u_{T_1}\text{colstack}(F_{T_i}^1) + \ldots + u_{T_q}\text{colstack}(F_{T_i}^q) \in \mathbb{R}^{(d \times n)},$$

where $\underline{u}_Q = [u_{Q_1}, \ldots, u_{Q_q}]^T \in \mathbb{R}^q$ and $\underline{u}_{T_i} = [u_{T_1}, \ldots, u_{T_q}]^T \in \mathbb{R}^q$.

Then, the objective function being maximized is the cosine similarity between $\underline{d}_Q$ and $\underline{d}_{T_i}$ as follows.

$$\rho = \max_{u_Q, u_{T_i}} \frac{\underline{d}_Q^T \underline{d}_{T_i}}{\|\underline{d}_Q\|\|\underline{d}_{T_i}\|} = \max_{u_Q, u_{T_i}} \frac{u_Q^T F_Q^T F_{T_i} u_{T_i}}{\|F_Q u_Q\|\|F_{T_i} u_{T_i}\|},$$

such that $\|F_Q \underline{u}_Q\| = \|F_{T_i} \underline{u}_{T_i}\| = 1$, where $\underline{u}_Q$ and $\underline{u}_{T_i}$ are called canonical variates and $\rho$ is the canonical cosine similarity. The above is inspired by canonical correlation analysis (CCA).

The canonical cosine similarity $\rho$ and canonical variates $\underline{u}_Q, \underline{u}_{T_i}$ can be obtained by solving the coupled eigenvalue problems as follows:

$$(F_Q^T F_Q)^{-1}(F_Q^T F_{T_i})(F_{T_i}^T F_{T_i})^{-1}(F_{T_i}^T F_Q)\underline{u}_Q = \rho^2 \underline{u}_Q,$$

$$(F_{T_i}^T F_{T_i})^{-1}(F_{T_i}^T F_Q)(F_Q^T F_Q)^{-1}(F_Q^T F_{T_i})\underline{u}_{T_i} = \rho^2 \underline{u}_{T_i}.$$

The proof is as follows:

The Lagrangian objective function to the minimization problem in $$\rho = \max_{u_Q, u_{T_i}} \frac{d_Q^T d_{T_i}}{\|d_Q\| \|d_{T_i}\|} = \max_{u_Q, u_{T_i}} \frac{u_Q^T F_Q^T F_{T_i} u_{T_i}}{\|F_Q u_Q\| \|F_{T_i} u_{T_i}\|},$$

is $$f(\lambda_Q, \lambda_T, u_Q, u_{T_i}) =$$

$$u_Q^T F_Q^T F_{T_i} u_{T_i} - \frac{\lambda_Q}{2}(u_Q^T F_Q^T F_Q u_Q - 1) - \frac{\lambda_{T_i}}{2}(u_{T_i}^T F_{T_i}^T F_{T_i} u_{T_i} - 1)$$

Taking derivatives with respect to $\underline{u}_Q$ and $\underline{u}_{T_i}$, we obtain $$\frac{\partial f}{\partial \underline{u}_Q} = F_Q^T F_{T_i} u_{T_i} - \lambda_Q(F_Q^T F_Q u_Q) = 0$$

$$\frac{\partial f}{\partial \underline{u}_{T_i}} = F_{T_i}^T F_Q u_Q - \lambda_{T_i}(F_{T_i}^T F_{T_i} u_{T_i}) = 0$$

Pre-multiply $\underline{u}_{T_i}^T$ to $$\frac{\partial f}{\partial \underline{u}_{T_i}} = F_{T_i}^T F_Q u_Q - \lambda_{T_i}(F_{T_i}^T F_{T_i} u_{T_i}) = 0$$

and also pre-multiply $\underline{u}_Q^T$ to $$\frac{\partial f}{\partial \underline{u}_Q} = F_Q^T F_{T_i} u_{T_i} - \lambda_Q(F_Q^T F_Q u_Q) = 0.$$

Subtracting these two equations, gives $$\underline{u}_Q^T F_Q^T F_{T_i} \underline{u}_{T_i} - \lambda_Q(\underline{u}_Q^T F_Q^T F_Q \underline{u}_Q) - \underline{u}_{T_i}^T F_{T_i}^T F_Q \underline{u}_Q - \lambda_{T_i}(\underline{u}_{T_i}^T F_{T_i}^T F_{T_i} \underline{u}_{T_i}) = 0,$$

where $(\underline{u}_Q^T F_Q^T F_{T_i} \underline{u}_{T_i})^T = \underline{u}_{T_i}^T F_{T_i}^T F_Q \underline{u}_Q$ is a scalar.

Enforcing the constraints $(\underline{u}_Q^T F_Q^T F_Q \underline{u}_Q)^T = (\underline{u}_{T_i}^T F_{T_i}^T F_{T_i} \underline{u}_{T_i})^T = 1$, leads to the conclusion that $\lambda_Q = \lambda_{T_i}$. Defining $\rho = \lambda_Q = \lambda_{T_i}$. Assuming $F_{T_i}^T F_{T_i}$ is invertible from $$\frac{\partial f}{\partial \underline{u}_{T_i}} = F_{T_i}^T F_Q u_Q - \lambda_{T_i}(F_{T_i}^T F_{T_i} u_{T_i}) = 0, \text{ that}$$

$$u_{T_i} = \frac{(F_{T_i}^T F_{T_i})^{-1} F_{T_i}^T F_Q u_Q}{\rho}$$

and so plugging in $$\frac{\partial f}{\partial \underline{u}_Q} = F_Q^T F_{T_i} u_{T_i} - \lambda_Q(F_Q^T F_Q u_Q) = 0,$$

gives $$\frac{(F_Q^T F_{T_i})(F_{T_i}^T F_{T_i})^{-1}(F_{T_i}^T F_Q) u_Q}{\rho} = \rho(F_Q^T F_Q) u_Q.$$

Assuming $F_Q^T F_Q$ is also invertible, gives $$(F_Q^T F_Q)^{-1}(F_Q^T F_{T_i})^{-1}(F_{T_i}^T F_Q)\underline{u}_Q = \rho^2 \underline{u}_Q.$$

Similarly, $$(F_{T_i}^T F_{T_i})^{-1}(F_{T_i}^T F_Q)(F_Q^T F_Q)^{-1}(F_Q^T F_{T_i})\underline{u}_{T_i} = \rho^2 \underline{u}_{T_i}.$$

The positive square root of eigenvalues $\rho^2$ is the "Canonical Cosine Similarity". If $F_Q$, $F_{T_i}$ are each composed of a single vector (colstack($F_Q$), colstack($F_{T_i}$)), the above equations reduce to $$\frac{(colstack(F_Q)^T colstack(F_{T_i}))^2}{\|colstack(F_Q)\|^2 \|colstack(F_{T_i})\|^2} = \rho^2,$$

which is just the squared cosine similarity defined earlier.

Here, a closer look at the particular case of color images where q=3 is provided. A natural question here is whether more can be gained if we the color information is used instead of using only the luminance channel as provided so far. The answer to this question is positive. There exist many color models such as RGB, YCbCr, CIE L*a*b* etc., it is observed that CIE L*a*b color model provides the most discriminative information among all. FIG. 16(b) shows examples of correct detections on the UIUC single-scale car test set. FIG. 16(c) shows examples of correct detections on the UIUC multi-scale car test set. Confidence level α was set to 0.99 and RM only above the threshold τ corresponding to α is embedded in test images. Bounding boxes can be drawn at the correct locations. In case of a multiple detection, a red bounding box cab indicate higher resemblance to Query than a blue bounding box.

Defining the respective $RM_7$ as the summation of mapping function $f(\rho_i(l))$ of CCS $\rho_i(l)$ between a set of features which are calculated from each channel over $l=1, \ldots, 1$, where $$\sum_{l=1}^{d_c} \frac{\rho_i^2(l)}{1 - \rho_i^2(l)}$$

($d_c$ is the number of canonical cosine similarity values $\rho_i(1)$ greater than zero). Also illustrated in the next section, the color approach based on CCS not only provides better discriminative power, but also gives more accurate localization results than the luminance channel only does.

The performance of the current invention is demonstrated with comprehensive experiments on three datasets; namely, the UIUC car dataset, MIT-CMU face dataset, and Shechtman's general object dataset. The current invention provides a series of bounding boxes around objects of interest. More specifically, if the detected region by the current invention lies within an ellipse of a certain size centered around the ground truth, it is evaluated as a correct detection. Otherwise, it is counted as a false positive. Eventually, a Precision and Recall is computed and defined as $$Recall = \frac{TP}{nP}, Precision = \frac{TP}{TP + FP},$$

where, T P is the number of true positives, F P is the number of false positives, nP is the total number of positives in dataset, and $$1 - \text{Precision} = \frac{FP}{TP + FP}.$$

Experimental results on each dataset are presented as recall versus (1-precision) curve and Detection equal-error rate in the following sections, note that Detection equal-error rate is a detection (recall) rate when a recall rate is the same as the precision rate.

Regarding car detection the UIUC car dataset consists of learning and test sets. The learning set contains 550 positive (car) images and 500 negative (non-car) images. The test set is divided into two parts: 170 gray-scale images containing 200 side views of cars with size of 100×40, and 108 grayscale images containing 139 cars at various sizes with a ratio between the largest and smallest car of about 2.5. Since the method according to the current invention is training-free, only one query image at a time is used from the 550 positive examples.

Computing LSK of size 9×9 as descriptors, as a consequence, every pixel in Q and T yields an 81-dimensional local descriptor $W_Q$ and $W_T$ respectively. The smoothing parameter h for computing LSKs was set to 2.1. Resulting in $F_Q$, $F_T$ by reducing dimensionality from 81 to d=4 and then, obtaining RM by computing the MCS measure between $F_Q$, $F_{T_j}$. The threshold τ for each test example was determined by the confidence level α=0.99. FIG. 16 (b) shows the output of the current invention on single-scale test images.

An experiment was conducted by computing RM without performing PCA in order to verify that the use of dimensionality reduction step (PCA) plays an important role in extracting only salient features and improving the performance. These experiments were repeated by changing the query image and computing precision and recall. In FIGS. 17(a) and 17(b), recall-precision curves represent a performance comparison between the current invention and the current invention without PCA using 5 different query images. FIG. 17(a) shows recall versus 1-Precision curves of the current invention, FIG. 17(b) shows recall versus 1-Precision curves of the current invention without PCA on the UIUC single-scale car test set using 5 different query images. It is clearly shown that the performance of the current invention is not terribly affected by a choice of the query images, but is quite consistent. Furthermore, PCA consistently contributes to a performance improvement. The detection equal-error rates comparison is provided in Table I as well.

TABLE I

SINGLE-SCALE RESULT: DETECTION EQUAL-ERROR RATES ON THE UIUC SINGLE-SCALE CAR TEST SET [44]

| The proposed method w/o PCA | Query 1 | Query 2 | Query 3 | Query 4 | Query 5 | Agarwal et al. [44] (1) | Wu and Nevatia [46] |
|---|---|---|---|---|---|---|---|
| Detection rates | 79.29% | 88.12% | 81.11% | 80.41% | 87.11% | 77.08% | 97.5% |

| The proposed method | Query 1 | Query 2 | Query 3 | Query 4 | Query 5 | Agarwal et al. [44] (2) | Kapoor and Winn [47] |
|---|---|---|---|---|---|---|---|
| Detection rates | 85.26% | 87.27% | 87.13% | 80.57% | 86.73% | 76.72% | 94.0% |

To show an overall performance of the purposed method on five different query images, T P and F P were summed up over the entire experiment, then computed recall and precision at various steps of the threshold value τ according to the confidence level α. The current invention, which is training-free, performs favorably against state-of-the-art methods which use extensive training as shown in FIG. 18 shows a comparison of Recall versus 1-Precision curves between the current invention and other methods on the UIUC single-scale test set.

Figure 19:
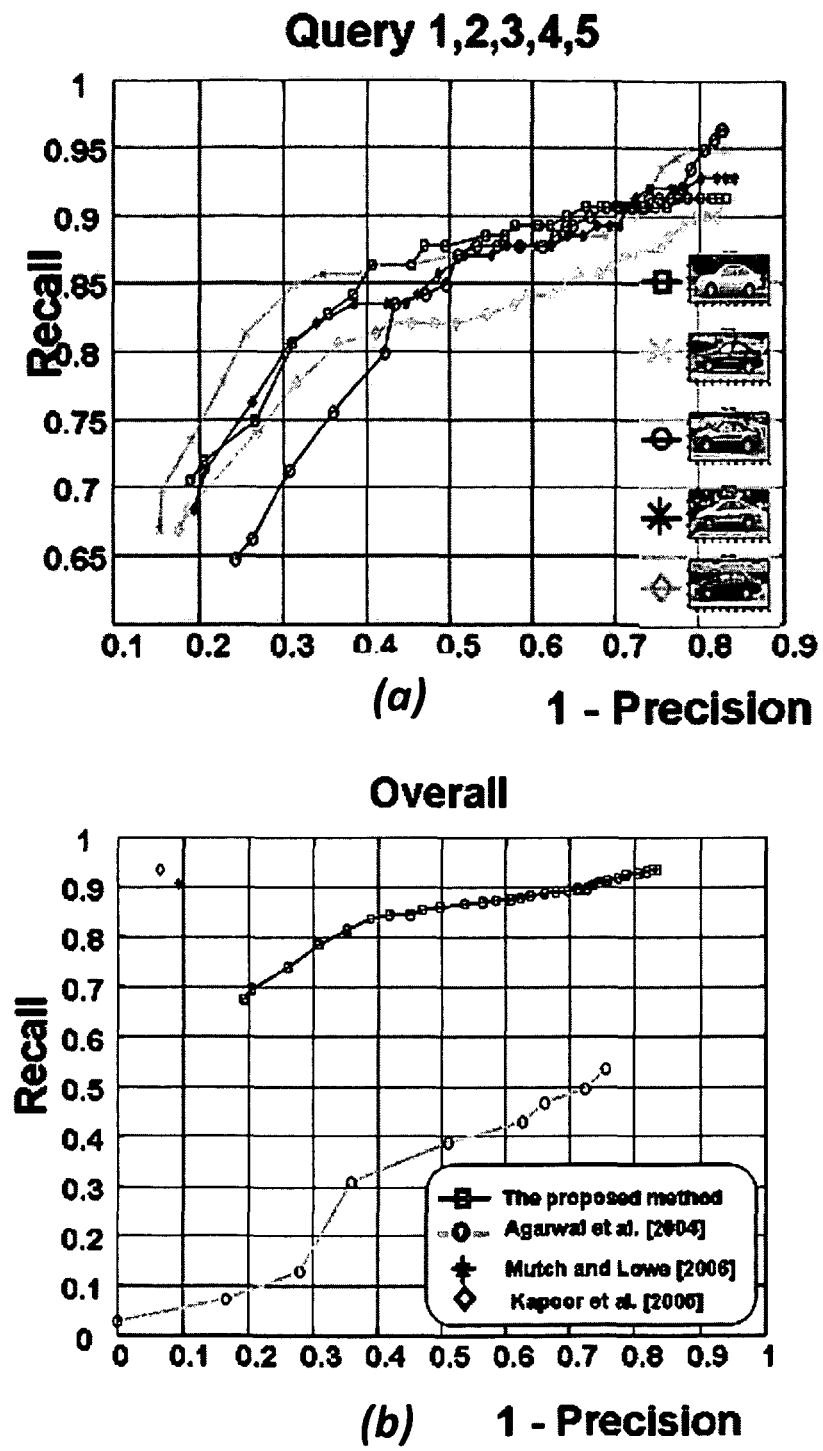

In a multi-scale test set, as explained above, a multi-scale pyramid was constructed of the target image T: 5 scales with scale factors 0.4, 0.6, 0.8, 1, and 1.2. More specifically, the target image size is reduced by steps of 20% up to 40% of the original size and upscale the target image by 20% so that we can deal with both cases of either the size of objects in the target images being bigger or smaller than the query. The rest of the process is similar to the single-scale case. FIG. 19 (b) shows examples of correct detections using τ corresponding to α=0.99. Here, FIG. 19 (a) shows a Recall versus 1-Precisions curve using 5 different query images and FIG. 19 (b) shows a comparison of Recall versus 1-Precision curves between the current invention and other methods on the UIUC multi-scale test set. The overall performance improvement of the current invention (using 5 different query images) is even greater (over 30%) on the multi-scale test set as shown in Table II and FIG. 18.

TABLE II

MULTI-SCALE RESULT: DETECTION EQUAL-ERROR RATES ON THE UIUC MULTI-SCALE CAR TEST SET [44]

| The proposed method | Query 1 | Query 2 | Query 3 | Query 4 | Query 5 | Agarwal et al. [44] | Mutch and Lowe [48] | Kapoor and Winn [47] |
|---|---|---|---|---|---|---|---|---|
| Detection rates | 75.47% | 77.66% | 70.21% | 75.00% | 74.22% | 43.77~44.00% | 90.6% | 93.5% |

Regarding face detection, the performance of the current invention is shown in the presence of a moderate scale variation (a ratio between the largest and smallest object of about 2.5) in the previous section. In this section, the invention is evaluated on more general scenario where the scale ratio between the largest and smallest is over 10 and large rotations of objects may exist. Therefore, a test set is chosen from a subset of the MIT-CMU face dataset. The test set is composed of 43 gray-scale images containing 149 frontal faces at various sizes and 20 gray-scale images containing 30 faces with various sizes and rotations. A query face image of size 35×36 was employed as shown in FIG. 20, and images for a rotation experiment were resized so that faces are about the same size as the query face. Such parameters as the smoothing parameter (h), LSK size (P), confidence level ($\alpha$) remain same as the ones used in the UIUC car test sets. However, the scale steps are increased for the multi-scale pyramid up to 29, and rotation steps were set to 24 (i.e., rotate the query image by 15 degrees) to achieve an accurate rotation estimation. FIG. 20, FIG. 21, and FIG. 22 show that the current invention is capable of detecting and localizing faces at distinct scale and rotation angle even in the presence of large variations in scale and rotation. FIG. 20 shows the detection results on the MIT-CMU multi-scale test set. $\alpha$ was set to 0.99. Hand-drawn faces on the white board were also detected using a real face query image. FIG. 21 shows detection results on the MIT-CMU multi-scale test set. $\alpha$ was set to 0.99. Among 57 faces present, 54 faces were detected at a correct location with 4 false alarms. FIG. 22 shows detection results on the MIT-CMU multi-rotation test set. $\alpha$ was set to 0.99. FIG. 23 shows Precision-Recall Curves on the MIT-CMU test set using 2 different query images.

The experiment was repeated by changing the query image. As shown in FIG. 23, the performance of the current invention on this test set is consistent with the results in the UIUC car test sets. More specifically, the performance of the current invention is little affected by the choice of query image and is quite stable.

For general object detection, the performance of the current invention is demonstrated on data sets composed of gray-scale images, which contain specific objects such as car and face. The current invention is applied here to a more difficult scenario where general real-world images containing flowers, hearts, and human poses are considered. Furthermore, rough hand-drawn sketches are used as a query instead of real images. In order to justify the usefulness of the MCS measure for this dataset and to further verify the advantage of the CCS defined in Section IV-C over the MCS measure, the current invention is first evaluated on the luminance channel only. In FIG. 24, some examples of RM are shown. FIG. 25 and FIG. 26 show that the current invention is able to detect and localize reliably.

The use of LSKs is further justified by comparing the performance with state-of-the-art local descriptors. Such local descriptors are densely computed as gradient location-orientation histogram (GLOH), Shape Context, and SIFT. By replacing LSKs with these descriptors, but keeping the rest of the steps the same, the experiment was repeated on this test set. The Precision-Recall curve in FIG. 27 verifies that the LSKs according to the current invention has more discriminative power than other local descriptors. The current invention is also evaluated on full CIE L*a*b* data. Looking at recall rates in the range of $0 \leq (1\text{-precision}) \leq 0.1$ in FIG. 27, full CIE L*a*b* data is seen to provide more information, and thus CCS outperforms the MCS measure.

The current invention is a novel and powerful training-free non-parametric object detection framework by employing local steering kernels (LSKs), which well-capture underlying data structure, and by using the "Matrix Cosine Similarity" (MCS) measure. The invention is justified using a naive Bayes decision, which leads to the use of MCS measure. The invention can automatically detect in the target image the presence, the number, as well as location of similar objects to the given query image. To deal with more general scenarios, accounting for large variations in scale and rotation, a multi-scale and -rotation approach is provided. The "Canonical Cosine Similarity" (CCS) has proven to be more effective than MCS when vector-valued images are available though this requires further study. Challenging sets of real-world object experiments have demonstrated that the current invention achieves a high detection accuracy of objects of interest even in completely different context and under different imaging conditions. Unlike other learning-based detection methods, the current invention operates using a single example of an image of interest to find similar matches, and does not require any prior knowledge (learning) about objects being sought; and does not require any segmentation or pre-processing step of the target image. The invention is general enough as to be extendable to 3-D for such applications as action recognition, suspicious behavior detection etc. using analogous 3-D LSKs.

The task of action recognition are mainly two-fold. First, feature representation is required that is derived from space-time local (steering) regression kernels (3-D LSKs), which capture the underlying structure of the data quite well, even in the presence of significant distortions and data uncertainty. Second, generalizing a training-free nonparametric detection scheme to 3-D, which is provided for 2-D object detection. The current invention uses 3-D LSKs for the problems of detection/localization of actions of interest between a query video and a target video. The key idea behind 3-D LSKs is to robustly obtain local space-time geometric structures by analyzing the radiometric (voxel value) differences based on estimated space-time gradients, and use this structure information to determine the shape and size of a canonical kernel (descriptor). The 3-D LSKs implicitly contain information about the local motion of the voxels across time, thus requiring no explicit motion estimation.

Figure 1:
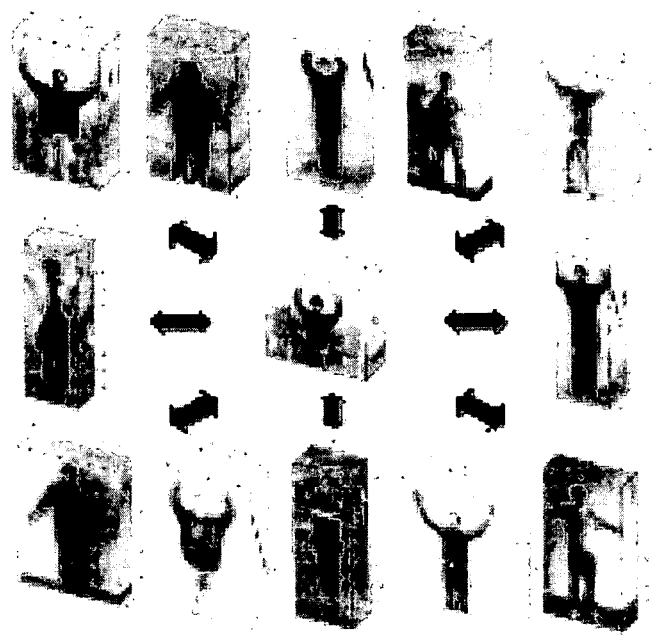
FIG. 1 shows hand-waving action and possibly similar actions.
Figure 2:
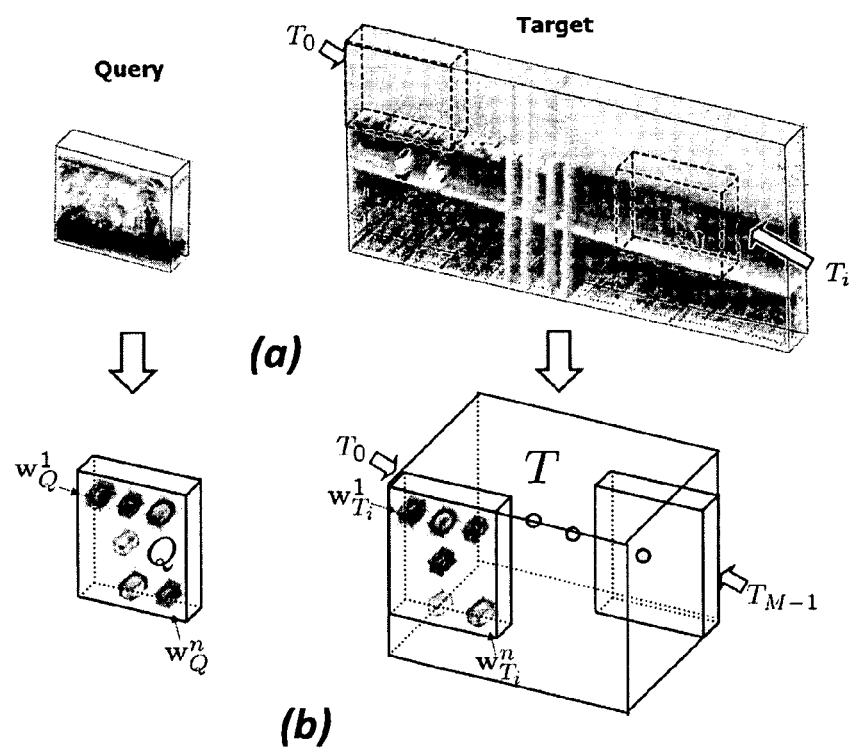
FIGS. 2(a)-2(b) show the action detection problem.

Referring to FIG. 28, by denoting the target video (T), and the query video (Q), a dense set of 3-D LSKs from each is computed. These densely computed descriptors are highly informative, but taken together tend to be over-complete (redundant). Therefore, features are derived by applying dimensionality reduction (namely PCA) to these resulting arrays, in order to retain the most salient characteristics of the 3-D LSKs. The feature collections from Q and $T_i$ (a chunk of the target which is the same size as the query; See FIG. 1 (b)) form feature volumes $F_Q$ and $F_{T_i}$. comparing the feature volumes $F_{T_i}$ and $F_Q$ from the $i^{th}$ cube of T and Q to look for matches. One aspect of the invention takes advantage of cosine similarity over the conventional Euclidean distance, Matrix Cosine Similarity (MCS) is employed as a similarity measure, which generalizes the notion of cosine similarity between two vectors. The optimality properties of this approach are described within a naive Bayes framework.

In general, it is assumed that the query video is smaller than target video. However, this is not true in practice and a query video may indeed include a complex background, which deteriorates recognition accuracy. In order to deal with this problem, it is necessary to have a procedure, which automatically segments from the query video a small cube that only contains a valid human action. For this, space-time saliency detection is employed. This idea not only allows one to extend the current detection framework to action category classification, but also improve both detection and classification accuracy by automatically removing irrelevant background from the query video. FIG. 28 shows an overview of the framework for action detection according to the current invention and category classification.

The action detection method of the current invention is distinguished from the 2-D work above for object detection, in the following respects; 1) action detection addressed in this here is considered to be more challenging than static (2-D)

object detection due to additional problems such as variations in individual motion and camera motion, 2) space-time local steering kernels are used, which capture both spatial and temporal geometric structure, 3) while earlier it is assumed that a query image is always smaller than a target and only contains an object of interest, this assumption is relaxed to deal with more realistic scenarios by incorporating space-time saliency detection, and 4) while the 2-D work focused on detection tasks, the current invention, achieves state-of-the art action classification performance as well as high detection accuracy. Therefore, a nontrivial extension of 2-D framework to 3-D for action recognition, and the careful examination of the current invention on challenging action datasets are disclosed herein.

Before providing a more detailed description, some key aspects are highlighted of the current invention.

A novel feature representation derived from densely computed 3-D LSKs is proposed.

Since the calculation of 3-D LSKs is stable in the presence of uncertainty in the data, the invention is robust even in the presence of noise. In addition, normalized 3-D LSKs provide a certain invariance to illumination changes (see FIG. 32.).

As opposed to filtering out "non-informative" descriptors in order to reduce the time complexity, the current invention automatically obtains the most salient feature volumes by applying Principal Components Analysis (PCA) to a collection of 3-D LSKs. The method of the invention is feasible in practice because the dimension of features after PCA is significantly reduced (e.g., from say 3×3×7=64, to 3 or 4), even though the descriptors are densely computed.

The current invention is tolerant to modest deformations (i.e., ±20% scale change (in space-time), ±15 degree rotation change) of the query and can detect multiple actions that occur simultaneously in the field of view using multiple queries.

From a practical standpoint, it is important to note that the current invention operates using a single example of an action of interest to find similar matches; does not require any prior knowledge (learning) about actions being sought; and does not require any pre-processing step or segmentation of the target video. Since the invention does not require background subtraction, the current invention can work with cluttered scenes with dynamic backgrounds.

As outlined above, the approach to detect actions according to the current invention consists broadly of three stages (see FIG. 28). Below, each of these steps is described in detail. In order to make the concepts more clear, the local steering kernels in 2-D are reiterated.

FIG. 29 shows a graphical description of how LSK values centered at pixel of interest ×13 are computed in an edge region. Note that each pixel location has its own $C \in \mathbb{R}^{2 \times 2}$ computed from gradient vector field within a local window. In K values, red means higher values (higher similarity).

Indeed, the covariance matrix $C_l$ modifies the shape and size of the local kernel in a way which robustly encodes the local geometric structures. The shape of the LSK's is not simply a Gaussian, despite the simple definition in $$K(x_l - x_i) = \frac{\sqrt{\det(C_l)}}{h^2} \exp\left\{\frac{(x_l - x_i)^T C_l (x_l - xi)}{-2h^2}\right\},$$

$$l = 1, \ldots, P,$$

It is important to note that this is because for each pixel $x_l$ in the vicinity of $x_i$, a different matrix $C_l$ is used, therefore leading to a far more complex and rich set of possible shapes for the resulting LSKs. The same idea is valid in 3-D as well, as will be describe below.

The time axis is introduced to the data model here so that $x_i = [x_1, x_2, t]_i^T$: $x_1$ and $x_2$ are the spatial coordinates, and t is the temporal coordinate. Similar to the 2-D case, the covariance matrix $C_l$ can be naively estimated as $J_l^T J_l$ with $$J_l = \begin{bmatrix} z_{x_1}(x_1), & z_{x_2}(x_1), & z_t(x_1) \\ \vdots & \vdots & \vdots \\ z_{x_1}(x_P), & z_{x_2}(x_P), & z_t(x_P) \end{bmatrix}$$

where $z_{x_1}(\bullet)$, $z_{x_2}(\bullet)$, and $z_t(\bullet)$ are the first derivatives along $x_1$-, $x_2$-, and t-axes, and P is the total number of samples in a space-time local analysis window (or cube) around a sample position at $x_i$. Again, $C_l$ is estimated by invoking the singular value decomposition (SVD) of $J_l$ with regularization as:

$$C_l = \gamma \sum_{q=1}^{3} a_q^2 v_q v_q^T \in \mathbb{R}^{(3 \times 3)}$$

with $$a_1 = \frac{s_1 + \lambda'}{\sqrt{s_2 s_3} + \lambda'},$$

$$a_2 = \frac{s_2 + \lambda'}{\sqrt{s_1 s_3} + \lambda'},$$

$$a_3 = \frac{s_3 + \lambda'}{\sqrt{s_1 s_2} + \lambda'},$$

$$\gamma = \left(\frac{s_1 s_2 s_3 + \lambda''}{P}\right)^\alpha,$$

where $\lambda'$ and $\lambda''$ are parameter that dampen the noise effect and restrict $\gamma$ and the denominators of $a_q$'s from being zero ($\lambda'$, $\lambda''$, $\alpha$, and h are set to the same values as 2-D LSKs and fixed for all experiments). As mentioned earlier, the singular values ($s_1$, $s_2$, and $s_3$) and the singular vectors ($v_1$, $v_2$, and $v_3$) are given by the compact SVD of $$J_l = U_l S_l V_l^T = U_l \text{diag}[s_1, s_2, s_3]_l [v_1, v_2, v_3]_l^T.$$

In the 3-D case, orientation information captured in 3-D LSK contains the motion information implicitly. FIG. 30 is a graphical description of how 3-D LSK values centered at voxel of interest ×38 are computed in a space-time edge region. Note that each voxel location has its own $C \in \mathbb{R}^{3 \times 3}$ computed from space-time gradient vector field within a local space-time window.

FIG. 31 shows examples of 3-D local steering kernels capturing 3-D local underlying geometric structure in various space-time regions. As can be seen in $$K(x_l - x_i) = \frac{\sqrt{\det(C_l)}}{h^2} \exp\left\{\frac{(x_l - x_i)^T C_l (x_l - xi)}{-2h^2}\right\},$$

$$l = 1, \ldots, P,$$

the values of the kernel K are based on the covariance matrices $C_l$ along with their space-time locations $x_l$. It is worth noting that a significant strength of using this implicit framework (as opposed to the direct use of estimated motion vectors) is the flexibility it provides in terms of smoothly and adaptively changing descriptors. This flexibility allows the accommodation of even complex motions, so long as their magnitudes are not excessively large. In FIG. 31, in order to compute 3-D LSKs, 5 frames (frame 13 to frame 17) were used. Intuitively, $C_l$'s computed from the local analysis window are similar to one another in the motion-free region (see FIG. 31). On the other hand, in the region where motion exists (see FIG. 31), the kernel size and shape depend on both $C_l$ and its space-time location $x_l$ in the local space-time window. Thus, high values in the kernel are yielded along the space-time edge region whereas the rest of kernel values are near zero.

In what follows, at a position $x_i$, the description will essentially be using (a normalized version of) the function. $K(x_l-x_i)$ as descriptors, representing a video's inherent local space-time geometry. To be more specific, the 3-D LSK function $K(x_l-x_i)$ is densely calculated and normalized as follows $$W_l^i = \frac{K(x_l - x_i)}{\sum_{l=1}^{P} K(x_l - x_i)},$$

where I can be Q or T for query or target, respectively.

Normalization of this kernel function yields invariance to brightness change and robustness to contrast change as shown in FIGS. 32(a)-32(b), where shown are invariance and robustness of 3-D LSK weights $W(x_l-x)$ in various challenging conditions. Note that WGN means White Gaussian Noise.

Figure 33:
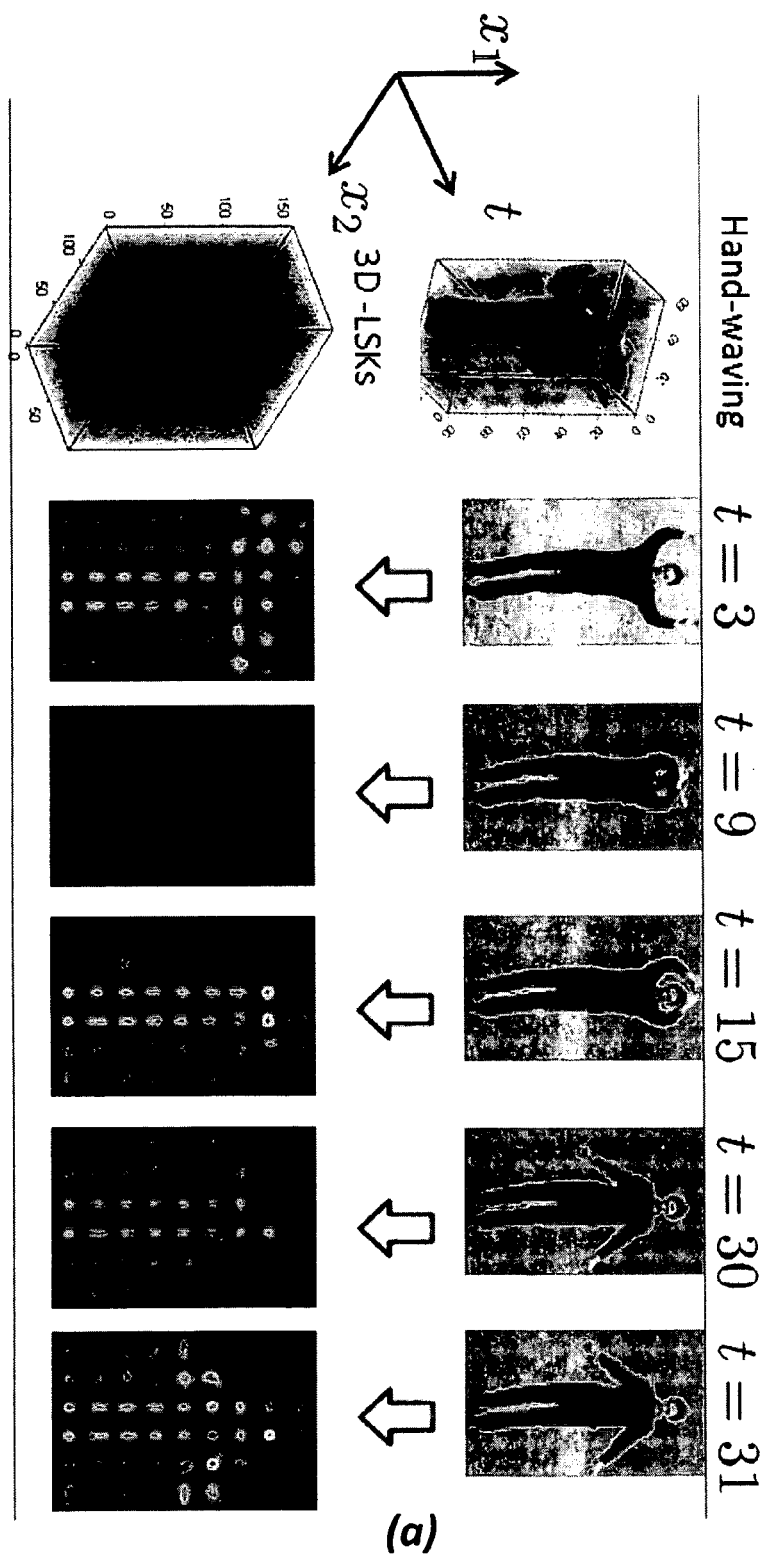
Figure 33:
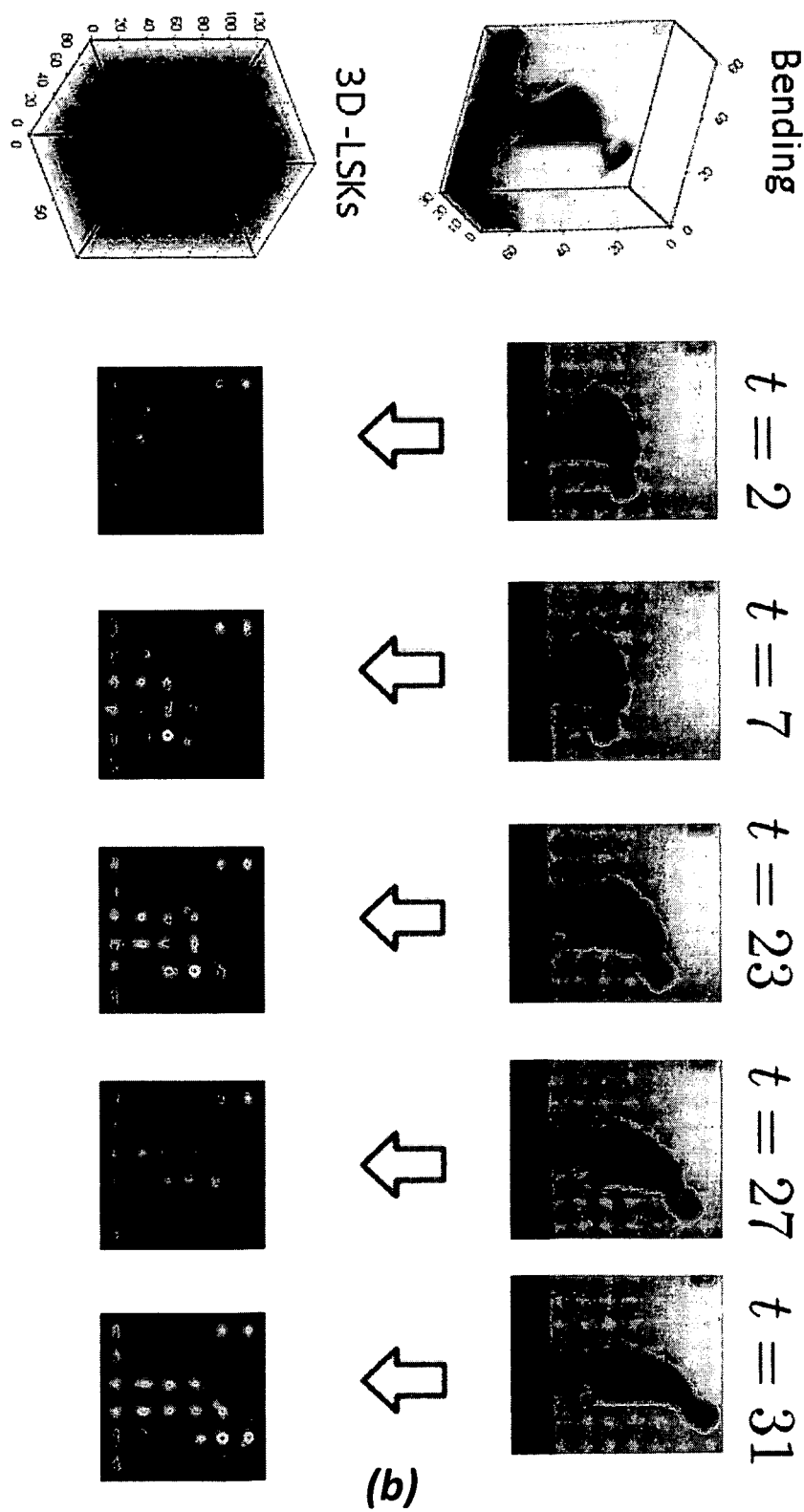
Figure 35:
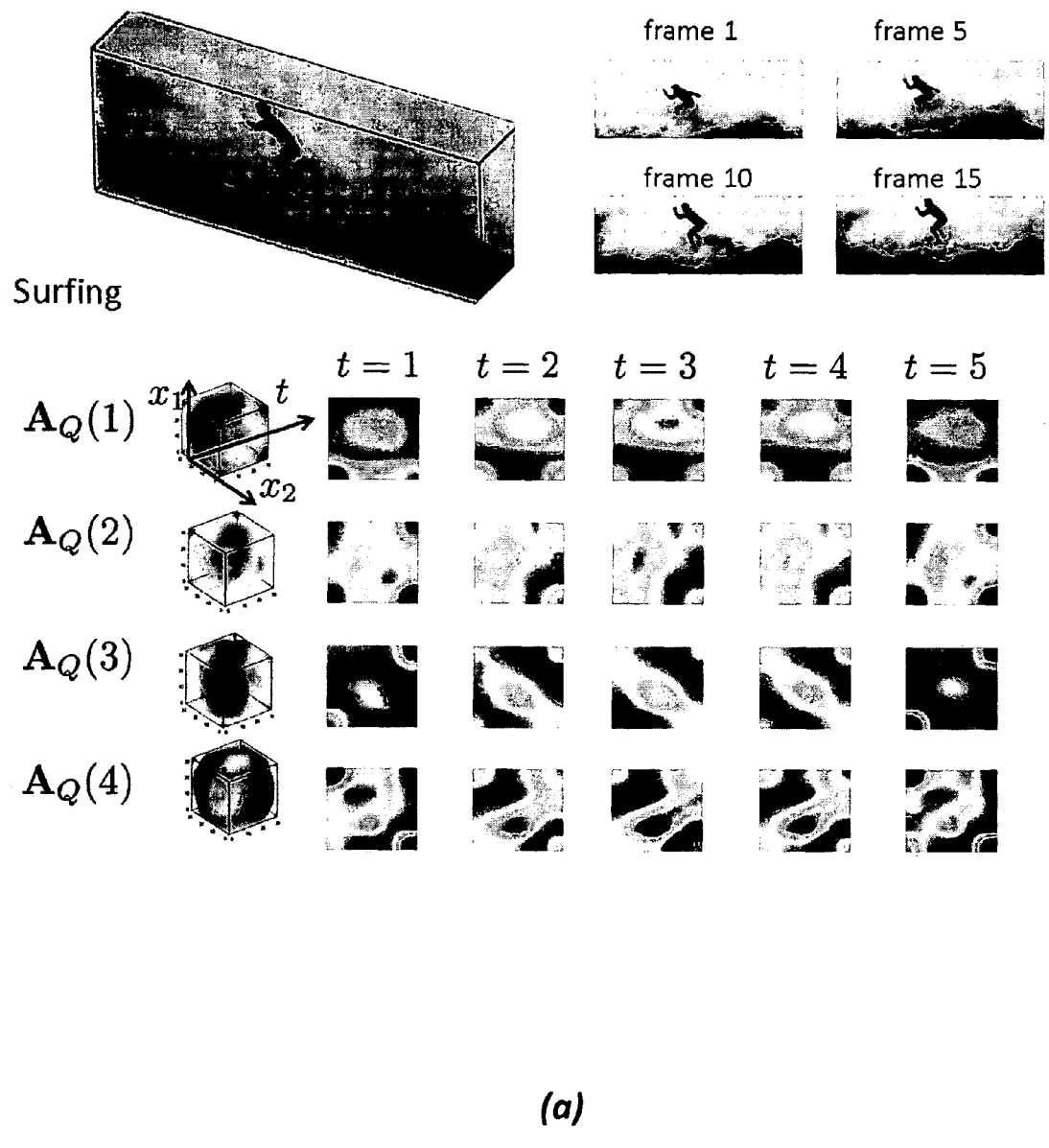
Figure 35:
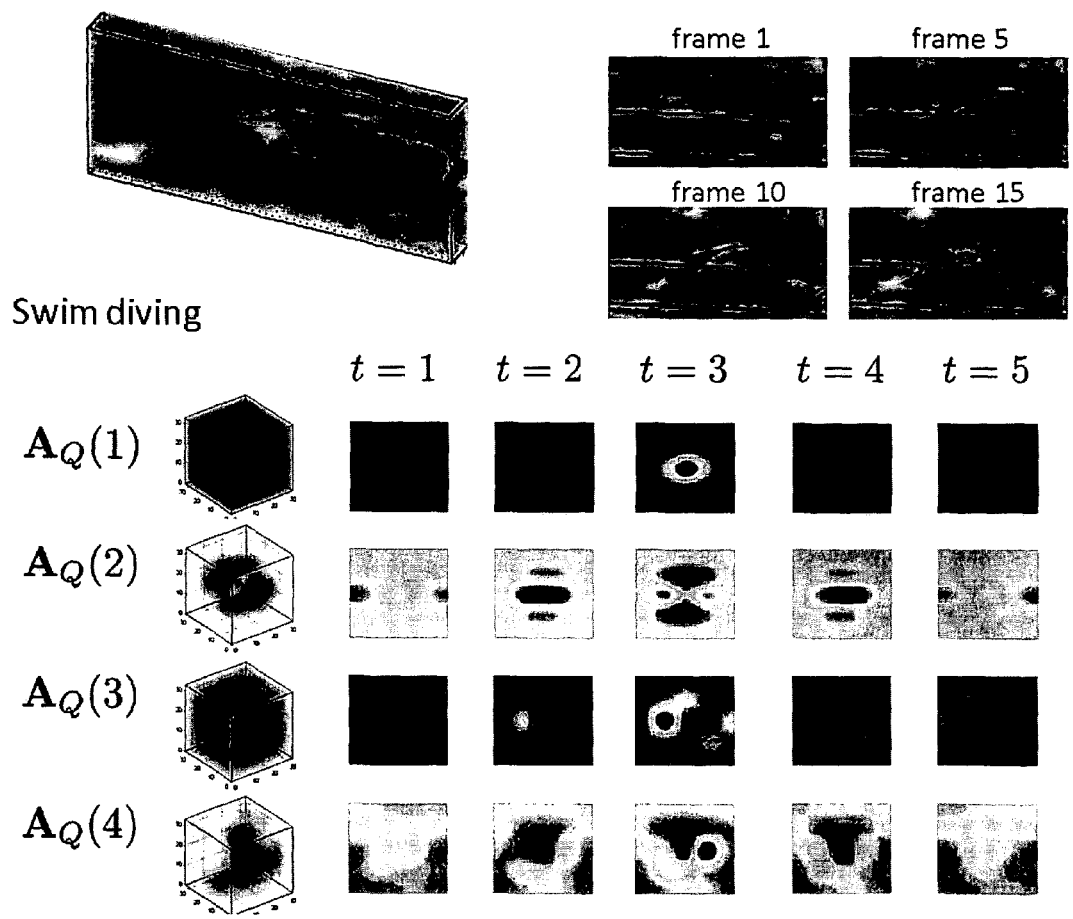
Figure 36:
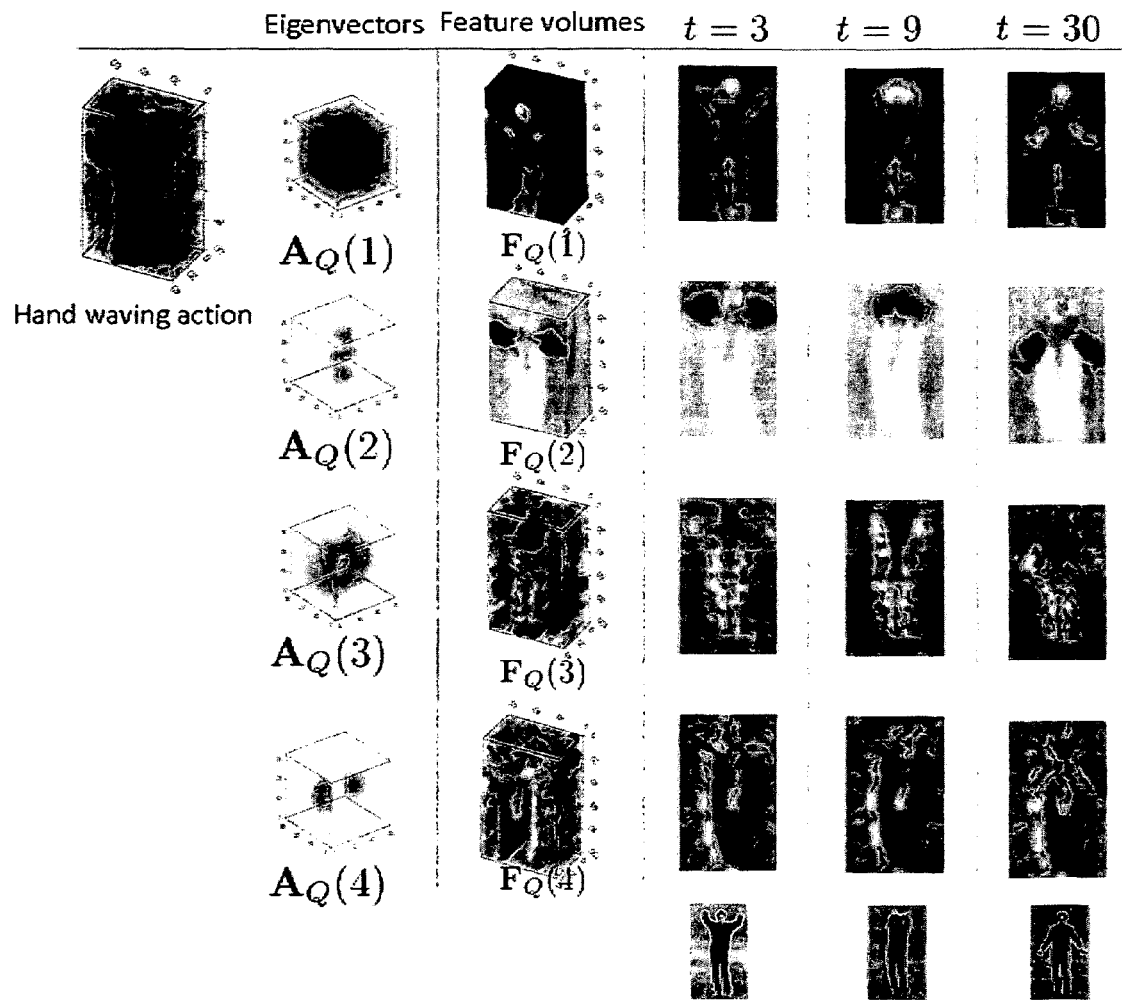
Figure 36:
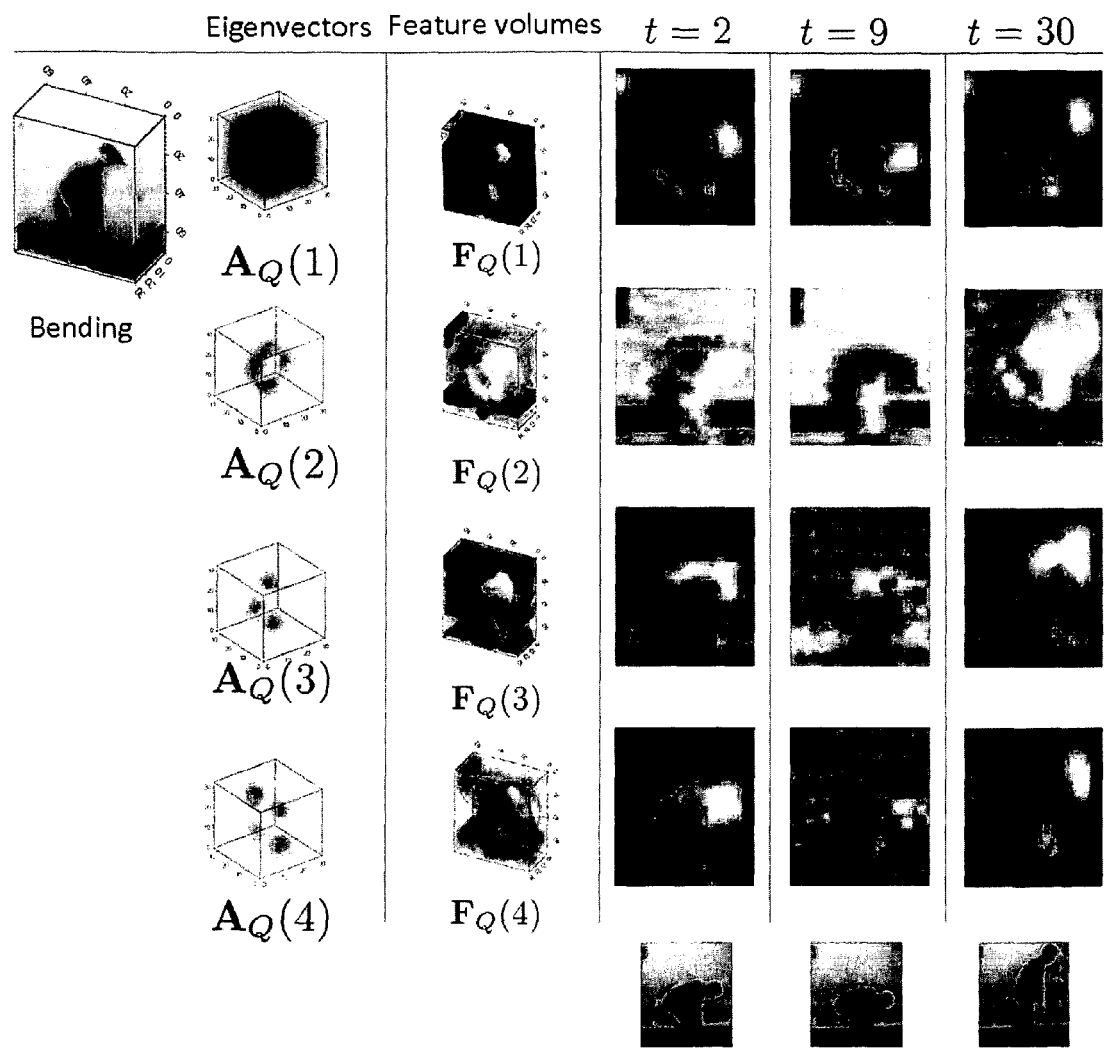

FIGS. 33(a)-33(b) show that a collection of 3-D LSKs reveals global space-time geometric information. Here, the 3D-LSKs are computed from two actions such as hand-waving FIG. 33 (a) and bending FIG. 33 (b) are shown. For graphical description, only the 3-D LSKs are computed at non-overlapping 5×5×5 cubes, even though 3-D LSKs are computed densely in practice. The LSKs of the current invention are based on the similarity between a center voxel and surrounding voxels in a space-time neighborhood measured with the help of gradients. These descriptors capture higher-level contextual information than the histogram of space-time gradients. Furthermore, salient characteristics of 3-D LSKs are extracted by further applying Principal Component Analysis (PCA) as described below.

In describing feature representation, it has been shown that the normalized LSKs in 2-D follow a power-law (i.e., a long-tail) distribution. That is to say, the features are scattered out in a high dimensional feature space, and thus there basically exists no dense cluster in the descriptor space. The same principle applies to 3-D LSK. In order to illustrate and verify that the normalized 3-D LSKs also satisfy this property, an empirical bin density (100 bins) of the normalized 3-D LSKs is computed (using a total of 50,000 3-D LSKs) computed from 90 videos of the Weizmann action dataset using the K-means clustering method as shown in see FIGS. 34(a)-(b), where FIG. 34(a) shows some example video sequences (Weizmann dataset) where 3-D LSKs were computed and FIG. 34(b) shows plots of the bin density of 3-D LSKs and their corresponding low-dimensional features. The utility of this observation becomes clear in the next paragraphs.

In the previous section, a dense set of 3-D LSKs were computed from Q and T. These densely computed descriptors are highly informative, but taken together tend to be over-complete (redundant). Therefore, features are derived by applying dimensionality reduction (namely PCA) to these resulting arrays, in order to retain only the salient characteristics of the 3-D LSKs. As also observed, an ensemble of local features with even little discriminative power can together offer significant discriminative power. However, both quantization and informative feature selection on a long-tail distribution can lead to a precipitous drop in performance. Therefore, instead of any quantization and informative feature selection, focus is on reducing the dimension of 3-D LSKs using PCA.

This idea results in a new feature representation with a moderate dimension, which inherits the desirable discriminative attributes of 3-D LSK. The distribution of the resulting features sitting on the low dimensional manifold also tends to follow a power-law distribution as shown in FIG. 34(b) and this allows us to the use Matrix Cosine Similarity (MCS) measure which will be discussed below.

In order to organize $W_Q$ and $W_T$, which are densely computed from Q and T, let $W_Q$, $W_T$ be matrices whose columns are vectors $w_Q$, $w_T$, which are column-stacked (rasterized) versions of $W_Q$, $W_T$ respectively:

$$W_Q = [w_Q^1, \ldots, w_Q^n] \in \mathbb{R}^{P \times n},$$

$$W_T = [w_T^1, \ldots, w_T^{n_T}] \in \mathbb{R}^{P \times n_T}.$$

where n and $n_T$ are the number of cubes where 3-D LSKs are computed in the query Q and the target T respectively.

As described in FIG. 28, the next step is to apply PCA to $W_Q$ and retain the first (largest) d principal components, which form the columns of a matrix $A_Q \in \mathbb{R}^{P \times d}$. Typically, d is selected to be a small integer such as 3 or 4 so that 80 to 90% of the information in the LSKs would be retained. (i.e., $$\frac{\sum_{i=1}^{d} \lambda_i}{\sum_{i=1}^{P} \lambda_i} \geq 0.8$$

(to 0.9) where $\lambda i$ are the eigenvalues. Next, the lower dimensional features are computed by projecting $W_Q$ and $W_T$ onto $A_Q$:

$$F_Q = [f_Q^1, \ldots, f_Q^n] = A_Q^T W_Q \in \mathbb{R}^{d \times n}, F_T = [f_T^1, \ldots, f_T^{n_T}] = A_Q^T W_T \in \mathbb{R}^{d \times n_T}.$$

FIGS. 35(a)-35(b) and FIGS. 36(a)-36(b) illustrate that the principal components $A_Q$ learned from different actions such as surfing, diving, hand waving, and bending actions are quite distinct from one another. Here, FIGS. 35(a)-35(b) shows examples of the top 4 principal components in $A_Q$ for various actions such as surfing and diving. Note that these eigenvectors reveal geometric characteristic of queries in both space and time domain, and thus they are totally different from linear 3-D Gabor filters. FIGS. 37(a)-37(b) show what the features $F_Q$, $F_T$ look like for a walking action and a jumping action. Here, $A_Q$ is learned from a collection of 3-D LSKs $W_Q$, and Feature row vectors of $F_Q$ and $F_T$ are computed from query Q and target video T respectively. Eigenvectors and feature vectors were transformed to volume and up-scaled for illustration purposes. Note that even though there is cluttered background in T (jumping action), this feature representation can capture only salient characteristics of actions. In order to show where actions appear, ovals are drawn around each action in the target video. These examples illustrate (as quantified later) that the derived feature volumes have a good discriminative power even though we do not involve any learning over a set of training examples.

Regarding Matrix Cosine Similarity, the next step according to the invention is a decision rule based on the measurement of a distance between the computed feature volumes $F_Q$, $F_{T_i}$.

The Matrix Cosine Similarity (MCS) between two feature matrices $F_Q$, $F_{T_i}$, which consist of a set of feature vectors can be defined as the Frobenius inner product between two normalized matrices as follows:

$$\rho(F_Q, F_{T_i}) = \langle \bar{F}_Q, \bar{F}_{T_i} \rangle_F = \text{trace}\left(\frac{F_Q^T F_{T_i}}{\|F_Q\|_F \|F_{T_i}\|_F}\right) \in [-1, 1],$$

where, $$\bar{F}_Q = \frac{F_Q}{\|F_Q\|_F} = \frac{1}{\|F_Q\|_F}[f_Q^1, \ldots, f_Q^n] \text{ and }$$

$$\bar{F}_{T_i} = \frac{F_{T_i}}{\|F_{T_i}\|_F} = \frac{1}{\|F_{T_i}\|_F}[f_{T_i}^1, \ldots, f_{T_i}^n].$$

Rewriting the previous equation as a weighted sum of the vector cosine similarities $$\rho(f_Q, f_{T_i}) = \frac{f_Q^T f_{T_i}}{\|f_Q\| \|f_{T_i}\|}$$

between each pair of corresponding feature vectors (i.e., columns) in $F_Q$, $F_{T_i}$ as follows:

$$\rho(F_Q, F_{T_i}) = \sum_{l=1}^{n} \frac{f_Q^{lT} f_{T_i}^l}{\|F_Q\|_F \|F_{T_i}\|_F} = \sum_{l=1}^{n} \rho(f_Q^l, f_{T_i}^l) \frac{\|f_Q^l\| \|f_{T_i}^l\|}{\|F_Q\|_F \|F_{T_i}\|_F}.$$

The weights are represented as the product of $$\frac{\|f_Q^l\|}{\|F_Q\|_F}$$

and $$\frac{\|f_{T_i}^l\|}{\|F_{T_i}\|_F},$$

which indicate the relative importance of each feature in the feature sets $F_Q$, $F_{T_i}$. Seen here is an advantage of the MCS in that it takes account of the strength and angle similarity of vectors at the same time. Hence, this measure not only generalizes the cosine similarity naturally, but also overcomes the disadvantages of the conventional Euclidean distance which is sensitive to outliers. By computing $\rho(F_Q, F_{T_i})$ over M (a possibly large number of) target cubes and this can be efficiently implemented by column-stacking the matrices $F_Q$, $F_{T_i}$ and simply computing the (vector) cosine similarity between two long column vectors as follows:

$$\rho_i \equiv \rho(F_Q, F_{T_i}) = \sum_{l=1}^{n} \frac{f_Q^{lT} f_{T_i}^l}{\|F_Q\|_F \|F_{T_i}\|_F} = \sum_{l=1}^{n} \sum_{j=1}^{d} \frac{f_Q^{(l,j)} f_{T_i}^{(l,j)}}{\sqrt{\sum_{l=1}^{n} \sum_{j=1}^{d} \left|f_Q^{(l,j)}\right|^2} \sqrt{\sum_{l=1}^{n} \sum_{j=1}^{d} \left|f_{T_i}^{(l,j)}\right|^2}}, =$$

$$\rho(\text{colstack}(F_Q), \text{colstack}(F_{T_i})) \in [-1, 1],$$

here $f_Q^{(l,j)}$, $f_{T_i}^{(l,j)}$ are elements of $l^{th}$ vector $f_Q^l$ and $f_{T_i}^l$ and colstack (•) means an operator which column-stacks (rasterizes) a matrix.

It has been proposed that 3-D volume correlation score (global consistency measure between query and target cube) by computing a weighted average of local consistency measures. The difficulty with that method is that local consistency values should be explicitly computed from each corresponding subvolume of the query and target video. Furthermore, the weights to calculate a global consistency measure are based on a sigmoid function, which is somewhat ad-hoc. Here, the MCS measure of the current invention is better motivated, more general, and effective than their global consistency measure for action detection as previously alluded to.

The next step is to generate a so-called resemblance volume (RV), which will be a volume of voxels, each indicating the likelihood of similarity between the Q and T. As for the final test statistic comprising the values in the resemblance volume, we use the proportion of shared variance ($\rho_i^2$) to that of the "residual" variance ($1-\rho_i^2$). More specifically, RV is computed as follows:

$$RV: f(\rho_i) = \frac{\rho_i^2}{1-\rho_i^2}.$$

The resemblance volume generated from $f(\rho_i)$) provides better contrast and dynamic range in the result ($f(\rho_i) \in [0, \infty]$). More importantly, from a quantitative point of view, it is noted that $f(\rho_i)$ is essentially the Lawley-Hotelling trace statistic, which is used as an efficient test statistic for detecting correlation between two data sets. Furthermore, historically, this statistic has been suggested in the pattern recognition literature as an effective means of measuring the separability of two data clusters.

Regarding the Non-Parametric Significance Test, if the task is to find the most similar cube ($T_i$) to the query (Q) in the target video, one can choose the cube which results in the largest value in the RV (i.e., max $f(\rho_i)$) among all the cubes, no matter how large or small the value is in the range of $[0, \infty]$. This, however, is unwise because there may not be any action of interest present in the target video. Therefore two types of significance tests are of interest. The first is an overall test to decide whether there is any sufficiently similar action present in the target video at all. If the answer is yes, then it is desirable to know how many actions of interest are present in the target video and where they are. Therefore, two thresholds are needed: an overall threshold $\tau_o$ and a threshold $\tau$ to detect the (possibly) multiple occurrences of similar actions in the target video.

In a typical scenario, we set the overall threshold $\tau_o=1$, which is about 50% of variance in common (i.e., $\rho_{2=0.5}$), which represents an unbiased choice reflecting our lack of prior knowledge about whether any similar actions are present at all. In other words, if the maximal $f(\rho_i)$ is just above 1, it is decided that there exists at least one action of interest.

The next step is to choose $\tau$ based on the properties of $f(\rho_i)$. When it comes to choosing the $\tau$, there is need to be more careful. If one has a basic knowledge of the underlying distribution of $f(\rho_i)$, then one can make predictions about how this particular statistic will behave, and thus it is relatively easy to choose a threshold, which will indicate whether the pair of features from the two videos are sufficiently similar. But, in practice, one does not have a very good way to model the distribution of $f(\rho_i)$. Therefore, instead of assuming a type of underlying distribution, the idea of nonparametric testing is employed. Namely, an empirical probability density function (PDF) is computed from the samples $f(\rho_i)$ in the given resemblance volume, and set $\tau$ so as to achieve, for instance, a 99 percent significance level in deciding whether the given values are in the extreme (right) tails of the distribution. This approach is based on the assumption that in the target video, most cubes do not contain the action of interest (in other words, an action of interest is a relatively rare event), and therefore, the few matches will result in values, which are in the tails of the distribution of $f(\rho_i)$.

Regarding Non-maxima Suppression, after the two significance tests with $\tau_o$, $\tau$ are performed, the idea of non-maxima suppression is employed for the final detection. The volume region with the highest $f(\rho_i)$ value is taken and the possibility that any other action is detected is eliminated within some radius of the center of that volume again, where the size of this exclusion region will depend on the application at hand and the characteristics of the query video. This enables one to avoid multiple false detections of nearby actions already detected. Then this process is then iterated until the local maximum value falls below the threshold $\tau$.

The performance of the current invention is demonstrated here with comprehensive experiments on three datasets; namely, the general action dataset, the Weizmann action dataset, and the KTH action dataset. The general action dataset is used to evaluate detection performance of the current invention, while the Weizmann action dataset and the KTH action dataset are employed for action categorization. Comparison is made with other methods that have reported their results on these datasets.

In this section, shown are several experimental results on searching with a short query video against a (typically longer and larger) target video. The current method detects the presence and location of actions similar to the given query and provides a series of bounding cubes with resemblance volume embedded around detected actions. Note again that no background/foreground segmentation is required in the current method. The method of the current invention can also handle modest variations in rotation (up to ±15 degree), and spatial and temporal scale change (up to ±20%). Given Q and T, the image is spatially blur and downsample both Q and T by a factor of 3 in order to reduce the time-complexity. Then 3-D LSK of size 3×3 (space) ×7 (time) as descriptors are computed so that every space-time location in Q and T yields a 63-dimensional local descriptor $W_Q$ and $W_T$ respectively. The reason a lager time axis size than space axis of the cube is chosen is that it is desired to focus on detecting similar actions regardless of different appearances. Thus providing a higher priority to temporal evolution information than spatial appearance. The end result here is $F_Q$, $F_T$ by reducing dimensionality from 63 to d=4 and then, RV is obtained by computing the MCS measure between $F_Q$, $F_T$. The method of the invention is applied to 4 different examples: for detecting 1) walking people, 2) ballet turn actions, 3) swim jump actions and 3) multiple actions in one video.

Turning not to FIG. 38, shown are results of searching for walking persons on the beach, where Top: a short walk query, Left: resemblance volume (RV), Middle: detected walking actions after two significance tests ($\tau0=1$, $\tau=2.07$) followed by non-maxima suppression. Darkareas among detected volumes mean higher resemblance to the given query. Right: ground truth volume. Note that shades in the ground truth volume are used to distinguish individual actions from each other. This figure is better illustrated in color. These results of searching for instances of walking people in a target beach video are provided from 456 frames of 180×360 pixels. The query video contains a very short walking action moving to the right (14 frames of 60×70 pixels) and has a background context, which is not the beach scene. In order to detect walking actions in either direction, two queries (Q and its mirror-reflected version) were used and generated two RVs. By voting the higher score among values from two RVs at every space-time location, one RV was determined, which includes correct locations of walking people in the correct direction. Dark and wide shade color represents higher resemblance while narrow shade denotes lower resemblance values. The threshold $\tau$ for each test example was determined by the 99.97 percent confidence level.

FIG. 39 shows results of searching ballet turn on the ballet video, where Top: a short ballet turn query, Left: resemblance volume (RV), Middle: detected turning actions after two significance tests ($\tau_0=1$, $\tau=1.53$) followed by non-maxima suppression, Right: ground truth volume. Note that shades in the ground truth volume are used to distinguish individual actions from each other. This figure is better illustrated in color. Here the results of detecting ballet turning action in a target ballet video (766 frames of 144×192 pixels). The query video contains a single turn of a male dancer (13 frames of 90×110 pixels). Note that this video contains very fast moving parts and contains large variability in spatial scale and appearance (the female dancer wearing a skirt) as compared to the given query Q. After two significance testing with $\tau_0=1$, $\tau=1.53$, most of the turns of the two dancers (a male and a female) with two false positives and one miss were detected. However, if one set the confidence level to 0.998 instead of 0.9997, all of the turns are detected with more false positives.

FIG. 40 shows the results of searching for diving on the Olympic swim-relay match video. Top: a short dive query, Left: resemblance volume (RV), Middle: detected diving actions after two significance tests ($\tau0=1$, $\tau=0.36$) followed by non-maxima suppression. Right: ground truth volume. Note that colors in the ground truth volume are used to distinguish individual actions from each other. This figure is better illustrated in color. Here, Precision-Recall curves of the current method for three different actions (walk, ballet turn, and dive) are shown in FIGS. 38-40. (757 frames of 240×360 pixels). This target video was severely MPEG compressed. The query video contains a single dive into a pool (16 frames of 70×140 pixels). Most of the dives with a few false positives were detected even though this video contains the severe noise and various actions such as a variety of swim styles, flips under the water, and splashes of water. Note that other action detection methods do not provide any quantitative performance on these examples. It is worth noting here that other training-free action detection methods, which also tested on this dataset, only presented qualitative results with either empirically chosen threshold values or no description about how the threshold values are determined. On the other hand, the threshold values are automatically chosen in the algorithm of the current invention with respect to the confidence level.

FIG. 41 shows a quantitative performance (Precision-Recall curves) of the current invention on three pairs of Irani's action dataset. The detection result of the current invention on this dataset outperforms other state-of-the art methods, which had a number of miss detection and false positives.

FIG. 42 shows the results of detecting 4 different actions (walk, wave, cheer, and jump), which occur simultaneously in a target video (300 frames of 288×360 pixels). Four query videos were matched against the target video independently. Most of the actions were detected although one of two cheer actions on the target video was missed because it contains head shaking as well while the query video does not have any head motion.

In all the above examples, the same parameters were used. It is evident, based on all the results above, that the training-free action detection based on 3-D LSK of the current invention works well and is robust to modest variations in spatiotemporal scale.

As opposed to action detection, action category classification aims to classify a given action query into one of several pre-specified categories. In earlier discussion on action detection, it was assumed that in general the query video is smaller than the target video. Now this is assumption is relaxed assumption, and thus a preprocessing step is needed, which selects a valid human action from the query video. This idea allows one not only to extend the proposed detection framework to action category classification, but also improves both detection and classification accuracy by removing unnecessary background from the query video.

Once the query video is cropped to a short action clip, the cropped query is searched against each labeled video in the database, and the value of the resemblance volume (RV) is viewed as the likelihood of similarity between the query and each labeled video. Then one classify a given query video as one of the predefined action categories using a nearest neighbor (NN) classifier.

Regarding Action Cropping in Videos a procedure is introduced which automatically extracts from the query video a small cube that only contains a valid action. Space-time saliency detection can provide such a mechanism as shown in FIG. 43, where each frame of query video Q is downsampled to a coarse spatial scale (64×64) in order to reduce the time-complexity, where the video in the time domain is not downsampled. The 3-D LSK of size 3×3×3 is computed as features and generate feature matrices $F_i$ in a (3×3×7) local space-time neighborhood. Space-time saliency maps S are generated by computing self-resemblance measure as shown in FIGS. 44($a$)-44($b$). Then, the idea of non-parametric significance testing is again used to detect space-time proto-objects. Namely, an empirical PDF is computed from all the saliency values and set a threshold so as to achieve, a 95% significance level in deciding whether the given saliency values are in the extreme (right) tails of the empirical PDF. Here, a somewhat loose confidence level is selected here since one does not wish to miss the relevant action in the query. The approach is based on the assumption that in the video, a salient action is a relatively rare event and thus results in values, which are in the tails of the distribution of saliency map values. After making a binary map by thresholding the space-time saliency map, a morphological filter is applied. More specifically, the binary object map is dilated with a disk shape of size 5×5. Proto-objects are extracted from corresponding locations of the original video. FIGS. 44($a$)-44($b$) show that the space-time saliency detection method successfully detects only salient human actions in both the Weizmann dataset and the KTH dataset. Next, valid human action region is cropped by fitting a 3-D rectangular box to space-time proto-objects.

The Weizmann action dataset contains 10 actions (bend, jumping jack, jump forward, jump in place, jump sideways, skip, run, walk, wave with two hands, and wave with one hand) performed by 9 different subjects. This dataset contains videos with static cameras and simple background, but it provides a good testing environment to evaluate the performance of the algorithm when the number of categories is large compared to the KTH dataset (a total of 6 categories). The testing was performed in a "leave-one-out" setting, i.e., for each run the videos of 8 subjects are labeled and the videos of the remaining subject are used for testing (query). The automatic action cropping method, introduced in the previous section, to the query video. Then the resulting short action clip is matched against the remaining labeled videos using the current invention. Each testing video is classified as one of the 10 action types by 3-NN (nearest neighbor). The results are reported as the average of nine runs. A recognition rate of 96% is achieved for all ten actions. The recognition rate comparison is provided in Table III as well. The method of the current invention, which is training-free, performs favorably against other methods, which largely depend on training.

TABLE III

COMPARISON OF AVERAGE RECOGNITION RATE ON THE WEIZMANN DATASET ([2])

| Our approach | | 3-NN | 2-NN | 1-NN |
|---|---|---|---|---|
| Recognition rate | | 96% | 90% | 90% |
| Method | Juenjo et al. [62] | Liu et al. [21] | Klaser et al. [56] | Schindler and Gool [68] |
| Recognition rate | 95.33% | 90% | 84.3% | 100% |
| Method | Niebles et al. [15] | Ali et al. [13] | Sun et al. [69] | Fathi and More [70] |
| Recognition rate | 90% | 95.75% | 97.8% | 100% |
| Method | Jhuang et al. [63] | Batra et al. [64] | Bregonzio et al. [66] | Zhang et al. [65] |
| Recognition rate | 98.8% | 92% | 96.6% | 92.89% |

Results using 1-NN and 2-NN are further provided for comparison. It is observed that these results also compare favorably to several other methods even though the current method involves no training phase, and requires no background/foreground segmentation. As an added bonus, the current method provides localization of actions as a side benefit. FIG. 45 shows the confusion matrix for the method according to the current invention. Note that our method is mostly confused by similar action classes, such as skip with jump, run, and side.

In order to further quantify the performance of the algorithm in the current invention, experiments were conducted on the KTH dataset. The KTH action dataset contains six types of human actions (boxing, hand waving, hand clapping, walking, jogging, and running), performed repeatedly by 25 subjects in 4 different scenarios: outdoors ($c_1$), outdoors with camera zoom ($c_2$), outdoors with different clothes ($c_3$), and indoors ($c_4$). This dataset seems more challenging than the Weizmann dataset because there are large variations in human body shape, view angles, scales, and appearance. The "leave-one-out" cross validation is again used to measure the performance.

FIGS. 44(a)-44(b) show the confusion matrices from the current method for each scenario and the average confusion matrix across all scenarios. One is able to achieve a recognition rate of 95.66% on these six actions. The recognition rate comparison with competing methods is provided in Table IV as well. It is worth noting that our method outperforms all the other state-of-the-art methods and is fully automatic. Table V further shows that the scenario-wise recognition rates of the current invention are consistently higher than those reported by others.

TABLE IV

DETAILED COMPARISON OF RECOGNITION RATE ON THE KTH DATASET.

| Methods | $c_1$ | $c_2$ | $c_3$ | $c_4$ | Avg |
|---|---|---|---|---|---|
| Our Approach | 97.33% | 92.67% | 95.3% | 97.32% | 95.66% |
| Ning et al. [25] (3-NN) | 95.56% | 82.41% | 90.66% | 94.72% | 92.09% |
| Jhuang et al. [63] | 96.0% | 89.1% | 89.8% | 94.8% | 91.7% |

Avg IS THE AVERAGE ACROSS 4 SCENARIOS.

TABLE V

COMPARISON OF AVERAGE RECOGNITION RATE ON THE KTH DATASET

| Our approach Recognition rate | | 3-NN 95.66% | | 2-NN 93% | 1-NN 89% |
|---|---|---|---|---|---|
| Method | Kim et al. [24] | Ning et al. [25] | Klaser et al. [56] | Schindler and Gool [68] | |
| Recognition rate | 95.33% | 92.31% (3-NN) | 91.4% | 92.7% | |
| Method | Ali et al. [13] | Niebles et al. [15] | Liu and Shah [71] | Sun et al. [69] | |
| Recognition rate | 87.7% | 81.5% | 94.2% | 94% | |
| Method | Dollar et al. [72] | Wong et al. [73] | Rapantzikos et al. [67] | Laptev et al. [55] | |
| Recogniton rate | 81.17% | 84% | 88.3% | 91.8% | |

The current invention is designed with recognition accuracy as a high priority. A typical run of the action detection system implemented in Matlab takes a little over 1 minute on a target video T (50 frames of 144×192 pixels, Intel Pentium CPU 2.66 Ghz machine) using a query Q (13 frames of 90×110). Most of the run-time is taken up by the computation of MCS (about 9 seconds, and 16.5 seconds for the computation of 3-D LSKs from Q and T respectively, which needs to be computed only once.) There are many factors that affect the precise timing of the calculations, such as query size, complexity of the video, and 3-D LSK size. By applying coarse-to-fine search or branch and bound can be applied to speed up the method. As another way of reducing time-complexity, one could use look-up table instead of computing the local covariance matrix C at every pixel. A multi-scale approach can also be applied to improve efficiency. Even though the current method is stable in the presence of moderate amount of camera motion, the invention can benefit from camera stabilization methods as done in case of large camera movements.

In the Weizmann dataset and the KTH dataset, target videos contain only one type of action. However, as shown in FIG. 42, target video may contain multiple actions in practice. In this case, simple nearest neighbor classifiers can possibly fail. Therefore, one might benefit from contextual information to increase accuracy of action recognition systems. In fact, there is a broad agreement in the computer vision community about the valuable role that context plays in any image understanding task.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example the locally adaptive regression kernels may be used to establish similarity between a center region and a surrounding region either in a single image or in a video. This measure of similarity, or more precisely its complement, can be used to establish the saliency of a region in an image or video. Salient regions are those regions on which humans tend to automatically and involuntarily focused attention.

All such variations are considered to be within the scope and spirit of the present invention as defined by the following claims and their legal equivalents.

What is claimed is:

1. A method of learning-free detection and localization of actions, comprising:
   a. providing a query video action of interest and providing a target video by using an appropriately programmed computer;
   b. obtaining at least one query space-time localized steering kernel (3-D LSK) from said query video action of interest and obtaining at least one target 3-D LSK from said target video by using said appropriately programmed computer, wherein said kernel 3-D LSK and said target 3-D LSK implicitly contain information about local motion of voxels across time, wherein no explicit motion estimation is required;
   c. determining at least one query feature from said query 3-D LSK and determining at least one target patch feature from said target 3-D LSK by using said appropriately programmed computer; and
   d. outputting a resemblance map, wherein said resemblance map provides a likelihood of a similarity between each said query feature and each said target patch feature by using said appropriately programmed computer to output learning-free detection and localization of actions.

2. The method of detection and localization of actions in claim 1, wherein each said 3-D LSK is computed from covariance matrices, wherein said covariance matrices are estimated by using singular value decomposition (SVD), wherein said SVD is applied to a collection of space-time gradient vectors in a local neighborhood, wherein said covariance matrices determine a shape and size of a local kernel, wherein local geometric structures are encoded.

3. The method of detection and localization of actions in claim 1, wherein each resulting said 3-D LSK is invariant to illumination changes and robust to a presence of noise.

4. The method of detection and localization of actions in claim 1, wherein said resemblance map comprises nonparametric significance testing and non-maxima suppression.

5. The method of detection and localization of actions in claim 1, wherein said resemblance map comprises a volume of voxels, wherein each said voxel indicates the likelihood of similarity between each said query feature and each said target patch feature.

6. The method of detection and localization of actions in claim 1, wherein said resemblance map is computed by using a matrix cosine similarity (MCS).

7. The method of detection and localization of action in claim 1, wherein a space-time saliency detection method is utilized to automatically extract a finite cube that only contains a valid action for the task of action category classification from the query video, wherein said space-time saliency detection is based on said 3-D LSKs and a self-resemblance measure.

8. The method of detection and localization of actions in claim 1, wherein each said 3-D LSK is densely computed and normalized.

9. The method of detection and localization of actions in claim 8, wherein lower dimensional features of each said query 3-D LSK and each said target 3-D LSK are determined by projecting each said normalized query 3-D LSK and each said target 3-D LSK onto said feature space.

10. The method of detection and localization of actions in claim 8, wherein each said query feature volume and each said target feature volume comprises a principle component analysis (PCA) applied to each said densely computed and normalized query 3-D LSK, wherein said PCA step determines feature spaces for dimensionality reduction of said normalized query 3-D LSK.

11. The method of detection and localization of actions in claim 10, wherein said PCA is applied to each said densely computed and normalized query 3-D LSK and said target 3-D LSK.

* * * * *